(12) United States Patent  
Wu et al.

(10) Patent No.: US 9,223,056 B2  
(45) Date of Patent: *Dec. 29, 2015

(54) DETERMINING BOREHOLE CORRECTED FORMATION PROPERTIES

(71) Applicant: Schlumberger Technology Corporation, Sugar Land, TX (US)

(72) Inventors: Peter T. Wu, Missouri City, TX (US); Hanming Wang, Katy, TX (US); Gerald N. Minerbo, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,152

(22) Filed: Oct. 28, 2013

(65) Prior Publication Data

US 2014/0121978 A1    May 1, 2014

Related U.S. Application Data

(63) Continuation of application No. 12/597,977, filed as application No. PCT/US2008/063052 on May 8, 2008, now Pat. No. 8,571,797.

(60) Provisional application No. 60/916,616, filed on May 8, 2007, provisional application No. 60/950,708, filed on Jul. 19, 2007.

(51) Int. Cl.
*G01V 13/00* (2006.01)
*G01V 1/50* (2006.01)
*G01V 3/38* (2006.01)

(52) U.S. Cl.
CPC *G01V 13/00* (2013.01); *G01V 1/50* (2013.01); *G01V 3/38* (2013.01)

(58) Field of Classification Search
CPC .................................. G01V 13/00; G01V 1/50

USPC .............................. 702/6, 7, 9, 11, 12; 703/6
See application file for complete search history.

(56) References Cited

U.S. PATENT DOCUMENTS

| 5,041,975 A | 8/1991 | Minerbo et al. |
| 5,615,172 A * | 3/1997 | Kotlyar ........................... 367/83 |

(Continued)

FOREIGN PATENT DOCUMENTS

WO        0184189 A1    11/2001

OTHER PUBLICATIONS

International Search Report for International Application No. PCT/US2008/063052 dated Oct. 13, 2008.

(Continued)

*Primary Examiner* — Carol S Tsai  
(74) *Attorney, Agent, or Firm* — John Vereb

(57) ABSTRACT

A method for correcting formation properties due to effects of a borehole is disclosed. The method includes obtaining voltage measurements using a logging tool disposed in a borehole penetrating a subsurface formation. The method further includes using a processor to: determine a tensor for the formation using the voltage measurement. For a given set of parameters, the processor determines, based upon the voltage measurements, a parameter value for each parameter in a subset of the set of parameters. The method further uses the processor to compute a borehole-inclusive modeled tensor that includes the effects of the borehole using the parameter values, optimize the parameter values using the determined tensor and the borehole-inclusive tensor, compute an optimized tensor using the optimized parameter values, compute a borehole corrected tensor using the optimized tensor, and determine at least one borehole corrected formation property using at least one of the borehole corrected tensor or the optimized parameter values.

20 Claims, 42 Drawing Sheets

(56) References Cited

U.S. PATENT DOCUMENTS

| | | | |
|---|---|---|---|
| 5,678,033 A * | 10/1997 | Moledina et al. | 345/502 |
| 5,729,451 A * | 3/1998 | Gibbs et al. | 702/12 |
| 5,812,082 A * | 9/1998 | Moreira et al. | 342/25 A |
| 5,854,991 A * | 12/1998 | Gupta et al. | 702/7 |
| 6,297,639 B1 | 10/2001 | Clark et al. | |
| 6,304,086 B1 | 10/2001 | Minerbo et al. | |
| 6,351,127 B1 | 2/2002 | Rosthal et al. | |
| 6,380,744 B1 | 4/2002 | Clark et al. | |
| 6,381,542 B1 | 4/2002 | Zhang et al. | |
| 6,541,979 B2 | 4/2003 | Omeragic | |
| 6,556,015 B1 | 4/2003 | Omeragic et al. | |
| 6,557,794 B2 | 5/2003 | Rosthal et al. | |
| 6,566,881 B2 | 5/2003 | Omeragic et al. | |
| 6,573,722 B2 | 6/2003 | Rosthal et al. | |
| 6,584,408 B2 | 6/2003 | Omeragic | |
| 6,594,584 B1 | 7/2003 | Omeragic et al. | |
| 6,624,634 B2 | 9/2003 | Rosthal et al. | |
| 6,667,620 B2 | 12/2003 | Homan et al. | |
| 6,680,613 B2 | 1/2004 | Rosthal et al. | |
| 6,690,170 B2 | 2/2004 | Homan et al. | |
| 6,693,430 B2 | 2/2004 | Rosthal et al. | |
| 6,710,601 B2 | 3/2004 | Rosthal et al. | |
| 6,727,705 B2 | 4/2004 | Frey et al. | |
| 6,788,263 B2 | 9/2004 | Clark et al. | |
| 6,798,208 B2 | 9/2004 | Omeragic | |
| 6,819,110 B2 | 11/2004 | Omeragic et al. | |
| 6,832,159 B2 | 12/2004 | Smits et al. | |
| 6,836,218 B2 | 12/2004 | Frey et al. | |
| 6,924,646 B2 | 8/2005 | Omeragic | |
| 6,927,578 B2 | 8/2005 | Homan et al. | |
| 6,930,652 B2 | 8/2005 | Smith et al. | |
| 6,937,021 B2 | 8/2005 | Rosthal | |
| 6,956,370 B2 | 10/2005 | Heidler | |
| 6,969,994 B2 | 11/2005 | Minerbo et al. | |
| 6,984,983 B2 | 1/2006 | Tabanou | |
| 7,026,813 B2 | 4/2006 | Homan et al. | |
| 7,392,137 B2 * | 6/2008 | Tabarovsky et al. | 702/7 |
| 7,414,391 B2 | 8/2008 | Homan et al. | |
| 7,421,345 B2 * | 9/2008 | Tabarovsky et al. | 702/9 |
| 7,436,183 B2 | 10/2008 | Clark | |
| 7,457,707 B2 * | 11/2008 | Davydychev et al. | 702/7 |
| 7,463,035 B2 * | 12/2008 | Merchant et al. | 324/339 |
| 7,505,851 B2 * | 3/2009 | Bal et al. | 702/7 |
| 7,657,375 B2 * | 2/2010 | Wang et al. | 702/6 |
| 8,112,227 B2 * | 2/2012 | Rabinovich et al. | 702/7 |
| 8,571,797 B2 | 10/2013 | Wu et al. | |
| 2005/0256642 A1 | 11/2005 | Barber et al. | |
| 2005/0278121 A1 * | 12/2005 | Tabarovsky et al. | 702/9 |
| 2006/0120217 A1 * | 6/2006 | Wu et al. | 367/32 |
| 2006/0132128 A1 | 6/2006 | Freedman et al. | |
| 2007/0219723 A1 * | 9/2007 | Tabarovsky et al. | 702/9 |
| 2007/0267192 A1 * | 11/2007 | Wang et al. | 166/254.2 |
| 2008/0133138 A1 * | 6/2008 | Davydychev et al. | 702/7 |

OTHER PUBLICATIONS

Wu, P. et al. "Borehole Effects and Correction in OBM with Dip and Anisotropy for Triaxial Induction Tools," SPE 110623, Nov. 11-14, 2007.

* cited by examiner

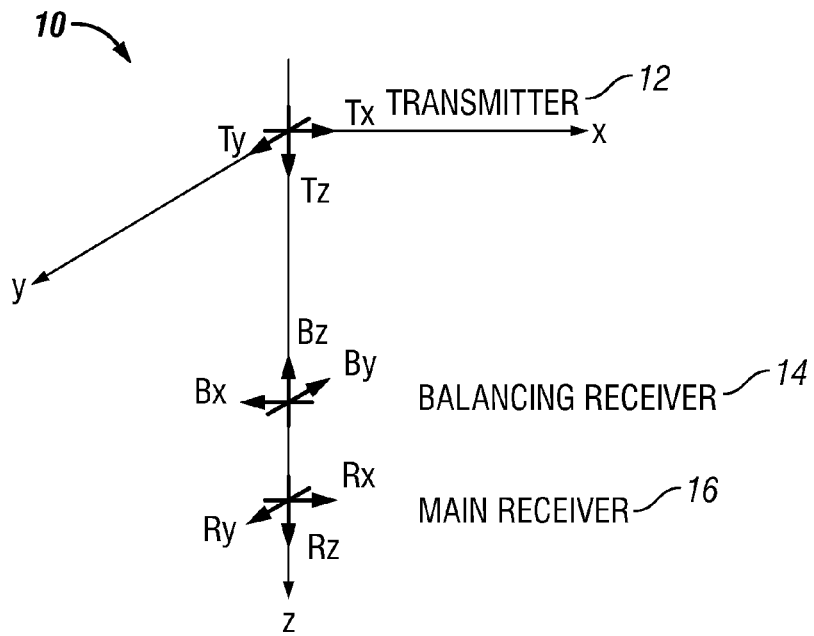
FIG. 1-1
(Prior Art)
$$\begin{vmatrix} V_{xx} & V_{yx} & V_{zx} \\ V_{xy} & V_{yy} & V_{zy} \\ V_{xz} & V_{yz} & V_{zz} \end{vmatrix}$$
FIG. 1-2
(Prior Art)
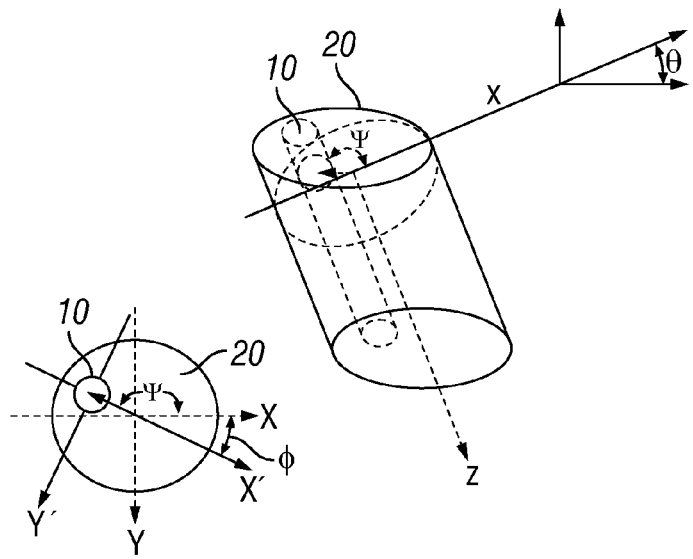
FIG. 2

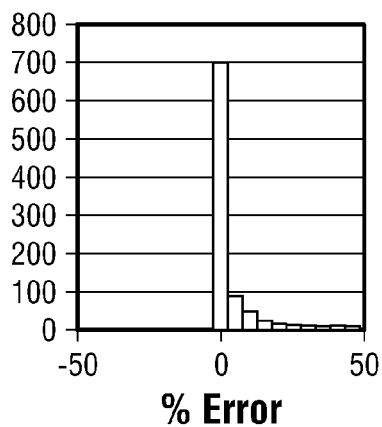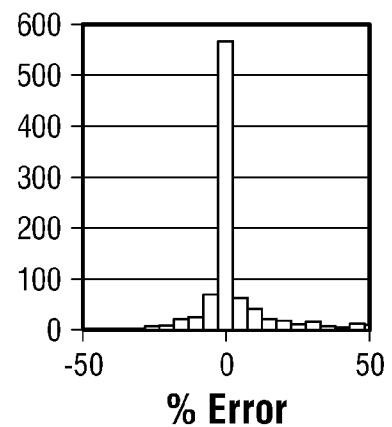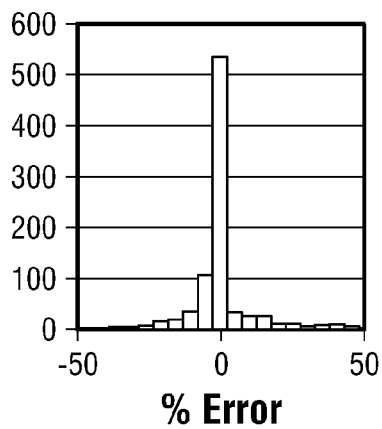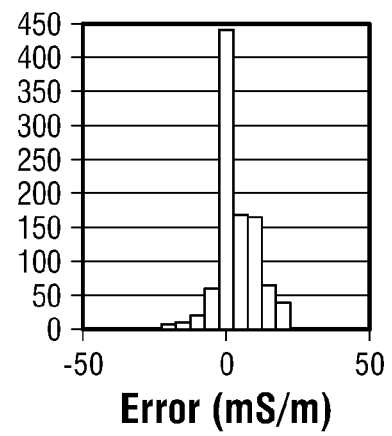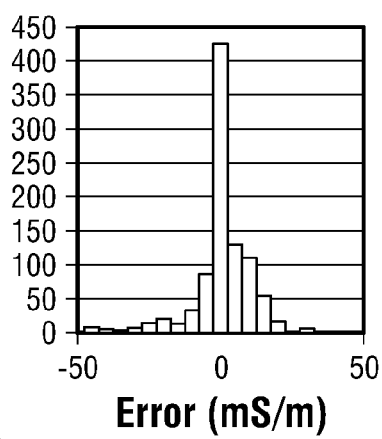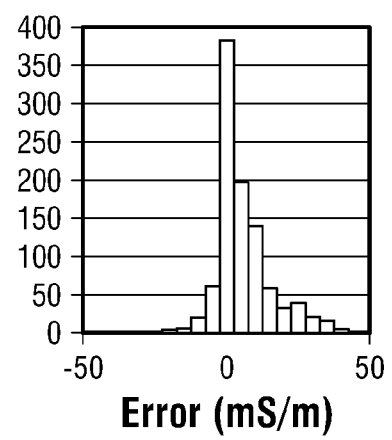
*FIG. 12-3A*

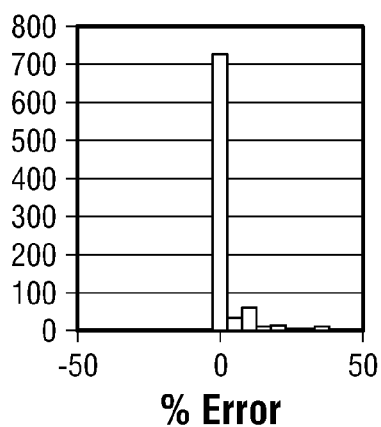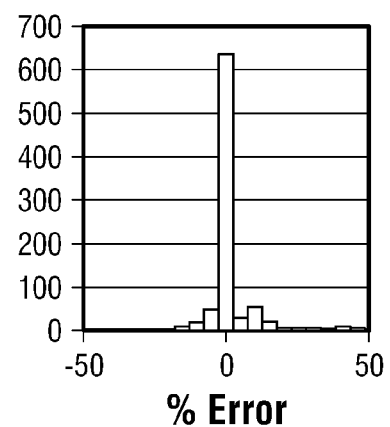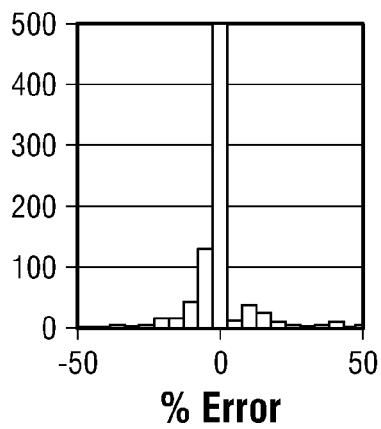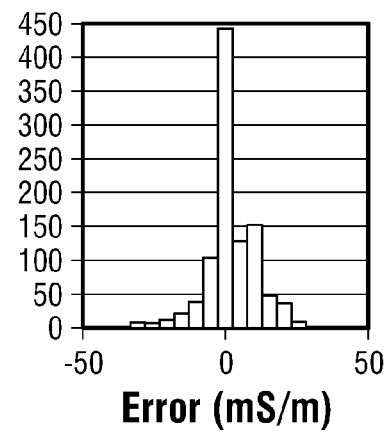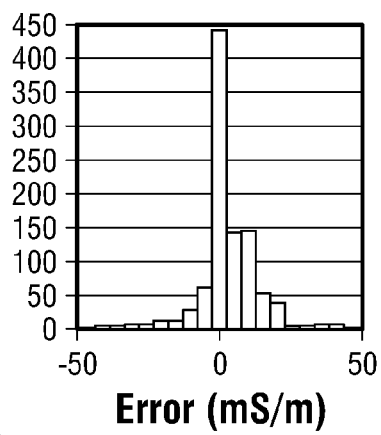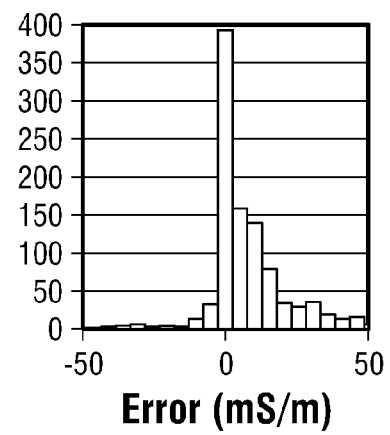
*FIG. 12-3B*

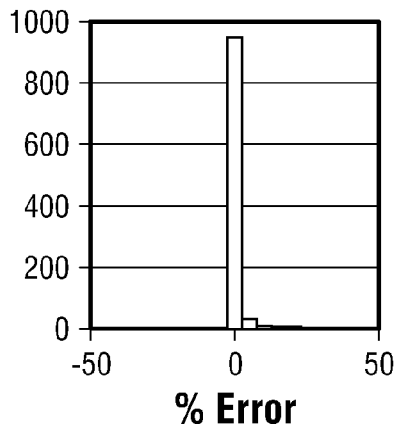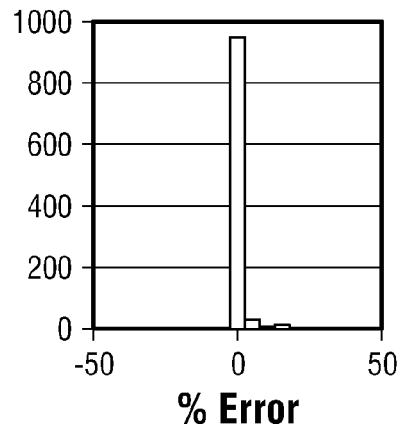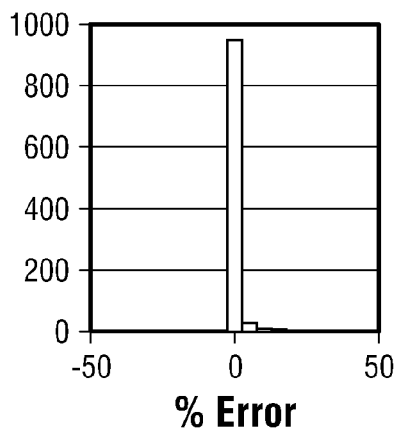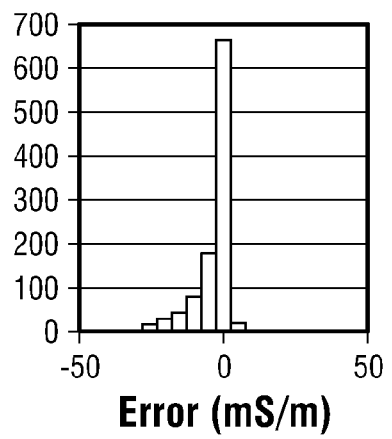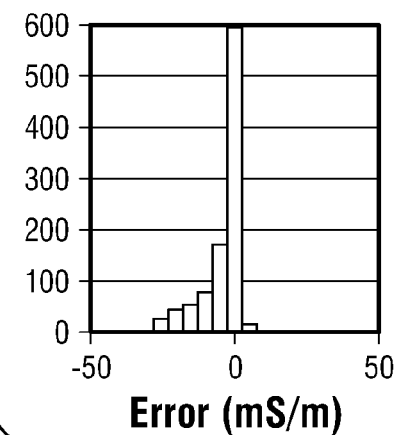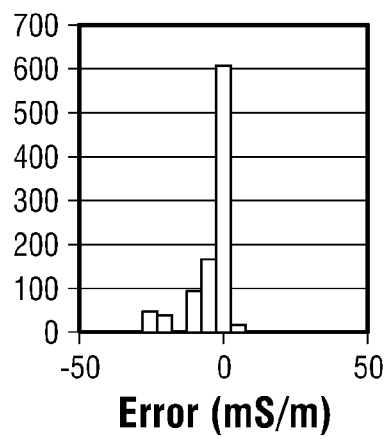
*FIG. 12-3C*

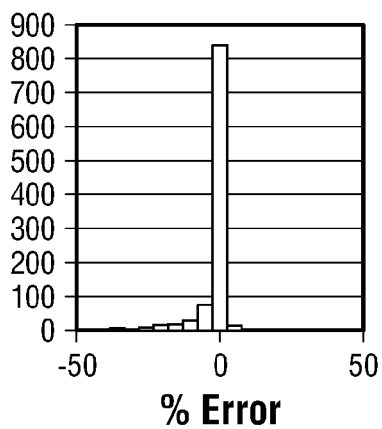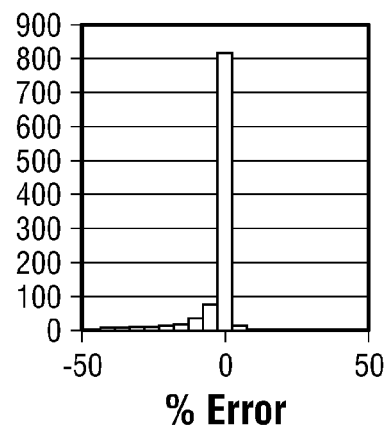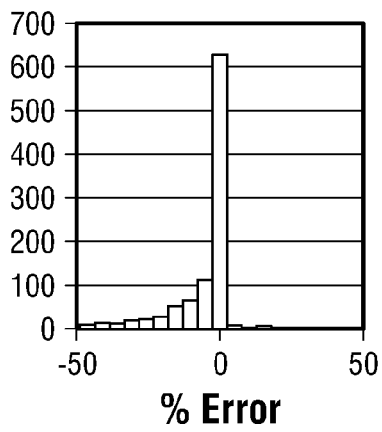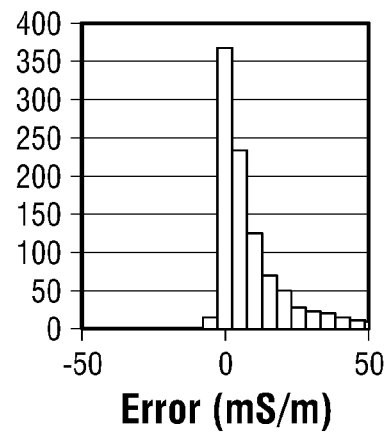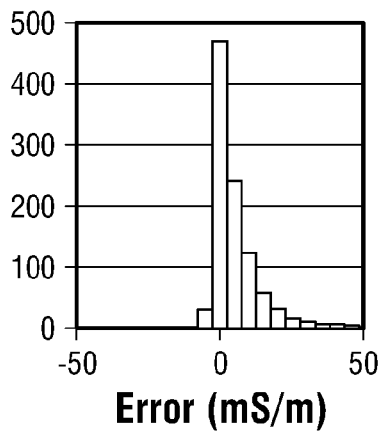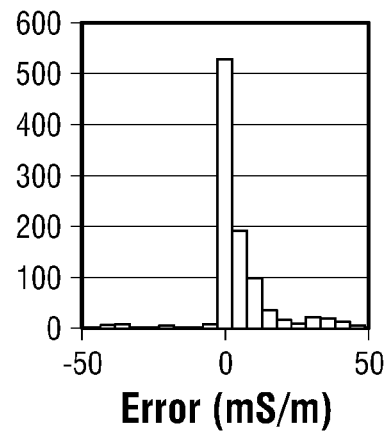
*FIG. 12-3D*

DETERMINING BOREHOLE CORRECTED FORMATION PROPERTIES

This application is a continuation of U.S. patent application Ser. No. 12/597,977 filed on Apr. 6, 2010, now U.S. Pat. No. 8,571,797.

TECHNICAL FIELD

The present invention relates in general to the field of measuring properties of downhole environments and, more specifically, to resistivity tool analysis.

BACKGROUND

Resistivity tools are used in the oil and gas industry to determine the resistivity of earth formations surrounding a borehole. Conventional induction tools, for example, work by using a transmitting coil (transmitter) to set up an alternating magnetic field in the earth formations. This alternating magnetic field induces eddy currents in the formations. One or more receiving coils (receivers), disposed at a distance from the transmitter, detect the current flowing in the earth formation. The magnitudes of the received signals are proportional to the formation conductivity. Therefore, formation conductivities may be derived from the received signals.

However, the existence of a borehole complicates the derivation of formation conductivity from the received signals. The most prevalent complication that affects the derivation of formation conductivity from the received signals arises from the presence of drilling fluids in the borehole surrounding the induction instrument. This is referred to generally as the borehole effects. Often, the fluids in the borehole (drilling mud) are made very saline, thus conductive, as part of the drilling practice. The conductive drilling muds can contribute a significant proportion of the received signals and, therefore, should be carefully removed.

In addition, tool properties may affect the measurements conductivity tensor. The effects of the borehole and tool properties on the measured conductivity tensor may be very significant, even in a highly resistive, oil base mud (OBM) environment. Unless the borehole/tool effects are removed or otherwise compensated for, it is hard to use or interpret the measurements to infer formation properties.

SUMMARY

A method for correcting formation properties due to effects of a borehole is disclosed. The method includes obtaining voltage measurements using a logging tool disposed in a borehole penetrating a subsurface formation and using a processor to: determine a tensor for the formation using the voltage measurement, for a given set of parameters, determine, based upon the voltage measurements, a parameter value for each parameter in a subset of the set of parameters, compute a borehole-inclusive modeled tensor that includes the effects of the borehole using the parameter values, optimize the parameter values using the determined tensor and the borehole-inclusive tensor, compute an optimized tensor using the optimized parameter values, compute a borehole corrected tensor using the optimized tensor, and determine at least one borehole corrected formation property using at least one of the borehole corrected tensor or the optimized parameter values.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIGS. 1-1 and 1-2 are illustrations of a prior art tri-axial induction array and associated measurements at a given spacing.

FIG. 2 is an illustration of an eccentered tool in a borehole through an anisotropic formation at a relative dip angle.

FIG. 4-1 (includes FIGS. 4-1A-4-1I) shows modeled responses for various spacings in an OBM borehole passing through an anisotropic formation with dip and varying dip azimuth, and in which the tool is centered in the borehole.

FIG. 4-2 (includes FIGS. 4-2A-4-2I) shows modeled responses for various spacings in an OBM borehole passing through an anisotropic formation with dip and varying dip azimuth, and in which the tool is eccentered in the borehole ($\psi=0$).

FIG. 4-3 (includes FIGS. 4-3A-4-3I) shows modeled responses for various spacings in an OBM borehole passing through an anisotropic formation with dip and varying dip azimuth, and in which the tool is eccentered in the borehole ($\psi=90$).

FIG. 4-4 (includes FIGS. 4-4A-4-4I) shows modeled responses for various spacings in an OBM borehole passing through an anisotropic formation with dip and varying dip azimuth, and in which the tool is eccentered in the borehole ($\psi=180$).

FIG. 4-5 (includes FIGS. 4-5A-4-5I) shows modeled responses for various spacings in an OBM borehole passing through an anisotropic formation with dip and varying dip azimuth, and in which the tool eccentered in the borehole ($\psi=270$).

FIG. 4-6 is a graph in which the estimated dip azimuth is plotted against the actual dip azimuth of the model for a centered tool.

FIG. 5-1 (includes FIGS. 5-1A-5-1F) is a plot of the sum and difference of the off-diagonal pairs of modeled responses for various spacings in an OBM borehole passing through an anisotropic formation with dip and varying dip azimuth, and in which the tool is centered in the borehole.

FIG. 5-2 (includes FIGS. 5-2A-5-2F) is a plot of the sum and difference of the off-diagonal pairs of modeled responses for various spacings in an OBM borehole passing through an anisotropic formation with dip and varying dip azimuth, and in which the tool is eccentered in the borehole ($\psi=0$).

FIG. 5-3 (includes FIGS. 5-3A-5-3F) is a plot of the sum and difference of the off-diagonal pairs of modeled responses for various spacings in an OBM borehole passing through an anisotropic formation with dip and varying dip azimuth, and in which the tool is eccentered in the borehole ($\psi=90$).

FIG. 5-4 (includes FIGS. 5-4A-5-4F) is a plot of the sum and difference of the off-diagonal pairs of modeled responses for various spacings in an OBM borehole passing through an anisotropic formation with dip and varying dip azimuth, and in which the tool is eccentered in the borehole ($\psi=180$).

FIG. 5-5 (includes FIGS. 5-5A-5-5F) is a plot of the sum and difference of the off-diagonal pairs of modeled responses for various spacings in an OBM borehole passing through an anisotropic formation with dip and varying dip azimuth, and in which the tool is eccentered in the borehole ($\psi=270$).

FIG. 6-1 (includes FIGS. 6-1A-6-1D) is a set of plots in which the estimated dip azimuth obtained using an embodiment of the present invention is plotted against the actual dip azimuth for four values $\psi$.

FIG. 6-2A shows a formation model and FIGS. 6-2B-6-2J show the associated modeled responses of a tool passing through anisotropic beds having significant resistivity contrast with arbitrary dip and dip azimuth angles.

FIG. 6-3 is a plot showing the estimation of formation dip azimuth angle $\Phi$ from a tool passing through three anisotropic beds.

FIG. 7-1 is an illustration showing the parameters used to determine the tool eccentering azimuth angle.

FIG. 7-2 (includes FIGS. 7-2A-7-2L) is a set of graphs showing the eccentering azimuth angles computed using model data for various tri-axial induction array spacings and dip azimuth equal to zero degrees.

FIG. 7-3 (includes FIGS. 7-3A-7-3L) is a set of graphs showing the eccentering azimuth angles computed using model data for various tri-axial induction array spacings and dip azimuth equal to 90 degrees.

FIG. 7-4 (includes FIGS. 7-4A-7-4L) is a set of graphs showing the eccentering azimuth angles computed using model data for various tri-axial induction array spacings and dip azimuth equal to 180 degrees.

FIG. 7-5 (includes FIGS. 7-5A-7-5L) is a set of graphs showing the eccentering azimuth angles computed using model data for various tri-axial induction array spacings and dip azimuth equal to 270 degrees.

FIG. 8-1 is a plot showing, for a 15 inch array spacing, the $\sigma xz-\sigma zx$ and $\sigma zz$ responses as functions of $\sigma h$, $\sigma h/\sigma v$, and dip angle. The $\sigma xz-\sigma zx$ are plotted as solid lines and $\sigma zz$ are plotted as dots.

FIG. 8-2 is a graph of $\sigma xz-\sigma xz$ as function of eccentering distance for an OBM borehole through an anisotropic formation with arbitrary dip and azimuth.

FIG. 12-1 (includes FIGS. 12-1A-12-1I) are example comparisons between conductivity tensors from a forward engine versus independently modeled conductivity tensors for all 6 tri-axial measurement spacings from 15 inches to 72 inches as a function of 1/Rh (SIGh). The values of the model parameters used in this example are all at the middle of the grid point of the borehole correction (BHC) database.

FIG. 12-2 (includes FIGS. 12-2A-12-2I) are example comparisons between conductivity tensors from a forward engine versus independently modeled conductivity tensors for all 6 tri-axial measurement spacings from 15 inches to 72 inches as the formation dip azimuthal angle (AZ) varies from 0 to 360 degree in steps of 11.25 degrees. The tool is eccentered by 3-inch in the direction 30 degrees from the borehole x-axis direction.

FIGS. 12-3A-12-3D graphically illustrate examples of statistics of the interpolation errors of the forward engine from about 1000 test cases with off-grid model parameter values: FIG. 12-3A is the XX component from 15 inch, 27 inch, and 54 inch spacings; FIG. 12-3B is the YY component from 15 inch, 27 inch, and 54 inch spacings; FIG. 12-3C is the ZZ component from 15 inch, 27 inch, and 54 inch spacings; and FIG. 12-3D is the XZ component from 15 inch, 27 inch, and 54 inch spacings.

FIG. 14-1 (includes FIGS. 14-1A-14-1C) illustrates examples of borehole correction processing results using off-grid noiseless theoretical model data. The borehole correction outputs are compared with the known model parameter results. FIG. 14-1A is for Rh and Rv. FIG. 14-1B is for dip angle and decc. FIG. 14-1C is for formation azimuth (AZF) and tool eccentering azimuth (AZT).

FIG. 14-2 (includes FIGS. 14-2A-14-2C) illustrates examples of borehole correction processing results using off-grid theoretical model data with simulated random noise added. The borehole correction outputs are compared with the known model parameter results. FIG. 14-2A shows Rh and Rv. FIG. 14-2B shows dip angle and decc. FIG. 14-2C shows formation azimuth (AZF) and tool eccentering azimuth (AZT).

DETAILED DESCRIPTION

Figure 3:
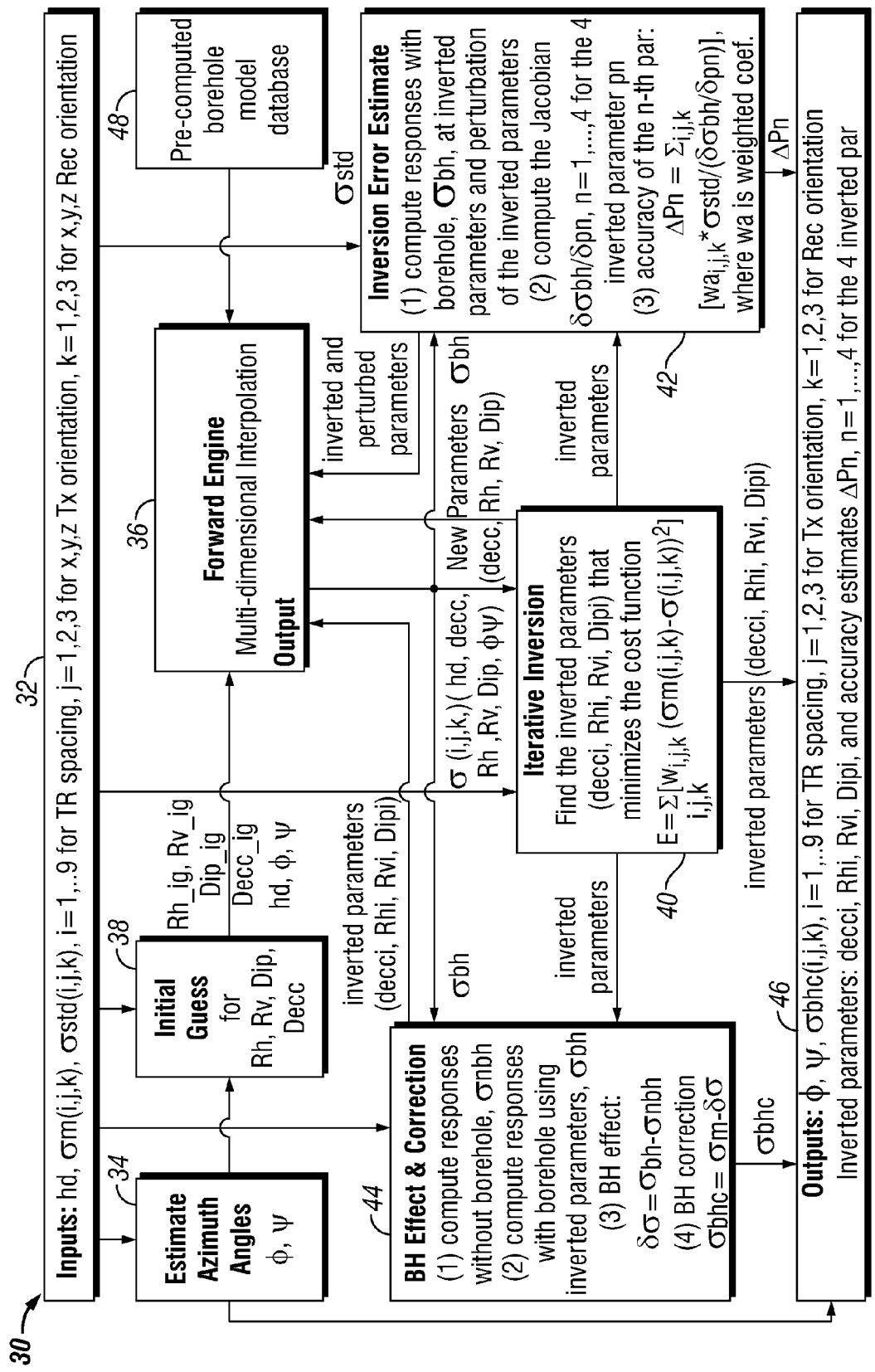
FIG. 3 is a block diagram of an example of a borehole correction method within the scope of the present invention.

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are utilized to more clearly describe some elements of the embodiments of the invention. Commonly, these terms relate to a reference point as the surface from which drilling operations are initiated as being the top point and the total depth of the well being the lowest point.

Figures 1, 7:
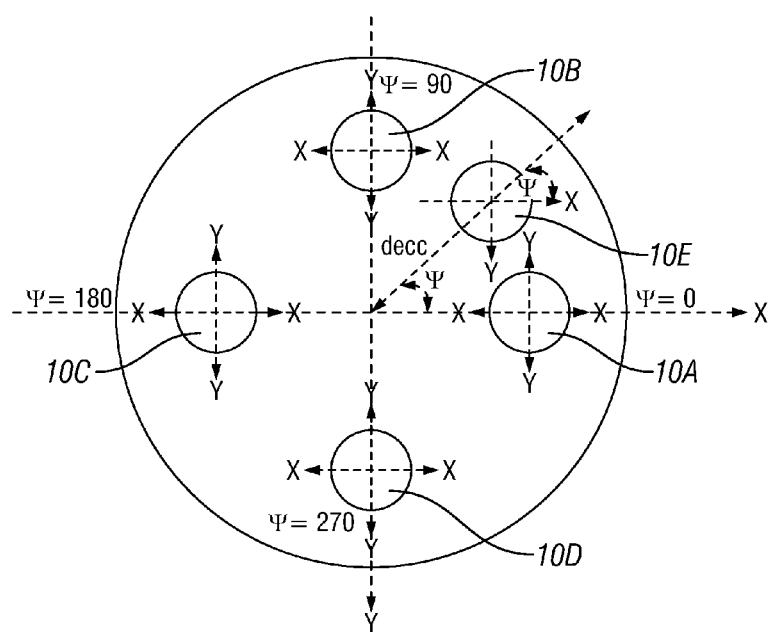
Figures 2A, 7:
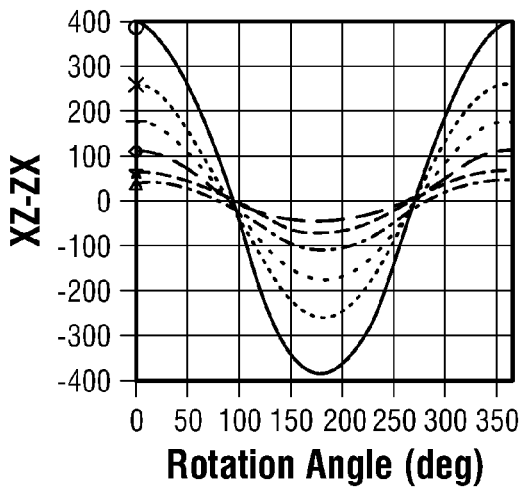
Figures 2B, 7:
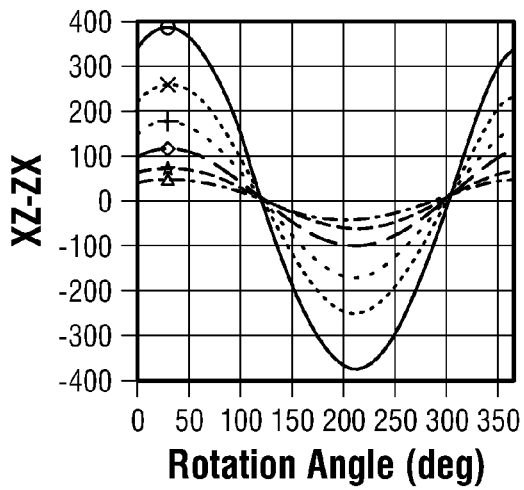
Figures 2C, 7:
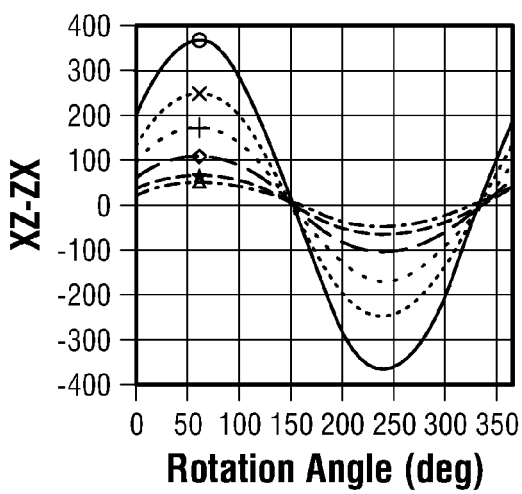
Figures 2D, 7:
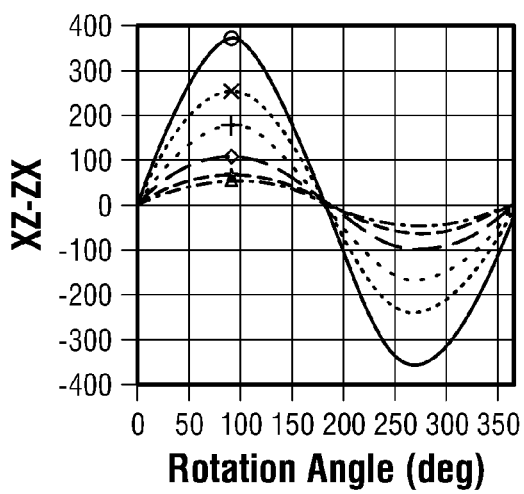
Figures 2E, 7:
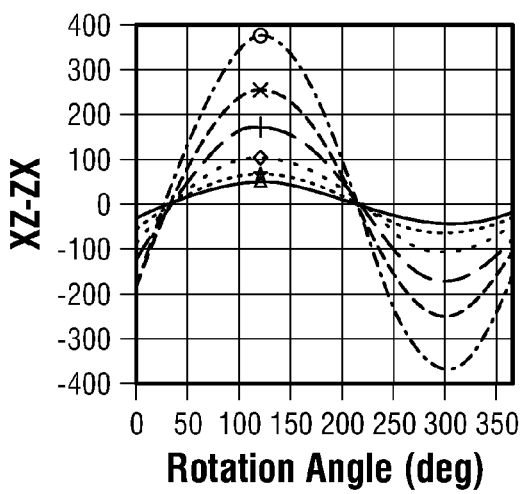
Figures 2F, 7:
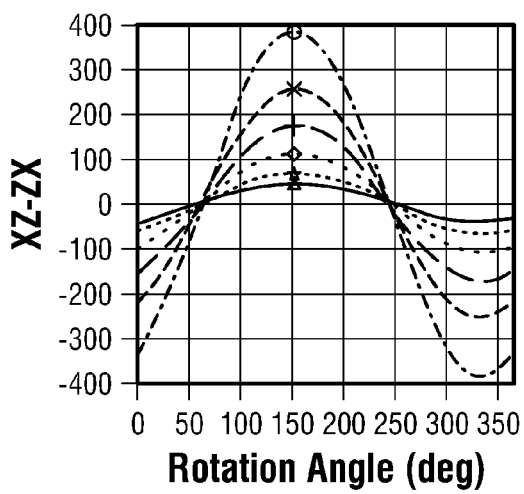
Figures 2G, 7:
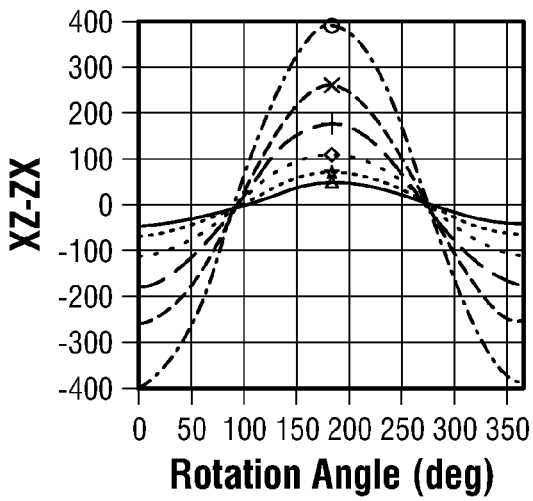
Figures 2H, 7:
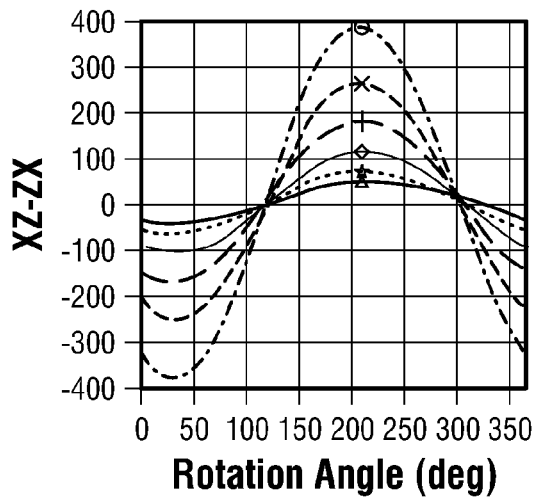
Figures 2I, 7:
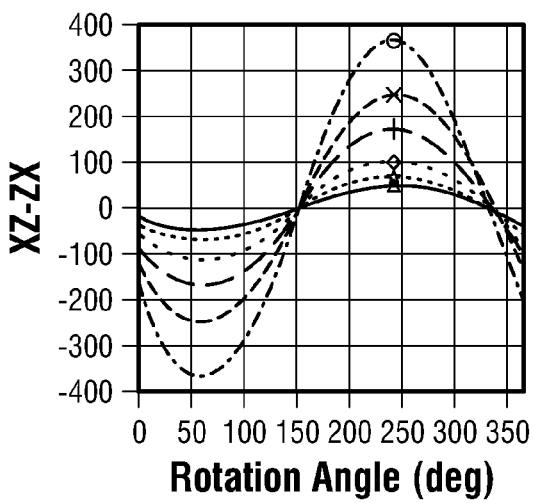
Figures 2J, 7:
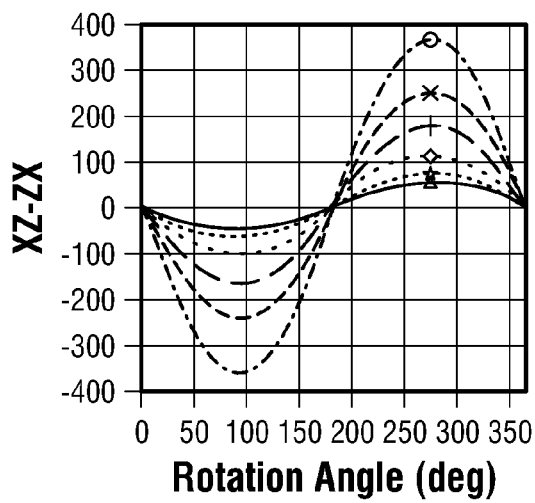
Figures 2K, 7:
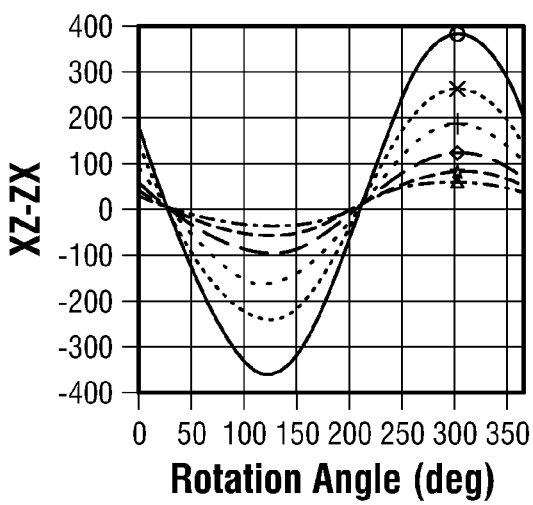
Figures 2L, 7:
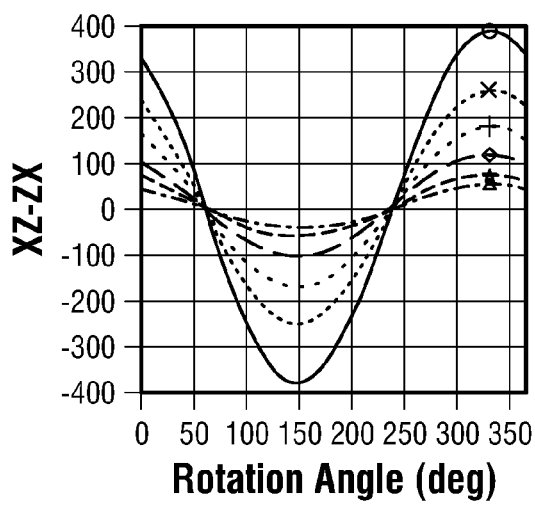
Figures 3A, 7:
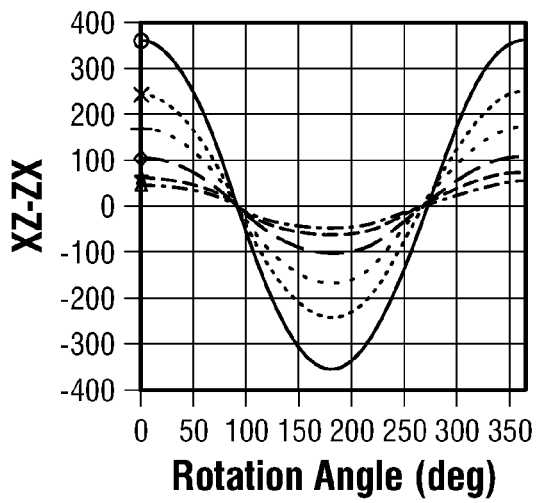
Figures 3B, 7:
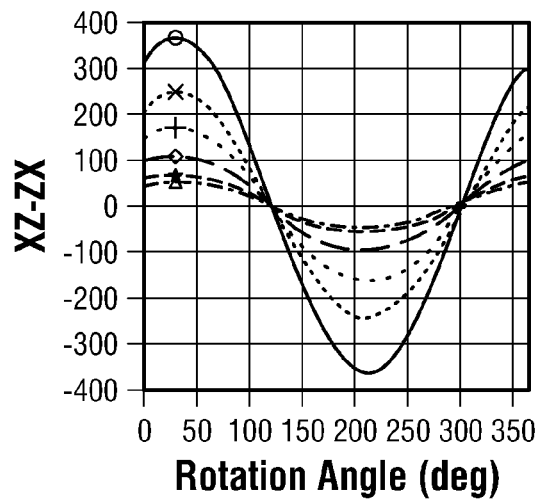
Figures 3C, 7:
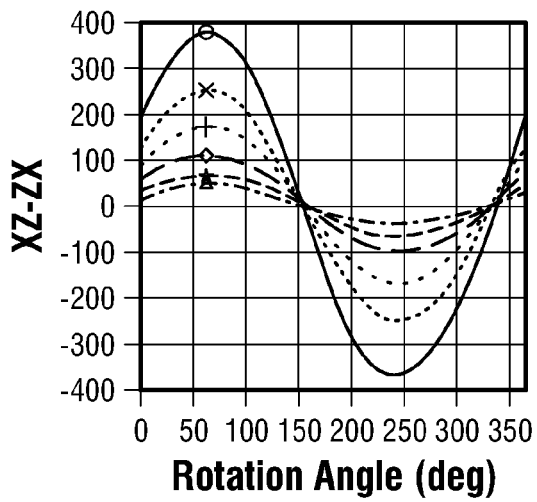
Figures 3D, 7:
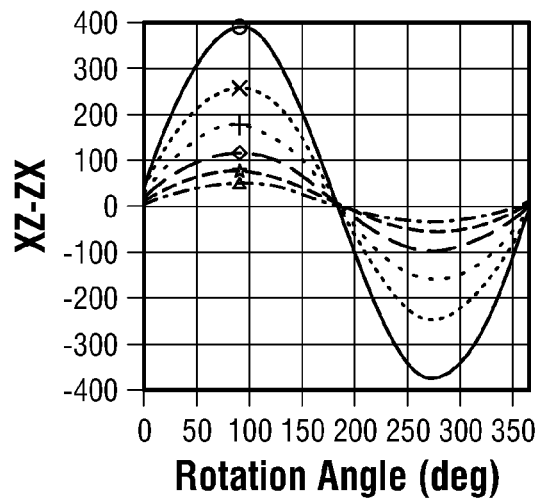
Figures 3E, 7:
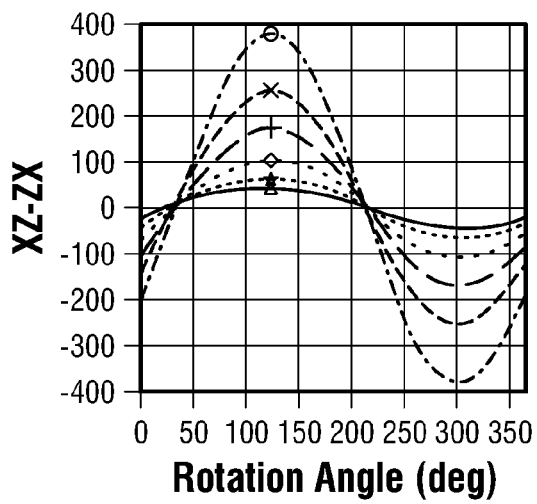
Figures 3F, 7:
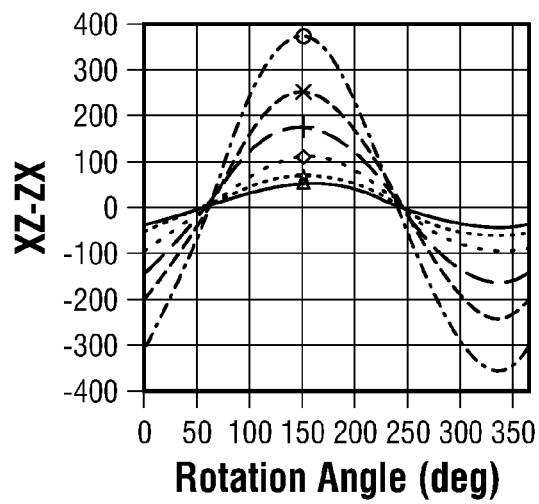
Figures 3G, 7:
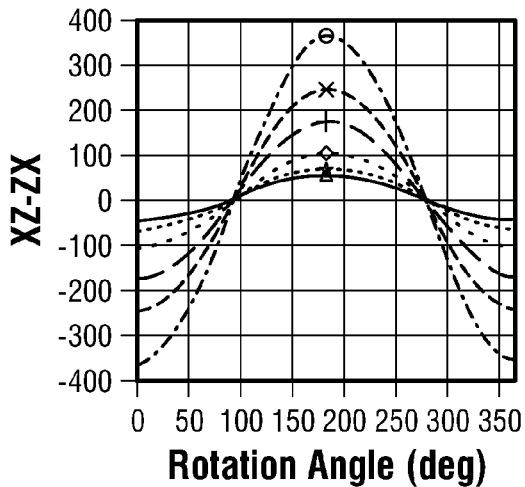
Figures 3H, 7:
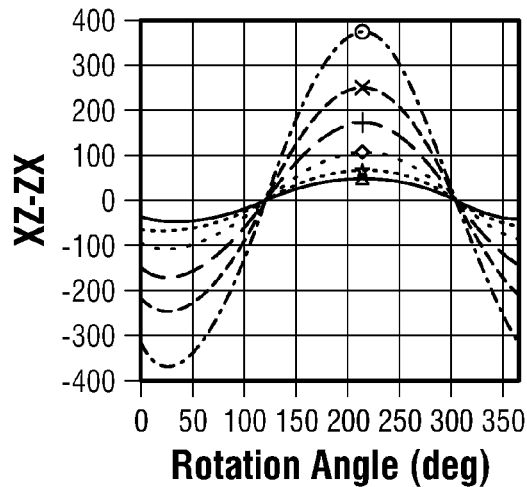
Figures 3I, 7:
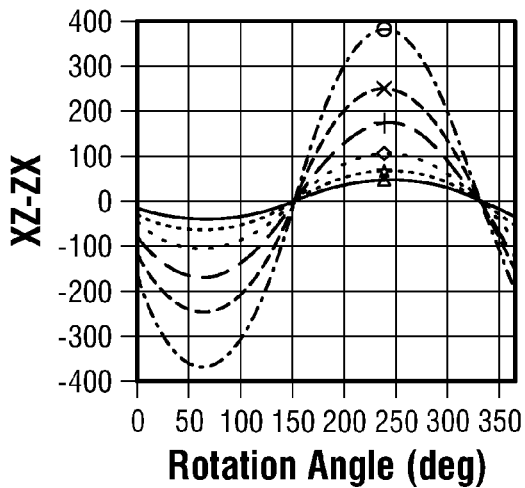
Figures 3J, 7:
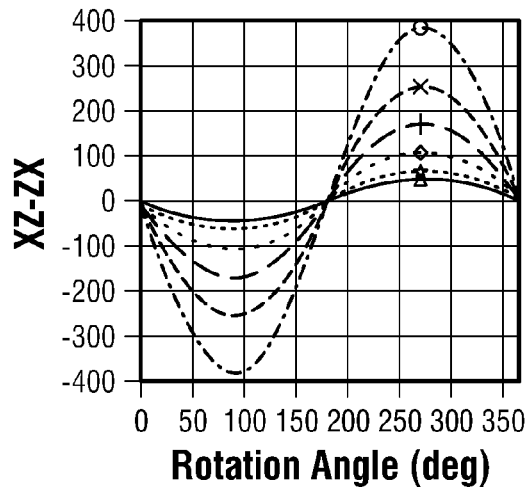
Figures 3K, 7:
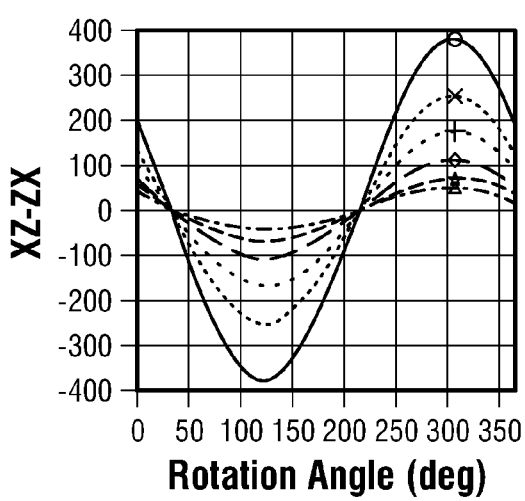
Figures 3L, 7:
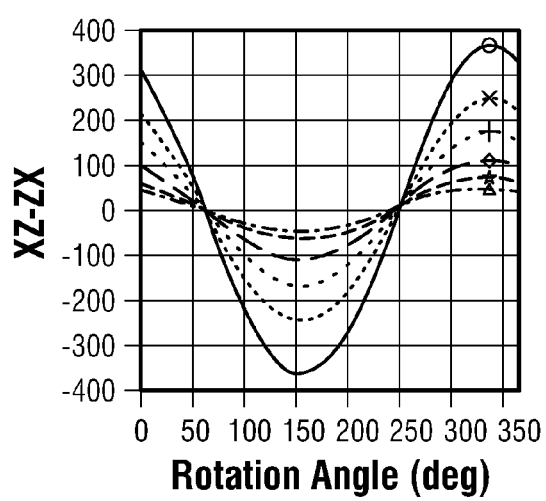
Figures 4A, 7:
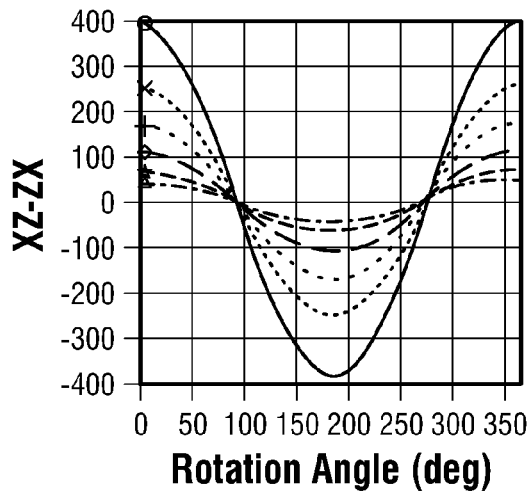
Figures 4B, 7:
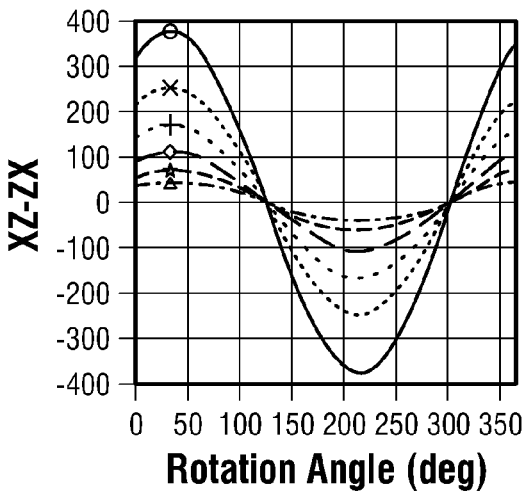
Figures 4C, 7:
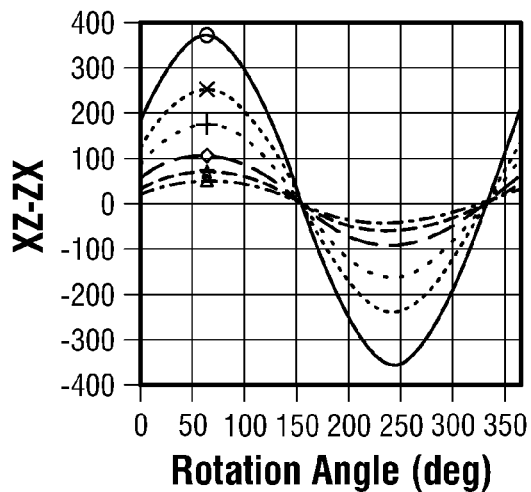
Figures 4D, 7:
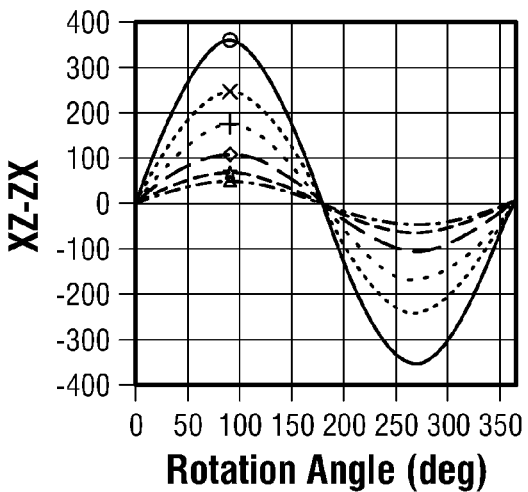
Figures 4E, 7:
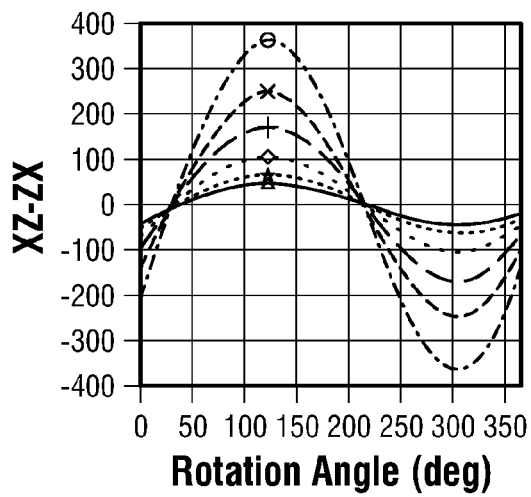
Figures 4F, 7:
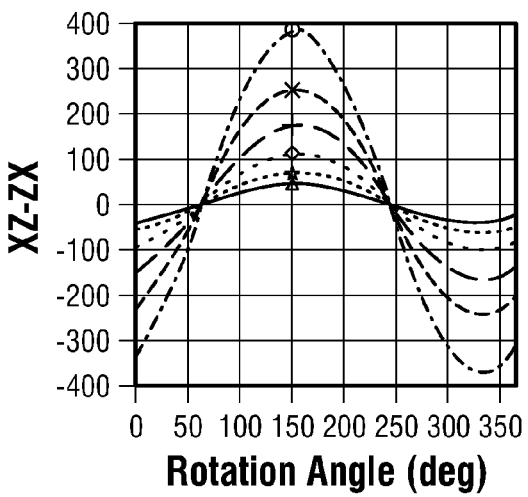
Figures 4G, 7:
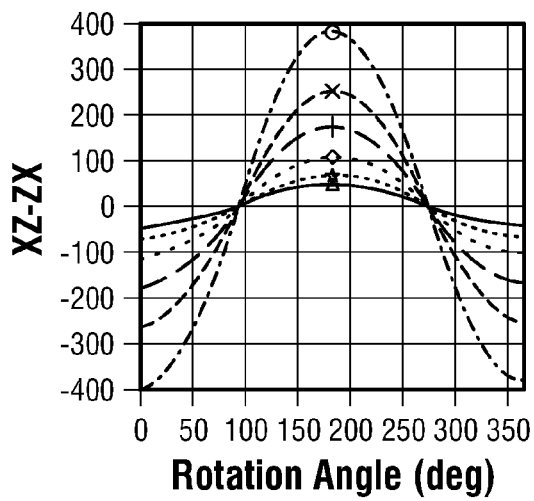
Figures 4H, 7:
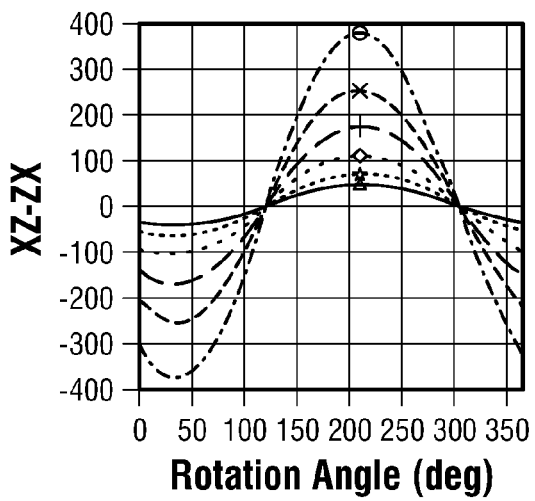
Figures 4I, 7:
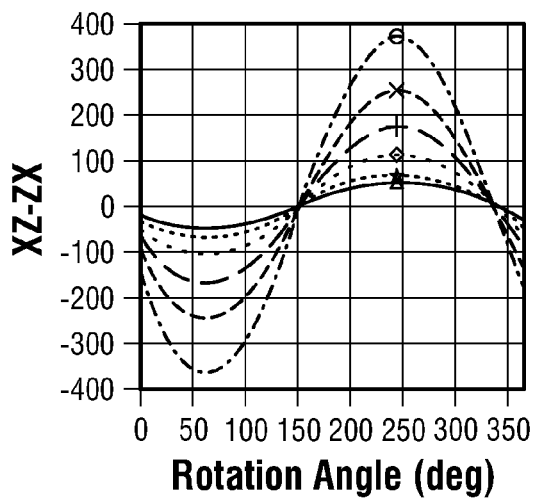
Figures 4J, 7:
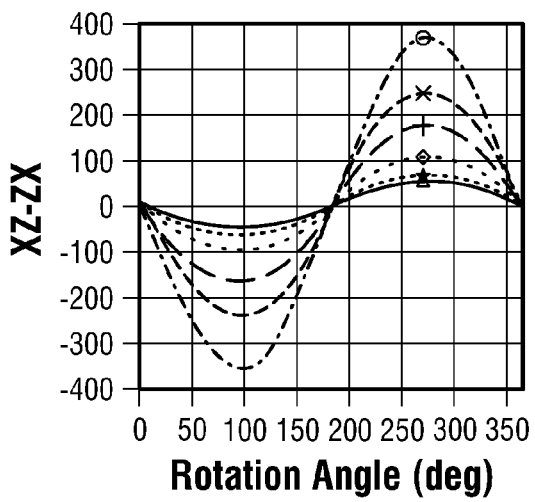
Figures 4K, 7:
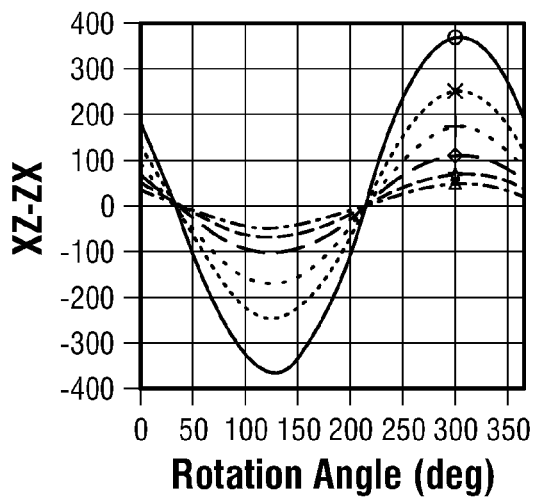
Figures 4L, 7:
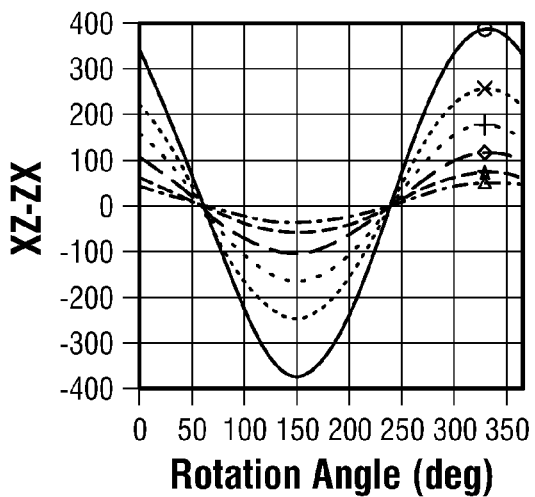
Figures 5A, 7:
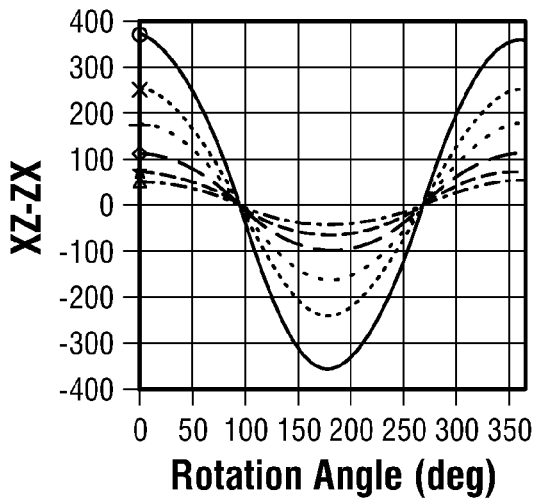
Figures 5B, 7:
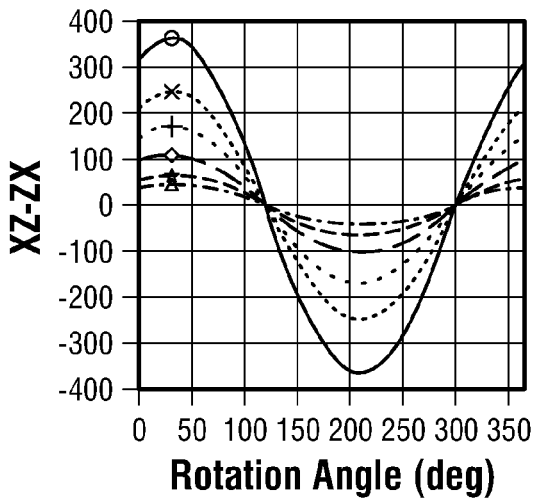
Figures 5C, 7:
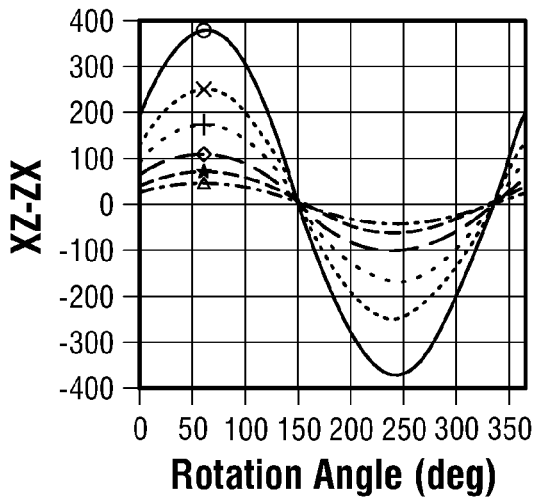
Figures 5D, 7:
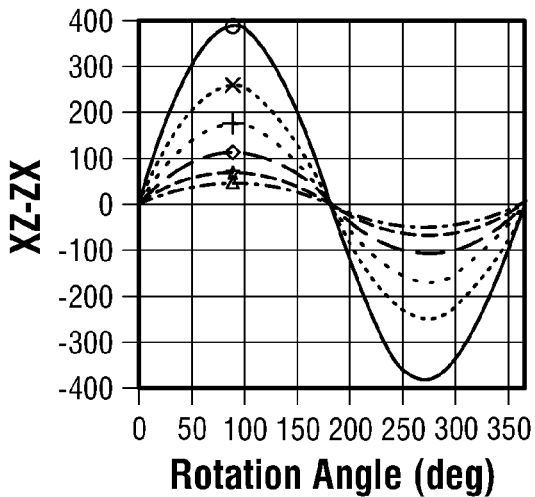
Figures 5E, 7:
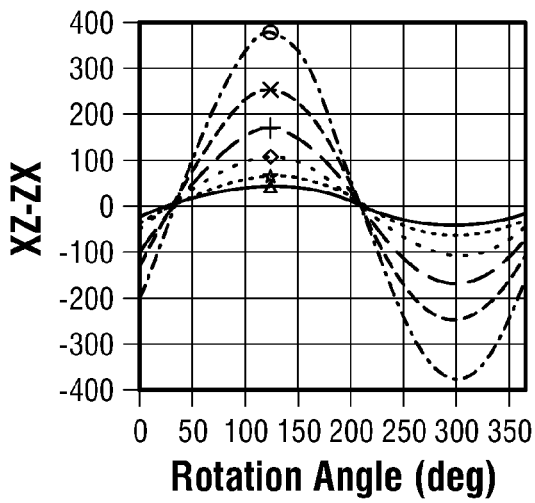
Figures 5F, 7:
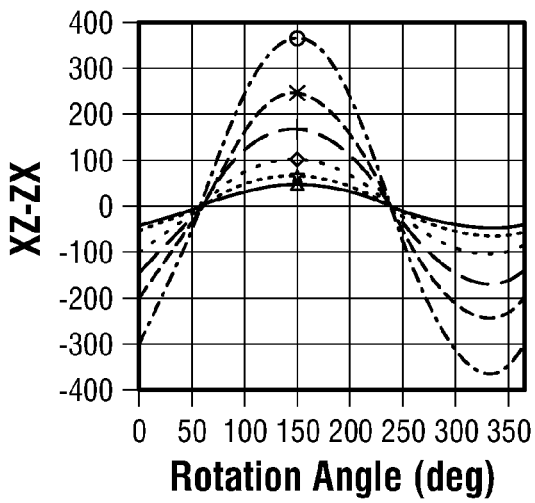
Figures 5G, 7:
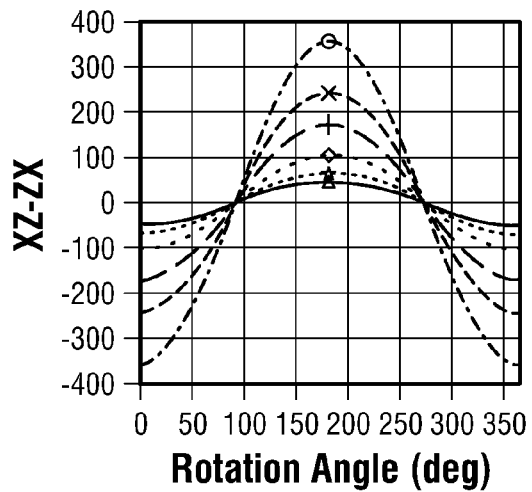
Figures 5H, 7:
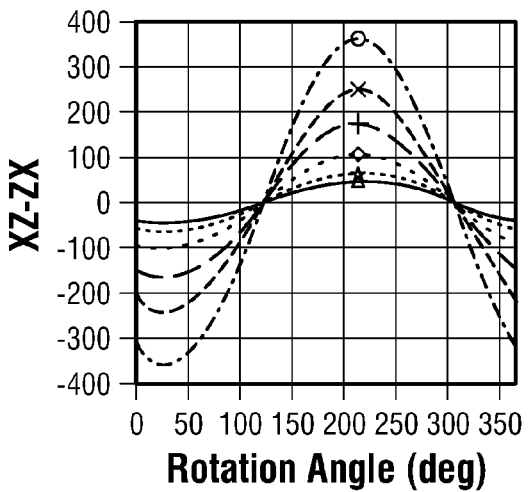
Figures 5I, 7:
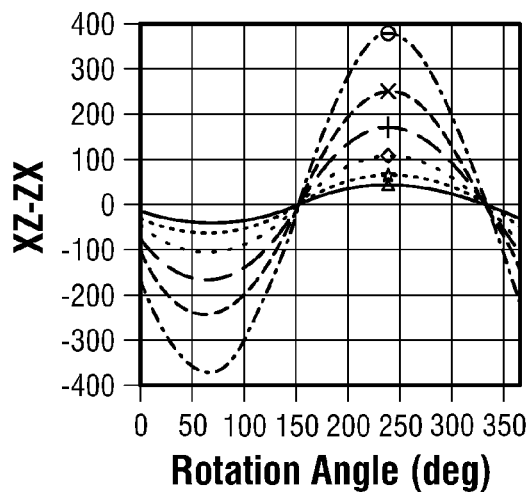
Figures 5J, 7:
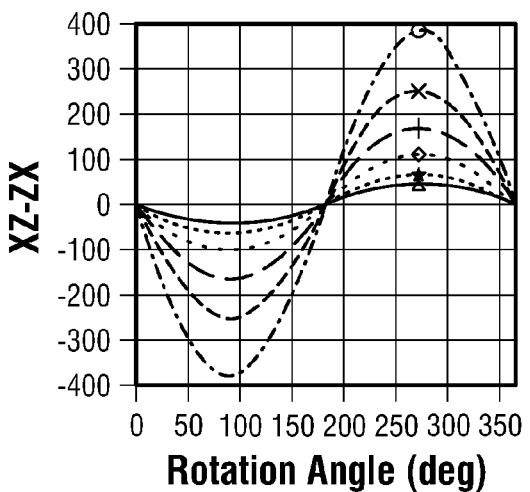
Figures 5K, 7:
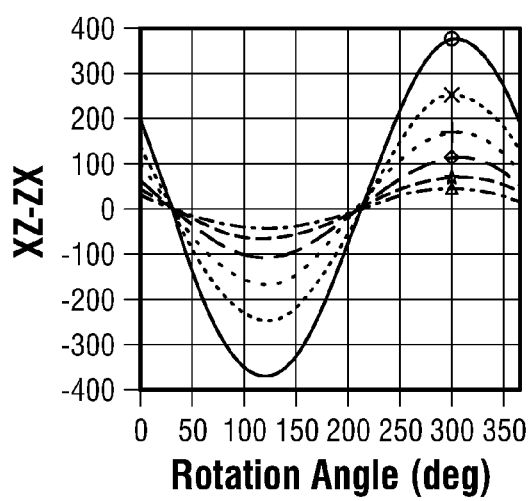
Figures 5L, 7:
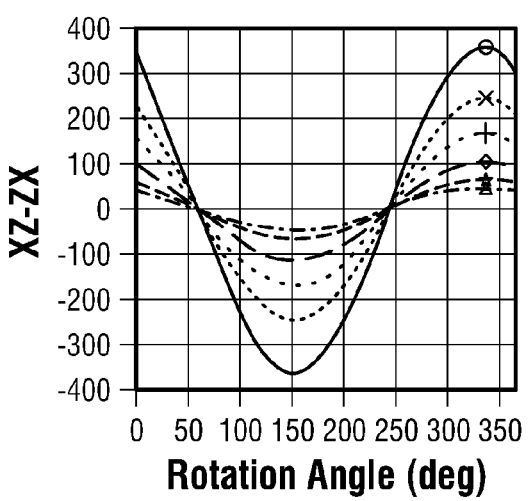

FIG. 1-1 is an example of a 3D tri-axial induction tool, indicated generally by numeral 10, comprising transmitter 12, balancing receiver 14 and main receiver 16, wherein the antennas are represented by their respective dipole moments. A 3D tri-axial induction tool measures voltages from which a nine component apparent conductivity tensor ($\sigma m(j, k)$, j, $k=1, 2, 3$) at a given transmitter/receiver spacing, may be obtained. The indices j and k represent the transmitter and receiver orientations, respectively. For example, j=1, 2, 3 corresponds to the transmitter coil orientation in the x, y, z, directions, respectively. Different tensors may be obtained for different transmitter/receiver spacings, and different spacings may be identified herein using the subscript i.

Figures 1, 8:
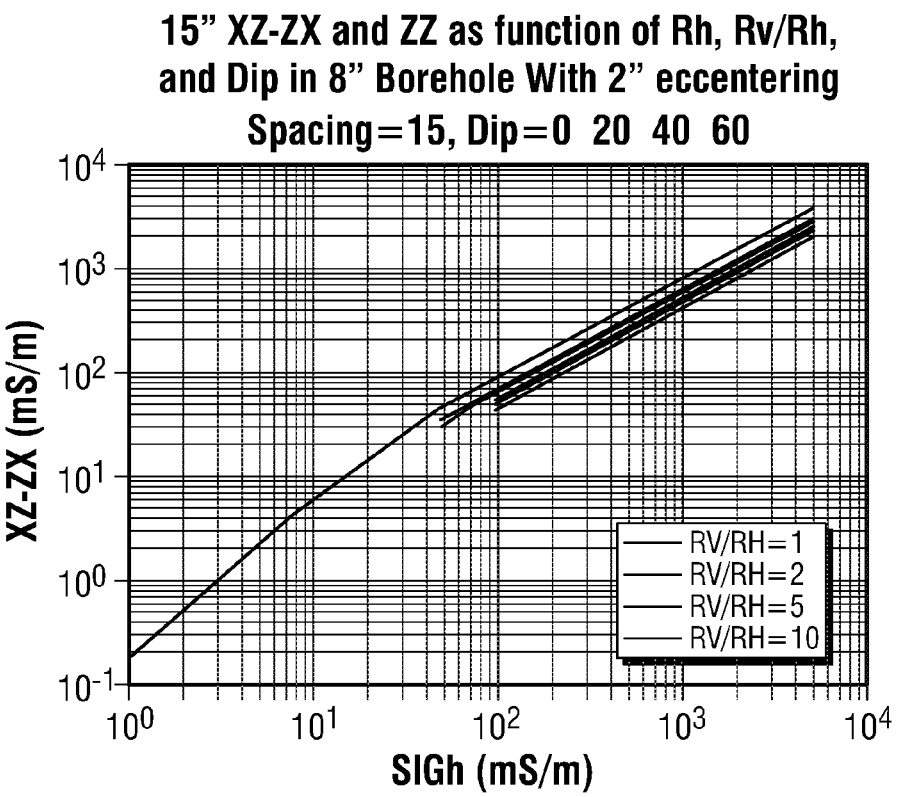
Figures 2, 8:
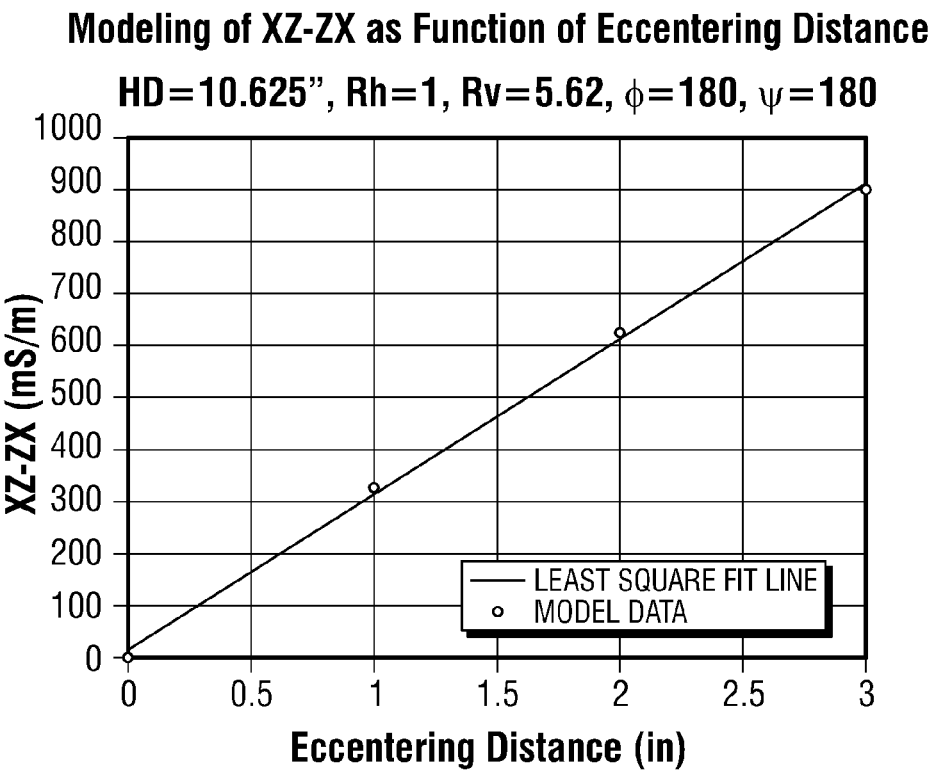

FIG. 1-2 shows an example of a tri-axial measurement matrix, wherein the first subscript corresponds to the transmitter orientation and the second subscript corresponds to the receiver orientation. These measurements are usually obtained in frequency domain by firing the transmitter with a continuous wave (CW) of a given frequency to enhance the signal-to-noise ratio. However, measurements of the same information content could also be obtained and used from time domain signals through a Fourier decomposition process e.g., frequency-time duality. Formation properties, such as horizontal and vertical conductivities ($\sigma h$, $\sigma v$), relative dip angle ($\theta$) and the dip azimuthal angle ($\Phi$), as well as borehole/tool properties, such as mud conductivity ($\sigma mud$), hole diameter (hd), tool eccentering distance (decc), tool eccentering azimuthal angle ($\psi$), all affect these conductivity tensors.

FIG. 2 illustrates an example of eccentered tool 10 in a borehole 20 through an anisotropic formation 22 with a dip angle. Using a simplified model of layered anisotropic formation traversed obliquely by a borehole, the response of the conductivity tensors depends on the above 8 parameters (σh, σv, θ, Φ, σmud, hd, decc, ψ) in a complex manner. The effects of the borehole/tool to the measured conductivity tensors may be very large even in oil base mud (OBM) environment. Without removing the borehole/tool effects, it may be difficult to use or interpret the measurements to determine formation properties. An embodiment of the presently disclosed method allows for an estimate of formation parameters (σh, σv, θ, and Φ) in substantially real-time. The borehole correction method accounts for the effects of the borehole filled with OBM and the tool 10 being eccentered in the borehole 20 at an arbitrary eccentering distance and eccentering azimuth (decc, ψ). The borehole correction method removes the effects of the borehole and/or tool from the raw conductivity tensor measurements and yields a "borehole corrected" conductivity tensor (σbhc).

One method to account for the effects of the borehole and tool and obtain the formation properties (σh, σv, θ, Φ) from the measured apparent conductivity tensors is multi-dimensional parametric inversion, to search for values of formation/borehole parameters that best match the model responses to the measured ones. Because the presently disclosed system and method effectively reduces the number of free parameters that must be inverted, time and resource savings are had because there is no need to invert for 8 free parameters at every frame of the log data.

FIG. 3 is a block diagram of an example of a borehole correction method of the present invention, generally indicated by the numeral 30. The inputs 32 include the measured conductivity tensor, $\sigma_m$, which may be pre-rotated to certain reference frame, such as top-of-the-hole (TOH) or north (NAZ). The pre-rotation will make the output azimuthal angles (Φ and ψ) referenced to a stationary reference frame to facilitate interpretation. Other inputs 32 include hole diameter (hd) and standard deviation of the sonde error measurements, $\sigma_{std}$, which are used to set the weights, $w_{i,j,k}$, in the inversion and also used in estimation of the inversion accuracy. The hole diameter (hd) inversion may not be needed where a caliper measurement is available. In case the caliper measurement is not available, the method may be adjusted to invert for one more free parameter, the hole diameter (hd) (which may incur a slightly higher computational cost).

In step 34 the formation dip azimuth (Φ) and the tool eccentering azimuth (ψ) are estimated directly from the measured apparent conductivity tensor. Step 38 estimates a set of initial guesses for the remaining model parameters including $\sigma_h$, $\sigma_v$, θ, decc, which are needed in the final inversion. For the case of OBM with hd given by a caliper measurement, the method reduces the eight (free) parameter inversion to four ($\sigma_h$, $\sigma_v$, θ, decc) (free) parameters. This reduction in free parameters makes the inversion robust and practical. In step 36 the tool responses are determined using a forward engine. A simplified model is described with reference to FIG. 2. A robust initial guess parameter set is provided in step 38. Step 40 is an iterative process of inverting for the free parameters by searching for the minimum of a cost function, which is designed to have a minimum when the model responses (e.g., from pre-computed borehole model database 48) match the measured responses. In step 42 the errors of the inverted parameters, based on the sensitivity function determined from the model, are estimated. The accuracy estimates will be used for quality control purposes to help interpret the inverted answers. In step 44 the borehole effect and the borehole corrected signals are determined. The borehole effect is the difference between the apparent conductivity tensors obtained from the model in FIG. 2 and a model with the same formation but no borehole. The borehole effects will be subtracted from the originally measured apparent conductivity tensor to obtain the borehole corrected measurements.

The outputs 46 of borehole correction method 30 may include certain inverted model parameters (e.g., horizontal conductivity (Rhi), vertical conductivity (Rvi), relative dip angle (Dipi) and tool eccentering distance (decci)), the accuracy estimates of those four inverted parameters ($\Delta P_n$, n = 1, . . . , 4), the formation dip and tool eccentering azimuthal angles (Φ and ψ), and the borehole corrected conductivity tensor (σbhc). If hole diameter is not known, the inverted borehole diameter (hdi) will also be included in the outputs 46.

1. Borehole Correction Method
1.1 Estimation of Formation Dip Azimuth (Φ) and Tool Eccentering Distance (decc) and Azimuth (ψ)

Figures 1A, 4:
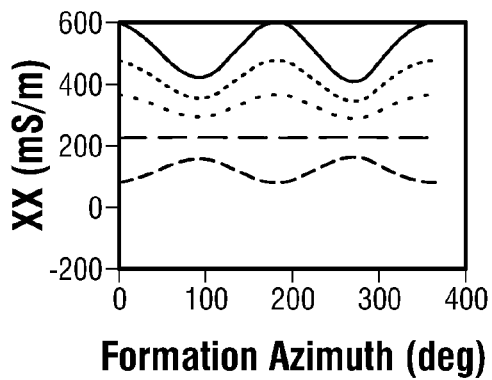
Figures 1B, 4:
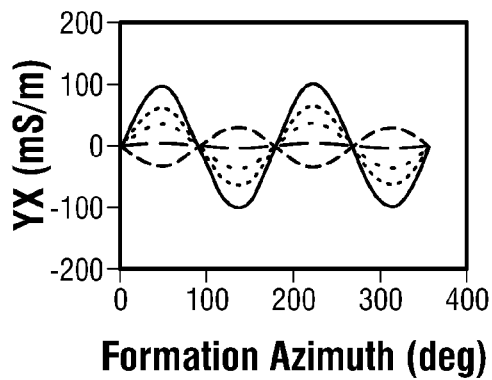
Figures 1C, 4:
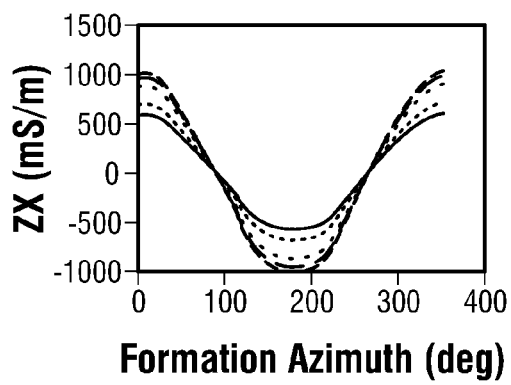
Figures 1D, 4:
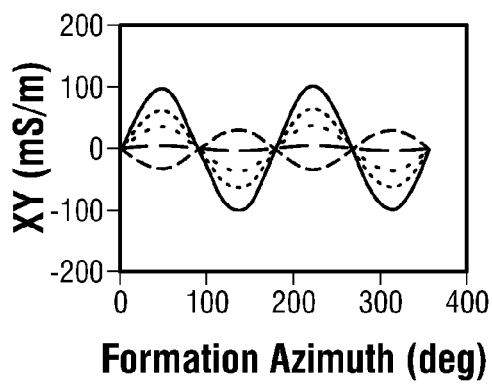
Figures 1E, 4:
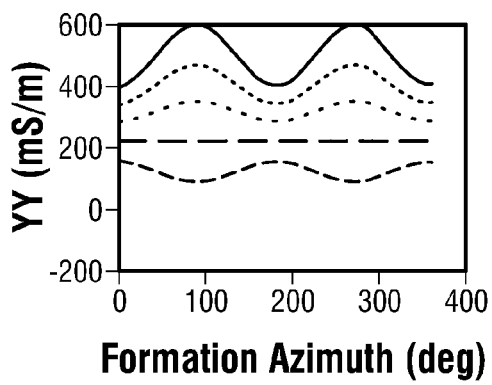
Figures 1F, 4:
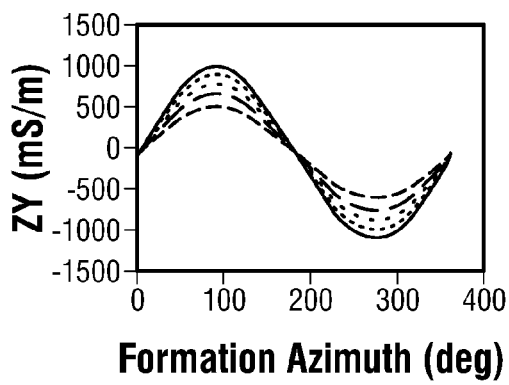
Figures 1G, 4:
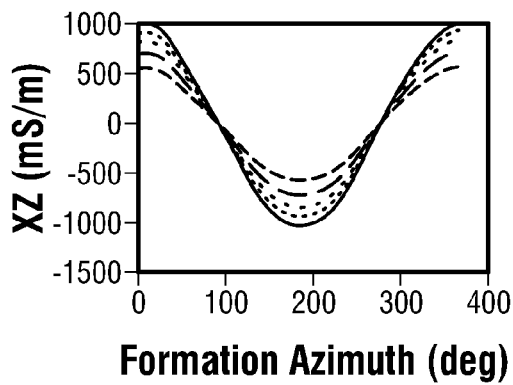
Figures 1H, 4:
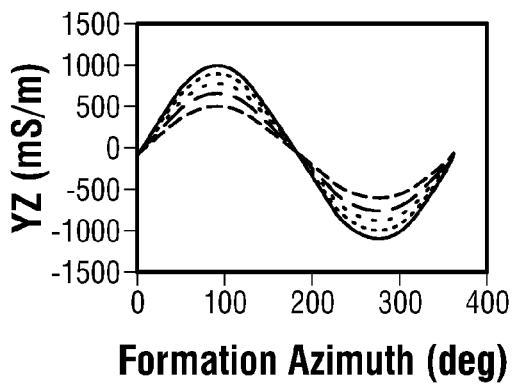
Figures 1I, 4:
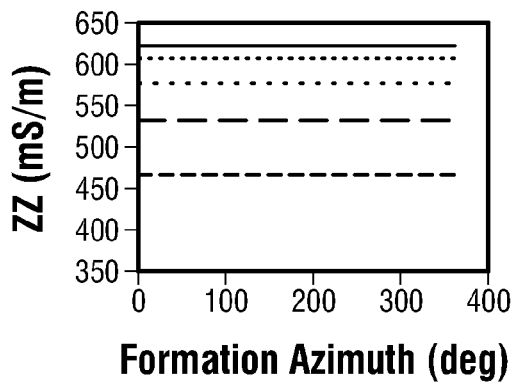
Figures 2A, 4:
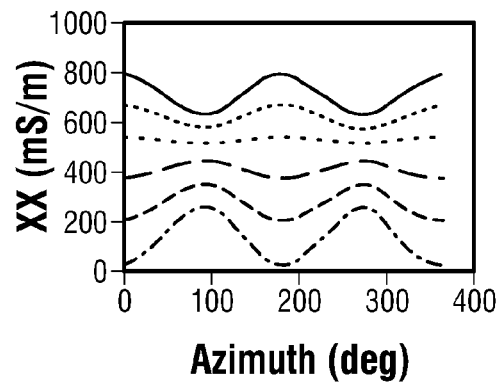
Figures 2B, 4:
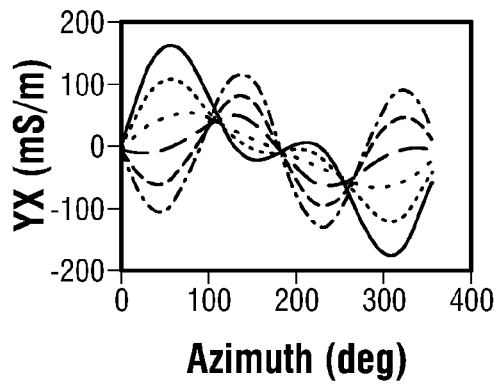
Figures 2C, 4:
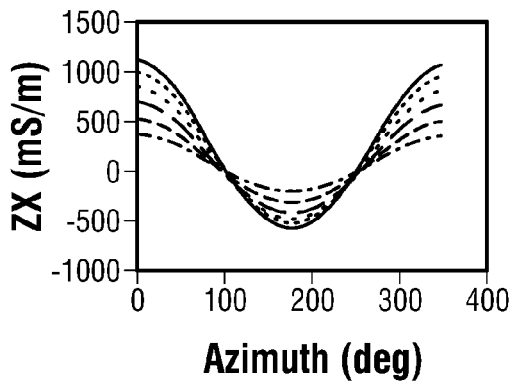
Figures 2D, 4:
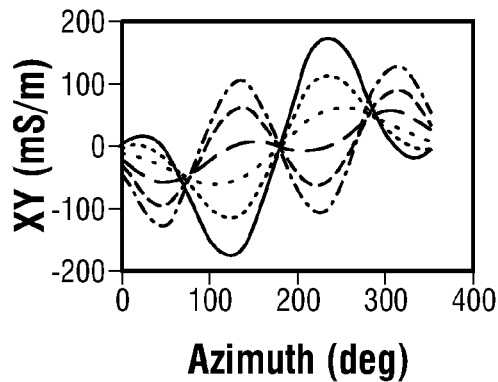
Figures 2E, 4:
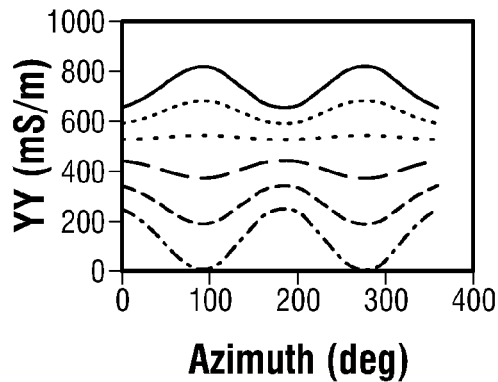
Figures 2F, 4:
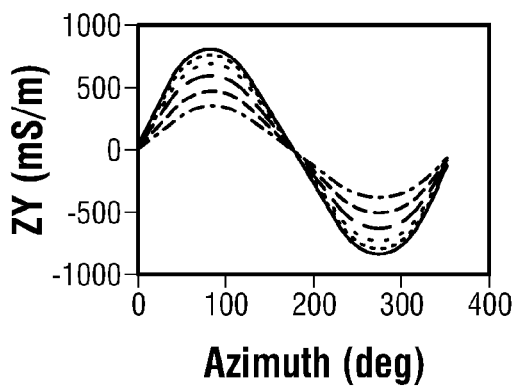
Figures 2G, 4:
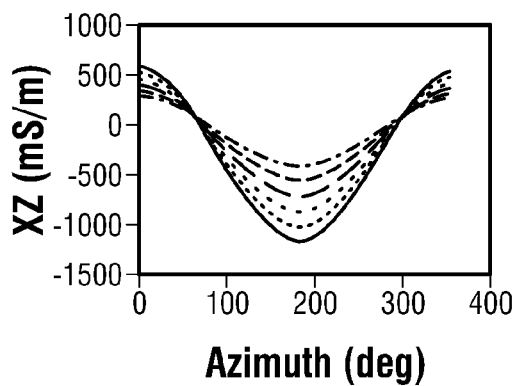
Figures 2H, 4:
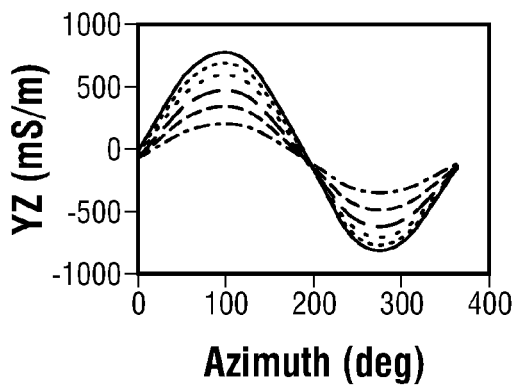
Figures 2I, 4:
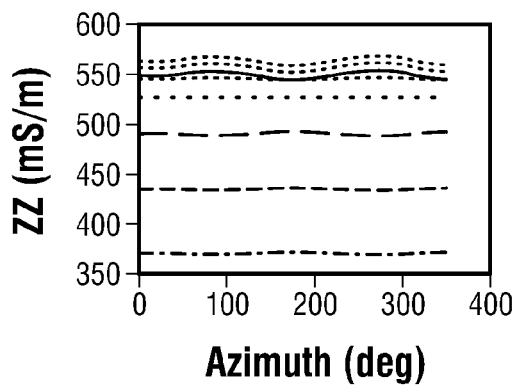
Figures 3A, 4:
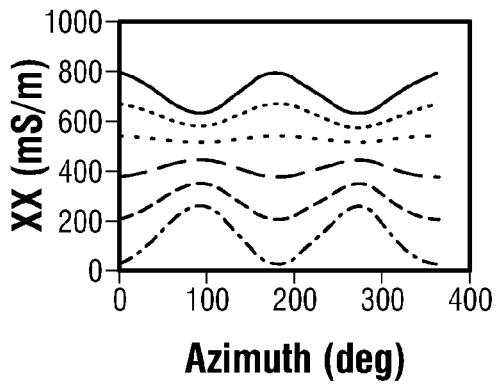
Figures 3B, 4:
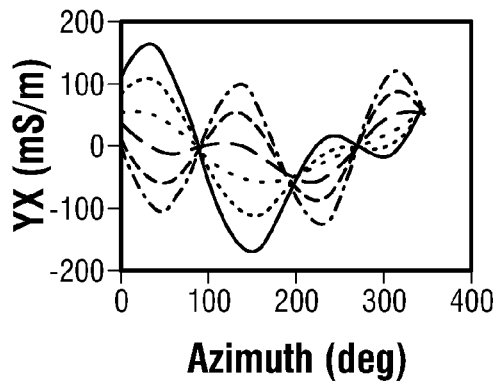
Figures 3C, 4:
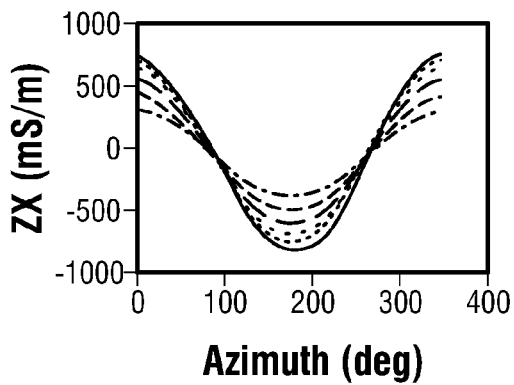
Figures 3D, 4:
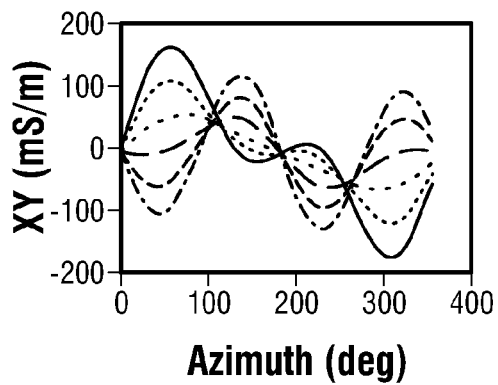
Figures 3E, 4:
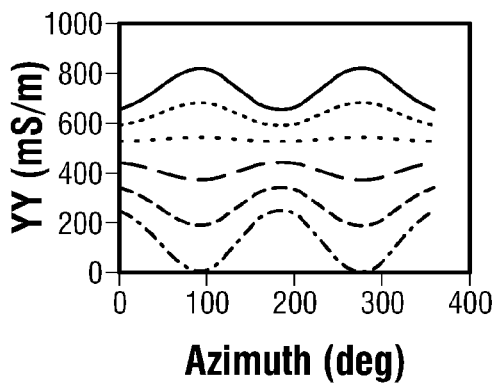
Figures 3F, 4:
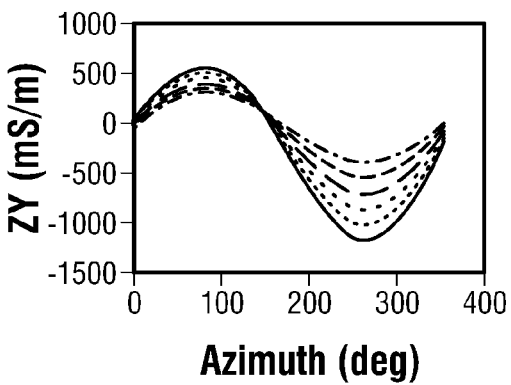
Figures 3G, 4:
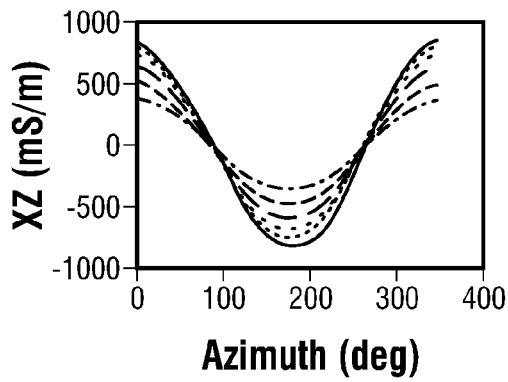
Figures 3H, 4:
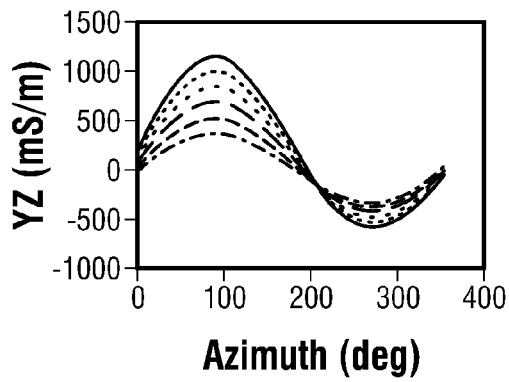
Figures 3I, 4:
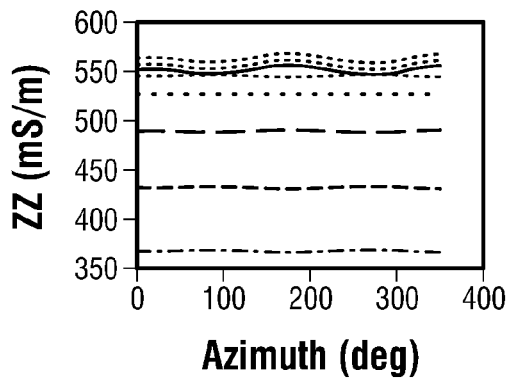
Figures 4, 4A:
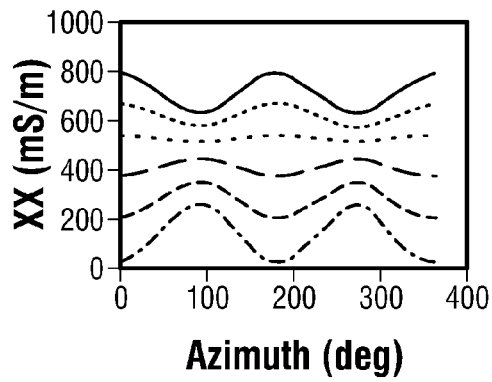
Figures 4, 4B:
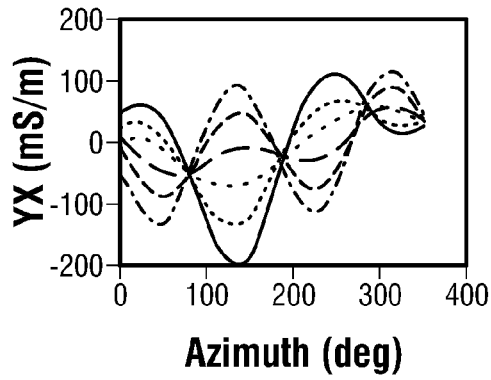
Figures 4, 4C:
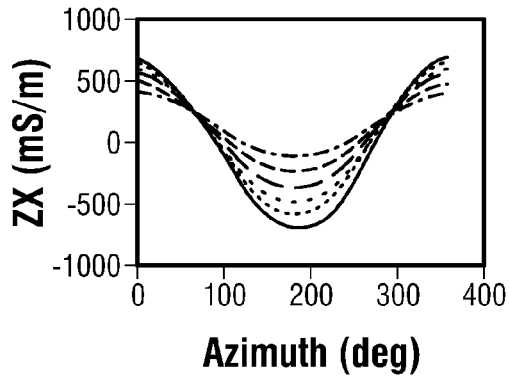
Figures 4, 4D:
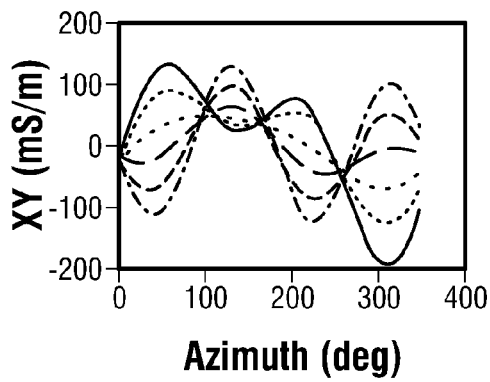
Figures 4, 4E:
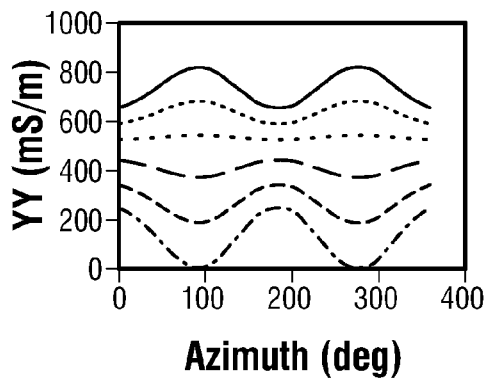
Figures 4, 4F:
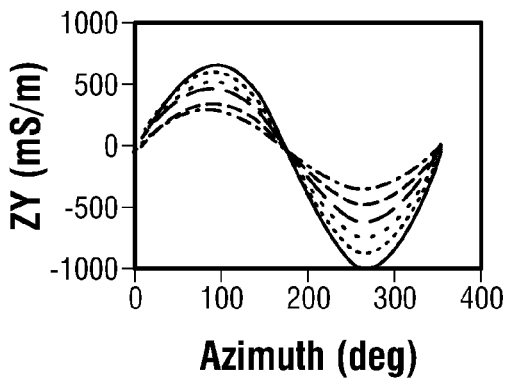
Figures 4, 4G:
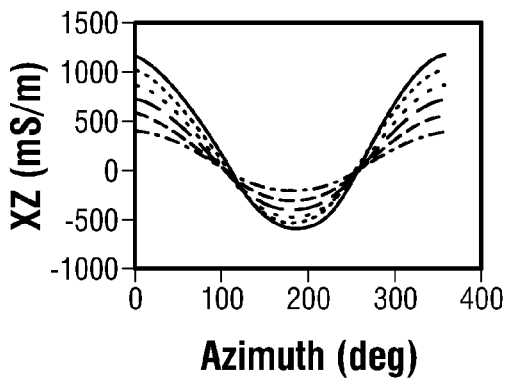
Figures 4, 4H:
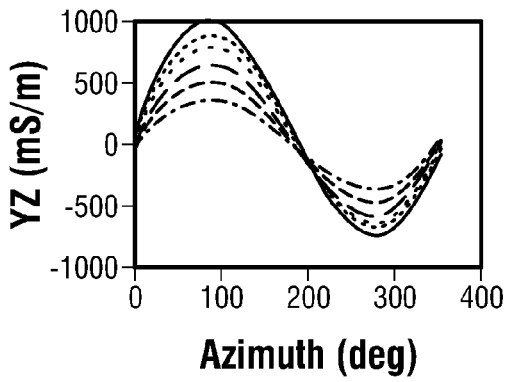
Figures 4, 4I:
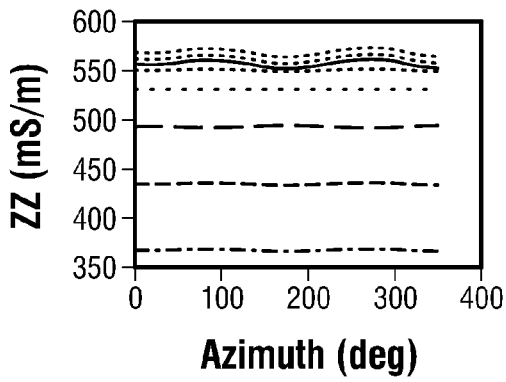
Figures 4, 5, 5A:
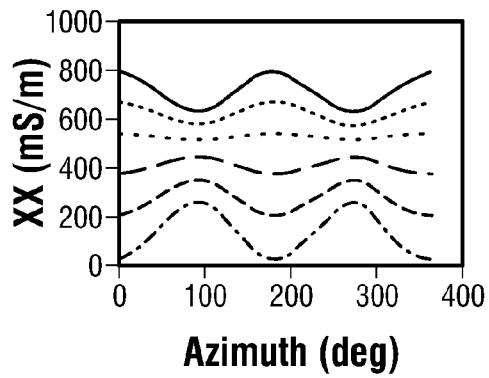
Figures 4, 5, 5B:
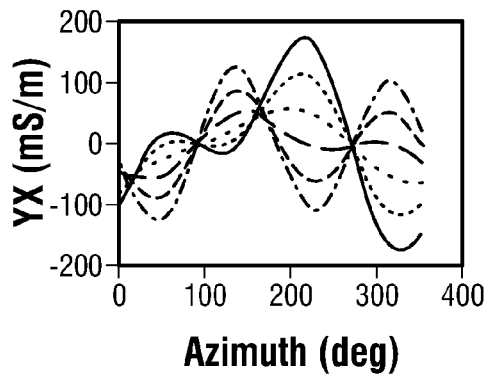
Figures 4, 5, 5C:
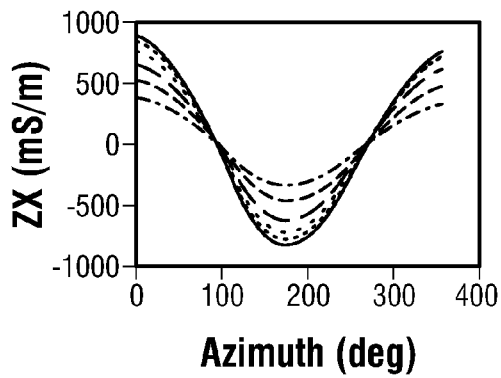
Figures 4, 5, 5D:
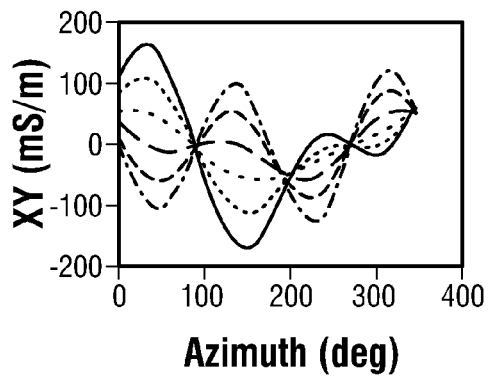
Figures 4, 5, 5E:
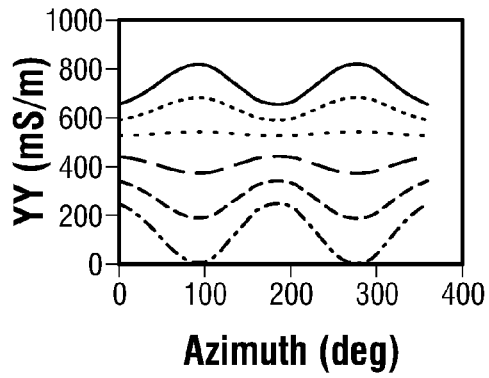
Figures 4, 5, 5F:
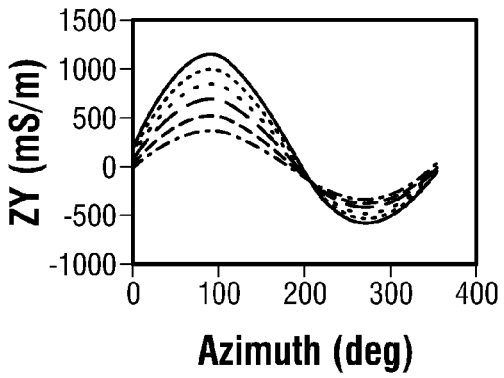
Figures 4, 5, 5G:
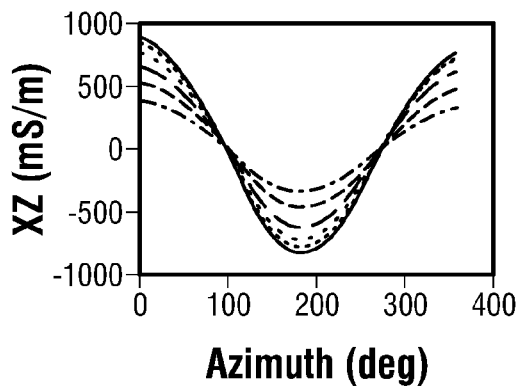
Figures 4, 5, 5H:
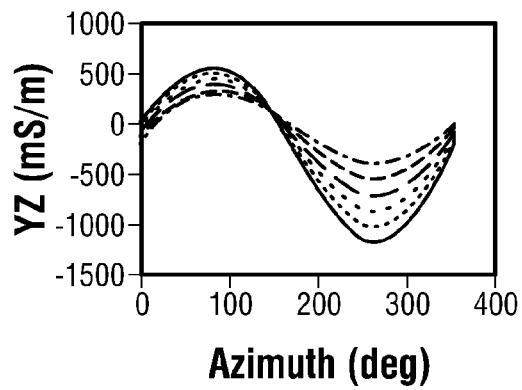
Figures 4, 5, 5I:
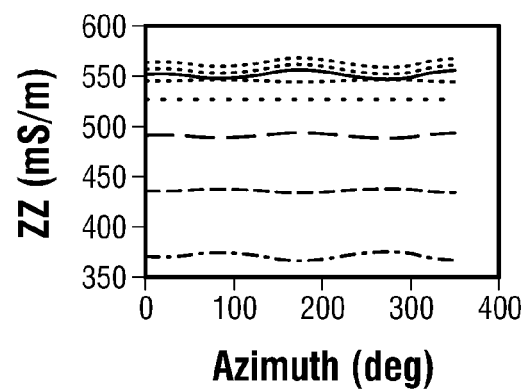

FIGS. 4-1 through 4-5 show examples of model responses obtained using a 3-dimensional finite-element method for 15 inch through 72 inch array spacings of the tool in an 8-inch diameter OBM filled borehole through an anisotropic formation ($R_h$=1, $R_v$=10 ohm-m) with a 50 degree dip and varying azimuth from 0 to 360 degrees. The computed conductivity tensor components for the centered case and the four eccentered cases with the center of the tool located 2 inches from the center of the borehole in the x-axis (ψ=0), negative y-axis (ψ=90), negative x-axis (ψ=180), and y-axis (ψ=270) directions are shown.

For the centered case (FIG. 4-1), $\sigma_{xx}$ can be described by A+B*cos(2 Φ), where A and B depend on $\sigma_h$, $\sigma_v$, and θ. The $\sigma_{yy}$ is a 90 degree shifted version of $\sigma_{xx}$. The $\sigma_{zz}$ response is practically independent of Φ. For the off-diagonal term, the symmetry of the problem requires $\sigma_{xy}=\sigma_{yx}$, $\sigma_{xz}=\sigma_{zx}$, $\sigma_{yz}=\sigma_{zy}$. Furthermore, $\sigma_{xy}$ can be described by C*sin(2 Φ), where C depends on $\sigma_h$, $\sigma_v$, and θ. The term $\sigma_{xz}$ can be described by D*cos(Φ) where D depends on $\sigma_h$, $\sigma_v$, and θ. The $\sigma_{yz}$ is a 90 degree shifted version of $\sigma_{xz}$.

Figures 4, 5, 6:
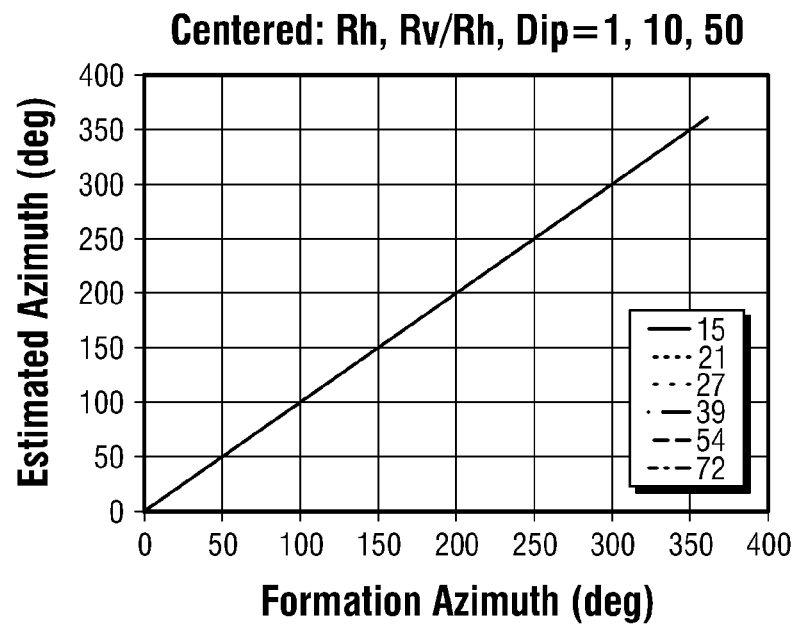
Figures 1A, 5:
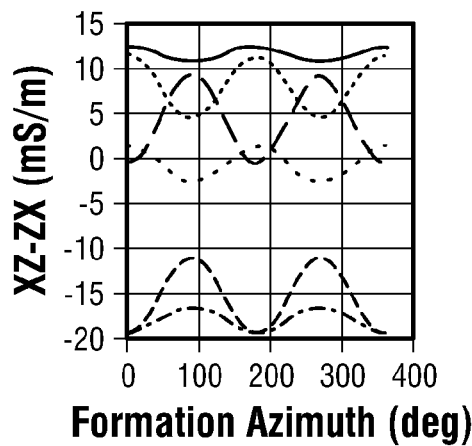
Figures 1B, 5:
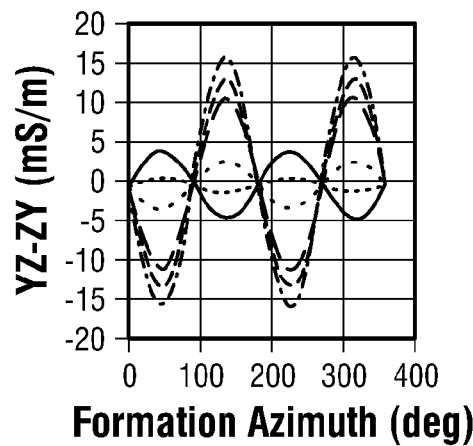
Figures 1C, 5:
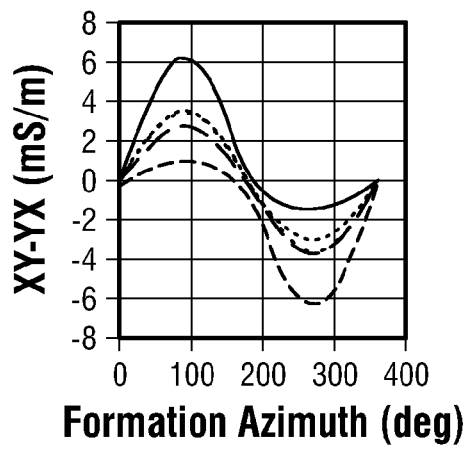
Figures 1D, 5:
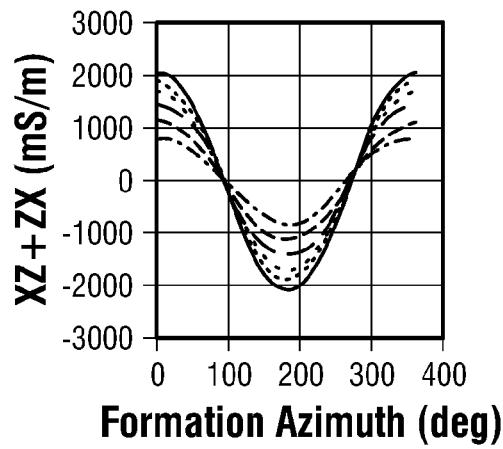
Figures 1E, 5:
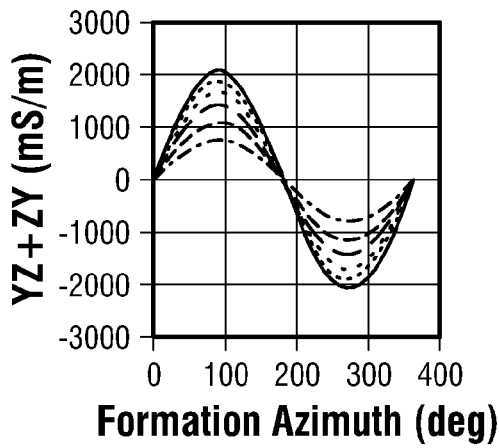
Figures 1F, 5:
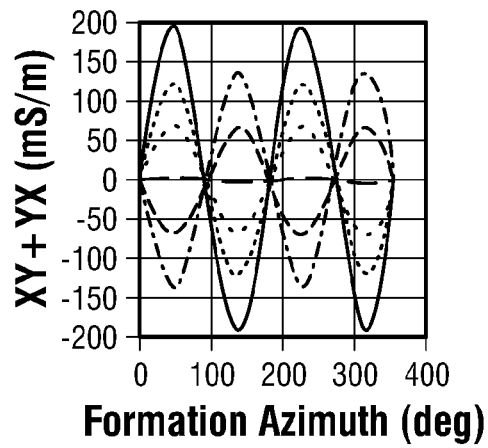
Figures 2A, 5:
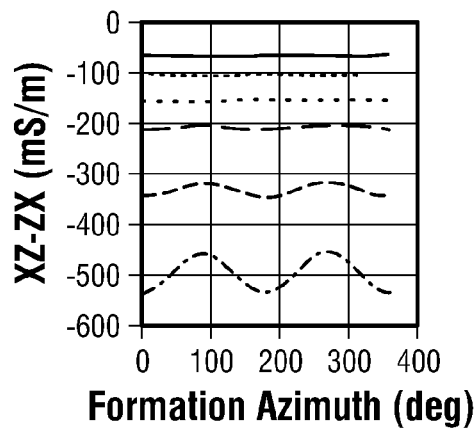
Figures 2B, 5:
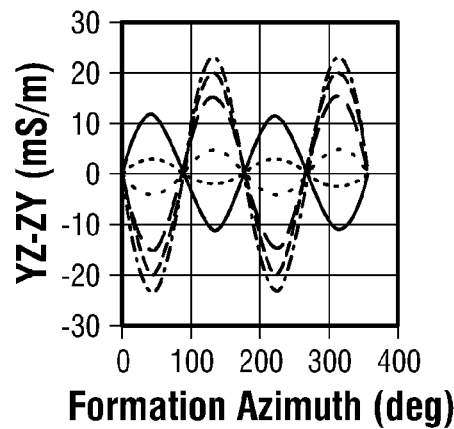
Figures 2C, 5:
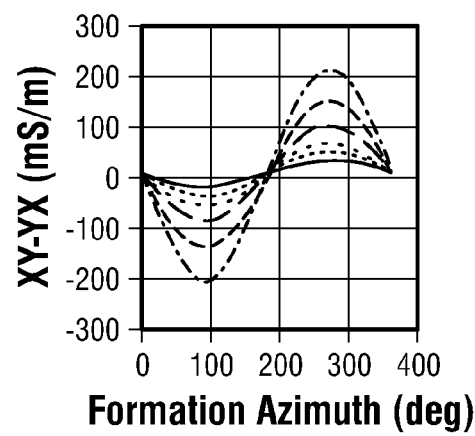
Figures 2D, 5:
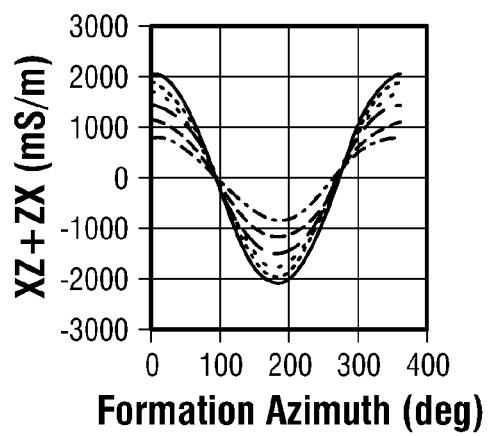
Figures 2E, 5:
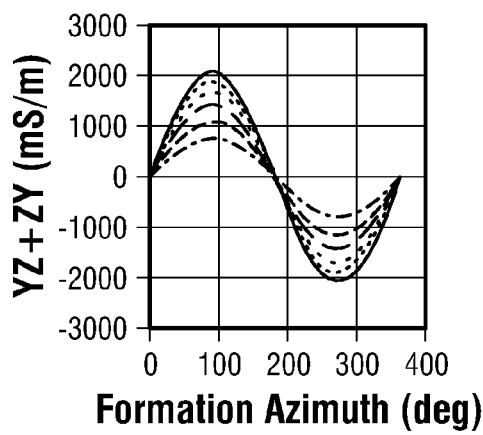
Figures 2F, 5:
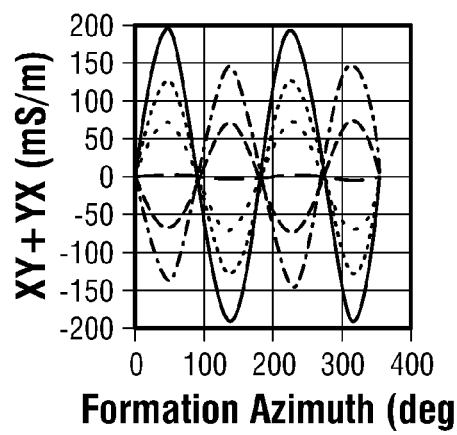
Figures 3A, 5:
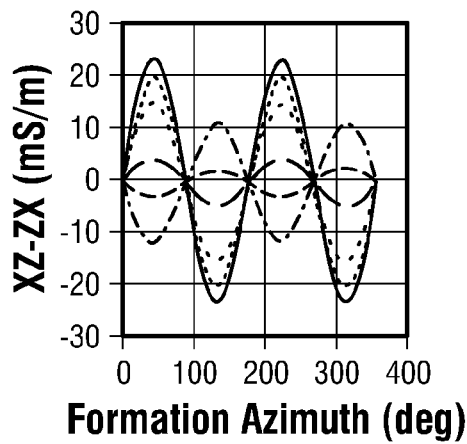
Figures 3B, 5:
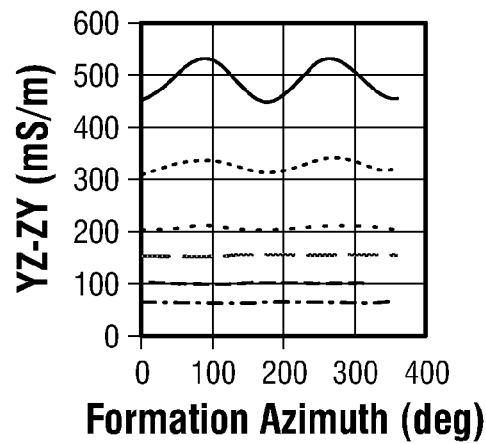
Figures 3C, 5:
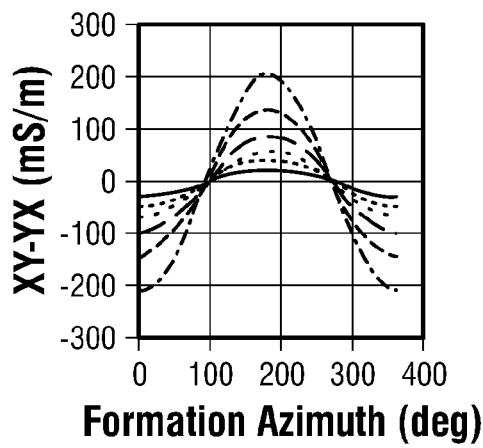
Figures 3D, 5:
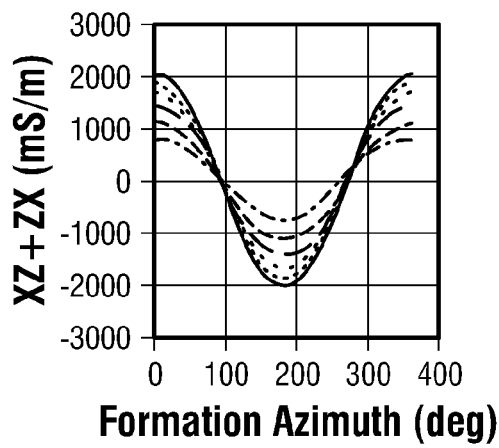
Figures 3E, 5:
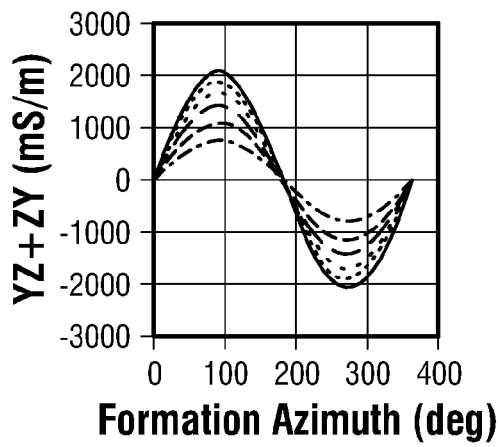
Figures 3F, 5:
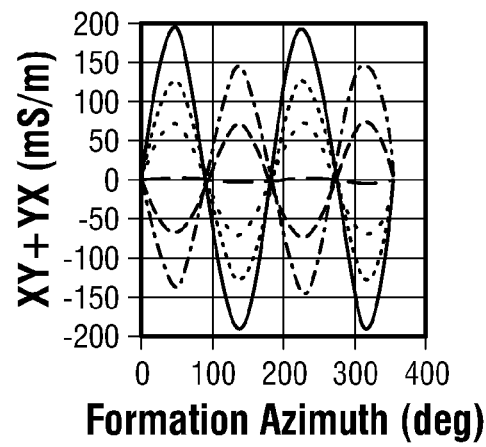
Figures 4A, 5:
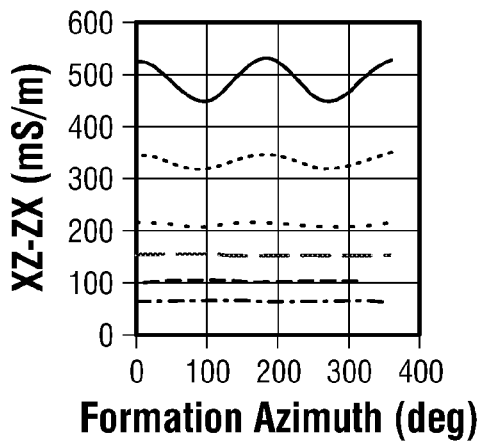
Figures 4B, 5:
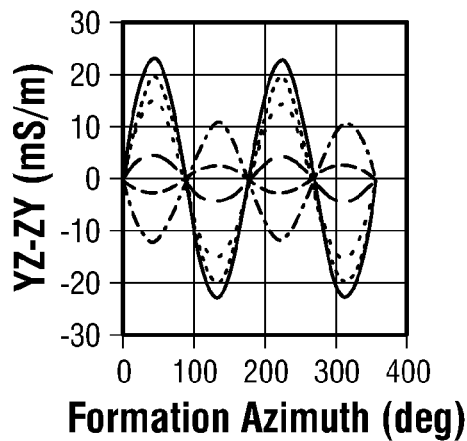
Figures 4C, 5:
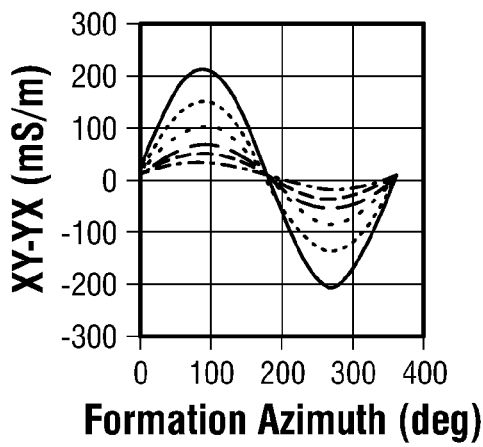
Figures 4D, 5:
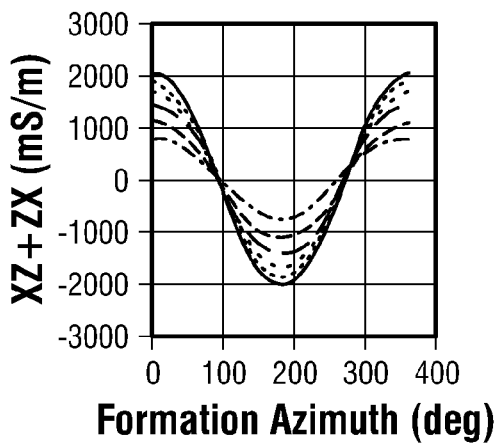
Figures 4E, 5:
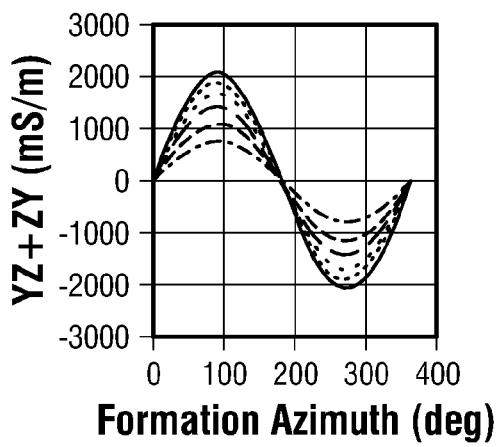
Figures 4F, 5:
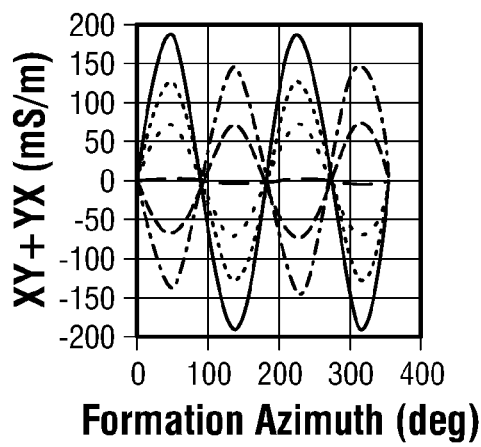
Figures 5, 5A:
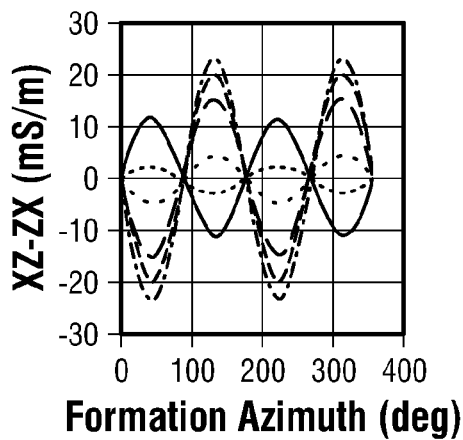
Figures 5, 5B:
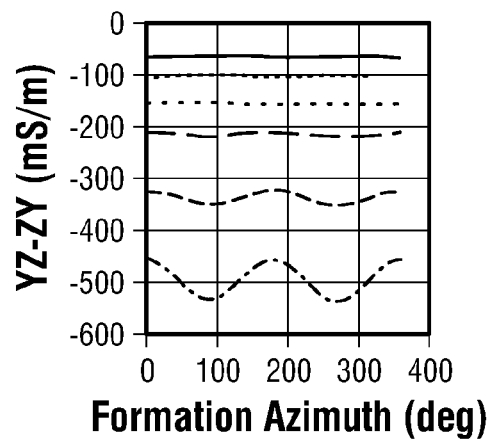
Figures 5, 5C:
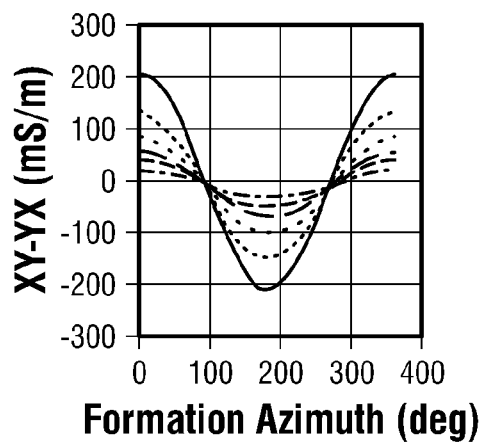
Figures 5, 5D:
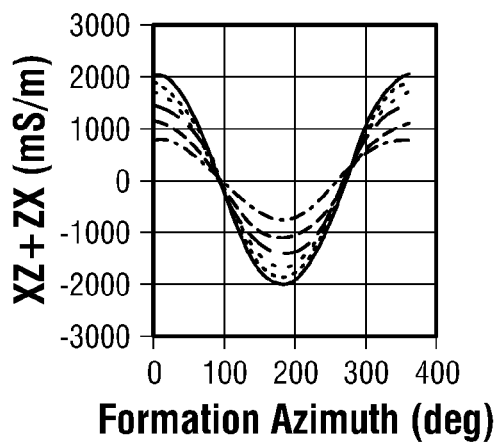
Figures 5, 5E:
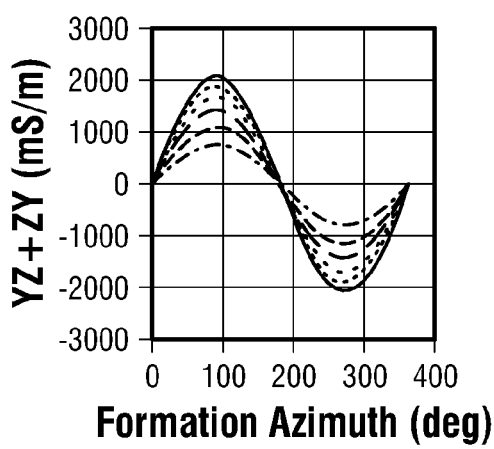
Figures 5, 5F:
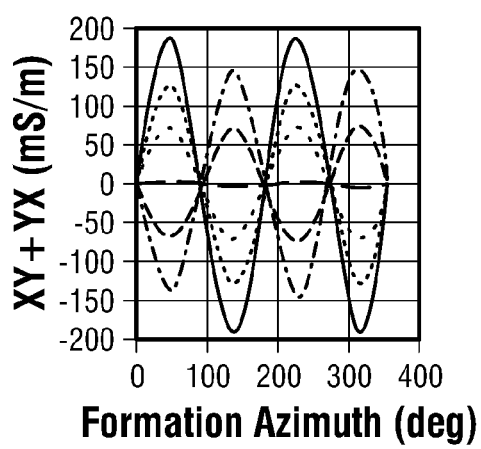

Based on the above observations, the estimate for the formation dip azimuth, Φ, for the centered case, may be expressed as:

$$\Phi = \mathrm{atan2}(\sigma_{yz}, \sigma_{xz})\qquad\text{Eq. (1)}$$

where atan2 denotes the four-quadrant inverse tangent (arctangent) of the real parts of $\sigma_{yz}$ and $\sigma_{xz}$. If the atan2 function returns a negative value for Φ, Φ is set to Φ+360. The results of the estimated formation azimuth from Eq. (1) using the centered case data shown in FIG. 4-1 are shown in FIG. 4-6, indicating very good agreement.

For the examples of eccentered tool positions (FIG. 4-2 through 4-5), the conductivity tensor appears to be much more complicated than the centered case. Most of the simple symmetric properties such as those described by A+B*cos(2 Φ), C*sin(2 Φ) and D*cos(Φ) no longer exist. Depending on the tool position in the borehole, the symmetry of off-diagonal terms cannot be guaranteed, that is, in general, σxy≠σyx, σxz≠σzx, σyz≠σzy. It appears that the $\sigma_{xx}$ and $\sigma_{yy}$ components are almost independent of the tool position in the borehole while $\sigma_{zz}$ has a slight dependency on the tool position. This dependency decreases as the array spacing increases. The eccentering introduces significant complexity in the off-diagonal components. The methods disclosed herein show how to solve for Φ and ψ from the measured conductivity tensor for the general case of eccentered tool in a borehole. Theses methods therefore reduce two of the dimensions from the multi-dimensional inversion problem and greatly enhance the robustness of the inversion. These methods can also be used independently to obtain formation dip azimuth Φ and tool eccentering azimuth ψ from the measured conductivity tensor.

Eccentered data can be viewed in a different manner such that the complexity associated with eccentered positioning is reduced. Shown in FIG. 5-1 through 5-5 are the sums and differences of the off-diagonal pairs of the conductivity tensor, σxy±σyx, σxz±σzx, σzx±σzy, for the centered case and the four eccentered cases, respectively.

The sum terms, σxy+σyx, σxz+σzx, σyz+σzy, are practically independent of the tool position in the borehole. This observation is supported by the fact that the sum terms (FIGS. "D", "E", and "F" of FIGS. 5-1 through 5-5) for the centered case and 2-inch eccentered cases with eccentering azimuth ψ=0, 90, 180, and 270 degrees are essentially the same. The formation dip azimuth (Φ) information in the σxz+σzx, σyz+σzy terms are substantially free from the interference of the eccentering tool position in the borehole. For the general eccentering case, the system can obtain the formation dip azimuth from the following equation:

$$\Phi = \text{atan2}(\sigma_{yz}+\sigma_{zy}, \sigma_{xz}+\sigma_{zx}) \quad \text{Eq. (2)}$$

Shown in FIG. 6-1 are examples of formation dip azimuth estimation using Eq. (2) with model data where the tool is eccentered in the borehole at four different positions. The results are robust, accurate and substantially independent of the tool eccentering position.

The azimuth estimation from Eq. (2) is substantially independent of bed boundary also. FIG. 6-2A shows a 3-bed model formation. In this example, the tool traverses the formation with relative dip and azimuth angles of 55 and 292.5 degrees, respectively. The first bed 60 is quite conductive with $R_h$=1 ohm-m, and $R_v$=2 ohm-m. The second bed 62 has resistivities $R_h$=10 ohm-m, $R_v$=100 ohm-m. The third bed 64 is conductive, having a higher anisotropy ratio than the first bed 60.

Figures 1A, 6:
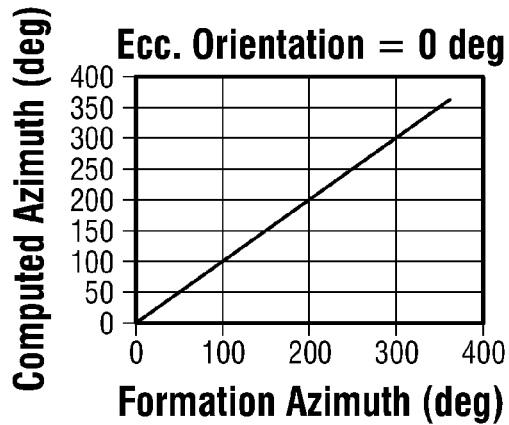
Figures 1B, 6:
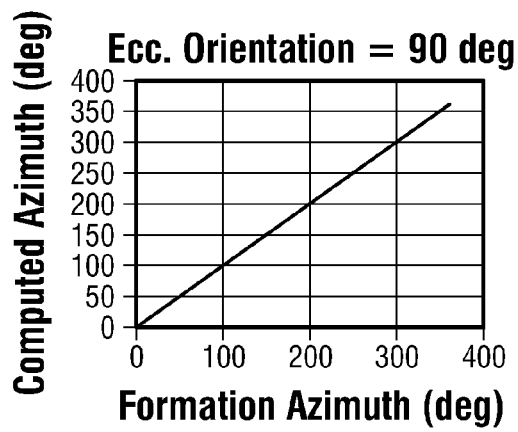
Figures 1C, 6:
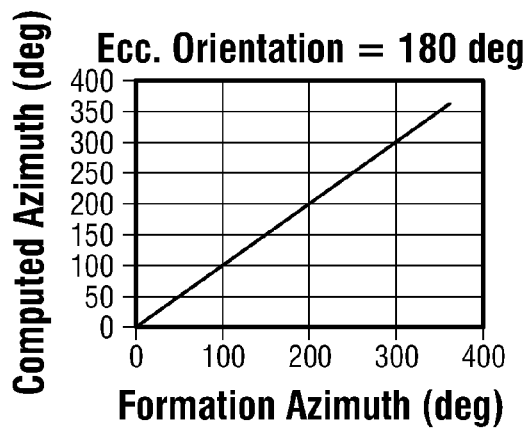
Figures 1D, 6:
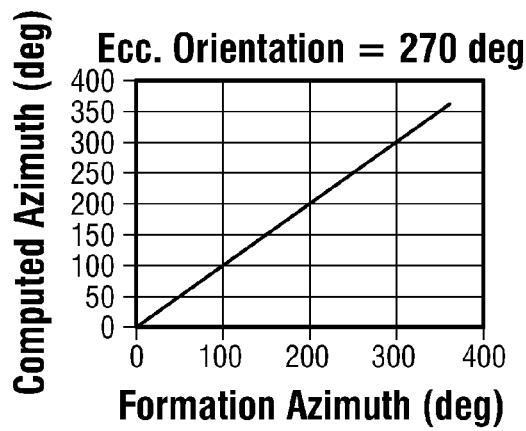
Figures 2A, 6:
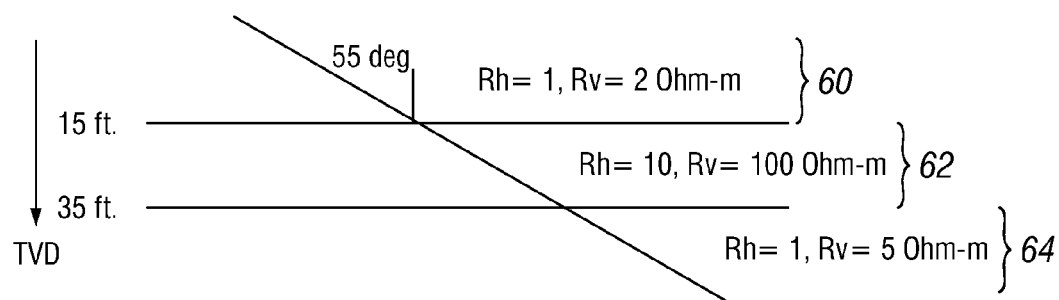
Figures 2B, 6:
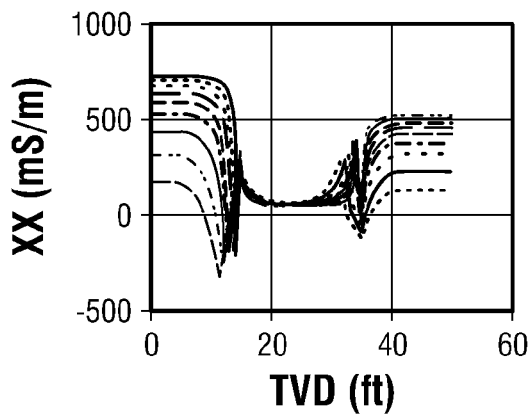
Figures 2C, 6:
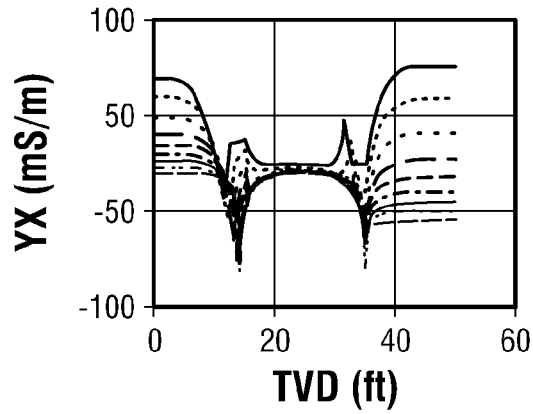
Figures 2D, 6:
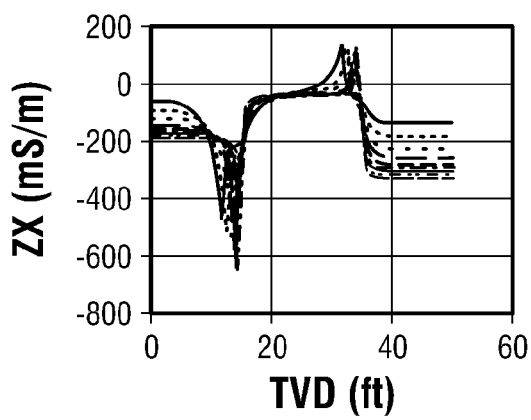
Figures 2E, 6:
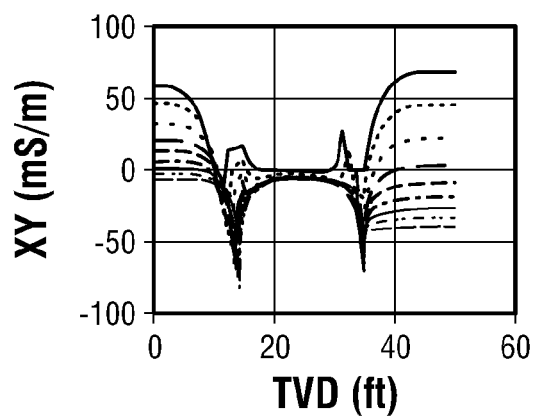
Figures 2F, 6:
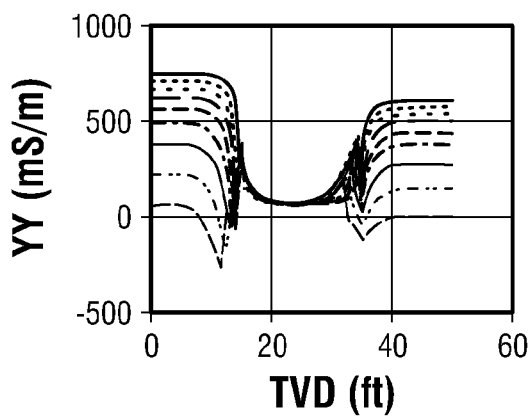
Figures 2G, 6:
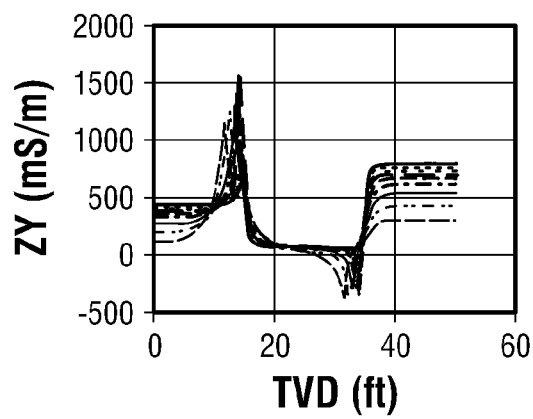
Figures 2H, 6:
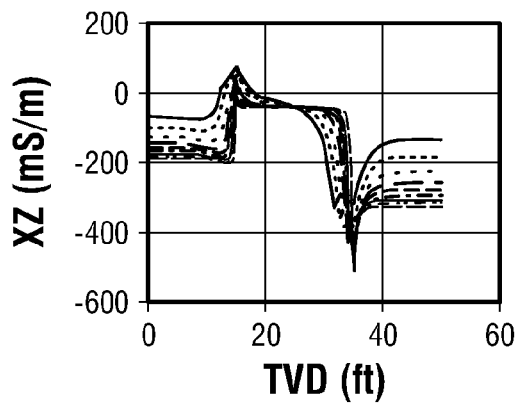
Figures 2I, 6:
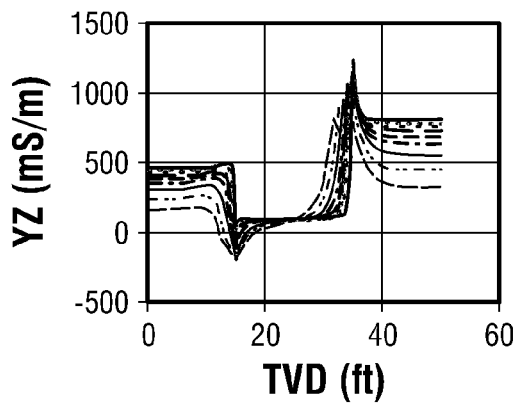
Figures 2J, 6:
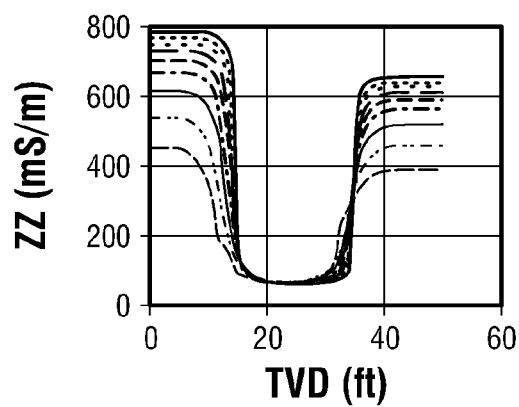
Figures 3, 6:
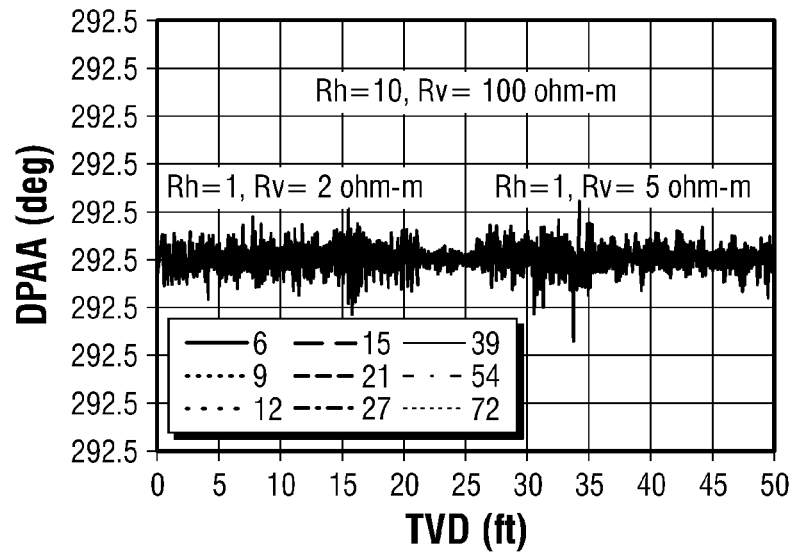

The nine components of the apparent conductivity tensor are plotted in FIGS. 6-2B through 6-2J. The estimated formation dip azimuths determined from this model data set using Eq. (2) are shown in FIG. 6-3. The estimations are accurate to within the computer rounding error throughout the entire log. All the spacings yield substantially similar results.

Using model data, the results in FIG. 6-1 are substantially the same for all the array spacings. In certain logging conditions, however, results from one array spacing may differ from other array spacings because each array may have different noise and calibration errors. Sometimes the downhole conditions may adversely affect one array more than the others. Therefore, the final formation azimuth estimation $\Phi_f$ may be derived from some statistical operation of Φ from all the arrays to obtain the benefit of averaging or weeding out outliers. Some common statistical operations for this purpose are described in the following example.

Let Φi be the formation azimuth estimation from the i-th array spacing, i=1, 2 ..., N. The weighted average solution from all the spacings is given as $$\Phi_f = \text{atan2}\left(\sum_{i=1}^{N} W_i * \sin(\Phi_i), \sum_{i=1}^{N} W_i * \cos(\Phi_i)\right) \quad \text{Eq. (3)}$$

If $\Phi_f$ is less than zero, then $\Phi_f = \Phi_f + 360$. Wi is the weighting function for the i-th spacing.

An example of a median method that screens out outliers is described below. Let [s1, s2, ..., sn]=SORT([sin(Φi), i= 1, ..., N]) be the sorted (either ascending or descending order) values of the sine of formation azimuthal angle estimations from any selected group of array spacings. Similarly, let [c1, c2, ..., cn]=SORT([cos(Φi), i=1, ..., N]) be the sorted cosine values in the same ascending or descending order.

$$\Phi_f = \text{atan2}([s_{n/2}+s_{n/2+1}], [c_{n/2}+c_{n/2+1}]), \text{ if } N \text{ is even}$$

$$\Phi_f = \text{atan2}(s_{(n+1)/2}, c_{(n+1)/2}), \text{ if } N \text{ is odd}. \quad \text{Eq. (4)}$$

The vector averaging formulation, in Eqs (3) and (4), substantially avoids the phase wrapping problem.

The $\Phi_f$ obtained from Eqs. (2), (3), or (4) is referenced to the tool x-axis. During logging, the tool may spin in the borehole in an unpredictable fashion. Thus, it is desirable to reference the formation azimuth angle relative to the borehole coordinate system. This can be accomplished by a pre-processing step which will rotate the measured conductivity tensor around the z-axis so that the tool x-axis is in the same direction as the borehole x-axis, which may be in the top-of-the-hole (TOH) direction or north direction. The rotating angle usually comes from a measurement of the relative orientation between the tool and the borehole. Equations (2), (3), and (4) can be used on the rotated data to invert for the formation dip azimuth relative to the coordinate system fixed to the borehole.

The tool eccentering azimuth (Ψ) information are contained in the difference terms, σxy−σyx, σxz−σzx, σyz−σzy. However, the magnitude of the response to the eccentering may be significantly different for the three difference terms. For example, the most response may come from the σxz−σzx, σyz−σzy terms and the least response may come from the σxy−σyx term. For the example in FIG. 5-2 (decc=2 inches and Ψ=0 deg.), the magnitude of the tool eccentering response in the σxz−σzx term is about 500 mS/m at the 15 inch spacing and this magnitude is relatively constant as the formation azimuth varies. The magnitude of the eccentering response decreases as the array spacing increases, e.g., shorter array spacings can "see" the effect of the borehole more clearly. At 54 inch and 72 inch spacings, the eccentering response is reduced to about 100 and 65 mS/m, respectively.

The responses of σxz−σzx and σyz−σzy are coupled tightly to the tool eccentering azimuth angle Ψ. The definition of Ψ is the angle spanned between the x-axis of the borehole coordinates and the line from the center of the borehole 20 to the center of the tool 10 in the counter-clockwise direction. FIG. 7-1 shows five tool positions 10a-10e in the borehole with Ψ=0, 90, 180, 270, and an arbitrary angle, respectively. The σxz−σzx and σyz−σzy responses of the first four positions are shown in FIGS. "A", "B", and "C" of FIGS. 5-2 through 5-5, respectively. At the Ψ=0 position, σxz−σzx is negative, but its magnitude is large compared with σyz−σzy. At the Ψ=90 position, the σxz−σzx response becomes very small and σyz−σzy become very large, but positive. At the Ψ=180 position, σxz−σzx is positive and very large while σyz−σzy becomes small. Finally, at the Ψ=270 position, σxz−σzx becomes very small and σyz−σzy turns into very large negative value. Based on the foregoing, the following examples of methods for estimating the tool eccentering azimuth angle Ψ are provided.

De-spinning—Rotate the conductivity tensor (in tool's coordinate system) around the z-axis so that the x-axis points in the same direction as the borehole's x-axis. This de-spinning step provides a borehole-based reference for measuring the relative position of the tool in the borehole. The rotation may be expressed as:

$$\sigma_{ds} = R\sigma_m R^T, \sigma_m = \begin{bmatrix} \sigma_{xx} & \sigma_{yx} & \sigma_{zx} \\ \sigma_{xy} & \sigma_{yy} & \sigma_{zy} \\ \sigma_{xz} & \sigma_{yz} & \sigma_{zz} \end{bmatrix},$$ Eq. (5)

$$R = \begin{bmatrix} \cos(\phi) & \sin(\phi) & 0 \\ -\sin(\phi) & \cos(\phi) & 0 \\ 0 & 0 & 1 \end{bmatrix},$$

where $\sigma_m$ is the measured apparent conductivity tensor, $\sigma_{ds}$ is the de-spinned conductivity tensor, R is the de-spinning matrix with rotation angle $\phi$, and $R^T$ is the transpose of R. Rotate the $\sigma_{ds}$ tensor using Eq. (5) such that $\sigma xz-\sigma zx$ attains its maximum value to determine the rotation angle $\phi$max. The eccentering azimuth angle $\Psi$ will be $\phi$max.

In another point of view, $\sigma xz-\sigma zx$ of the rotated $\sigma_{ds}$ tensor has a functional form of:

$$Y = A^* \cos(\Psi + \phi)$$ Eq. (6)

where $\phi$ is the rotation angle. Instead of searching for the maximum value, an alternative method includes the step of solving for $\Psi$ directly by using the 90-degree rotated $\sigma_{ds}$ tensor value. The eccentering azimuth angle may be expressed as:

$$\Psi = \mathrm{atan2}(-(\sigma_{xz}-\sigma_{zx} \text{ at } \phi=90), (\sigma_{xz}-\sigma_{zx} \text{ at } \phi=0)).$$ Eq. (7)

Figure 10:
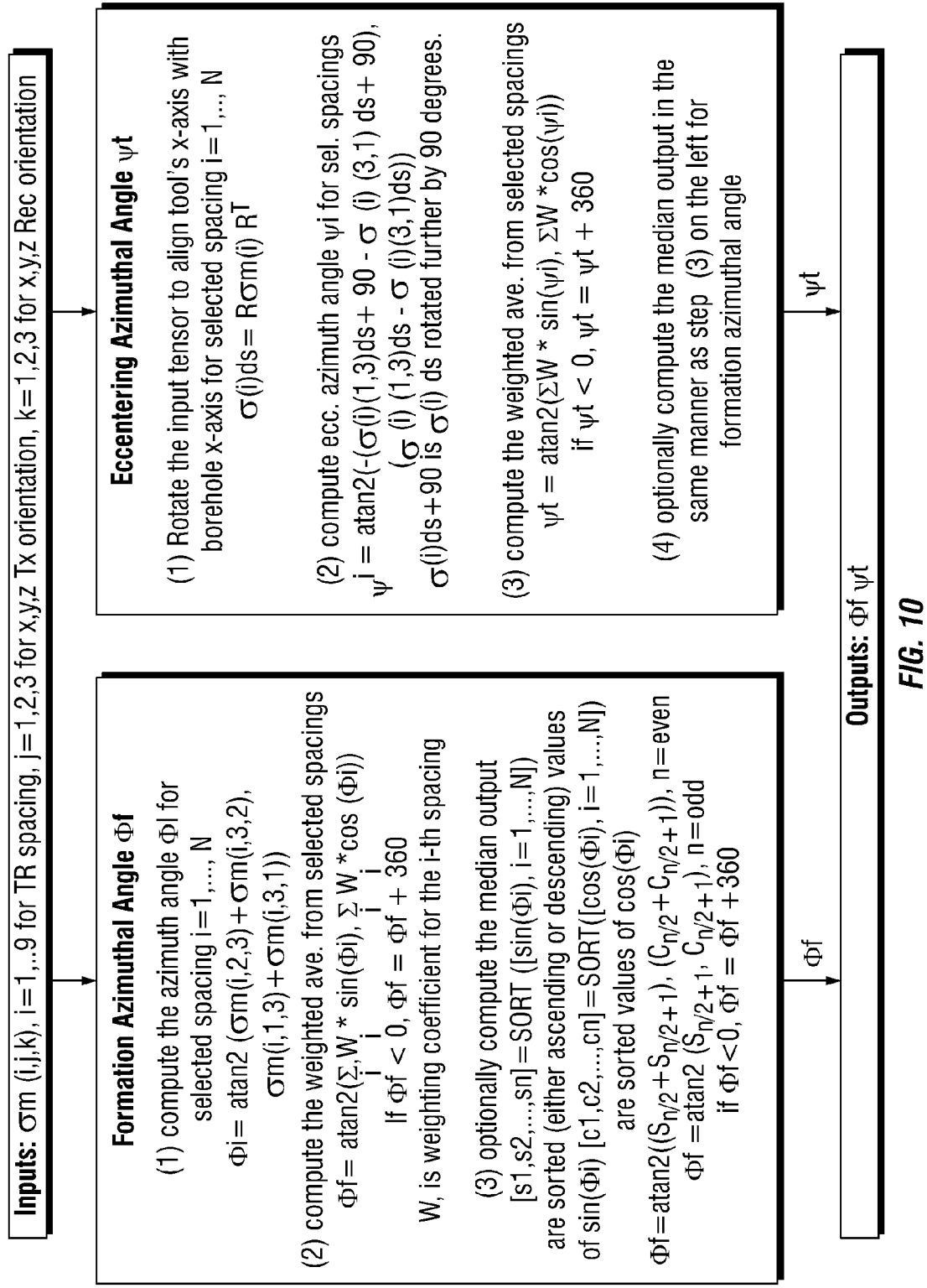
FIG. 10 is a flow chart of an example method of determining the formation azimuth angle and the tool eccentering azimuthal angle within the scope of the present invention.

Shown in FIGS. 7-2 through 7-5 are the results of estimating the tool eccentering azimuth angle, $\Psi$. To illustrate, FIG. 7-2B shows the computed difference $\sigma_{xz}-\sigma_{zx}$ as a function of rotation angle $\phi$ for $\Psi$ equal to 30 degrees. For a particular transmitter/receiver spacing, $\phi$max can be read from the plot, which is seen to be 30 degrees, as expected. Different model data sets using four different formation azimuth angles demonstrate that the results are robust, accurate, and substantially independent of formation azimuth angle. FIG. 10 is a block diagram of an example of determining formation/tool eccentering azimuthal angles.

A very close estimation of tool eccentering distance (decc) can be obtained from the $\sigma xz-\sigma zx$ and $\sigma zz$ terms. Comparing the examples shown in FIGS. 4-1 (centered case) and 4-2 (eccentered case), the eccentering distance (decc) has the biggest effect on the $\sigma_{xz}$ and $\sigma_{zx}$ components. For the centered case, $\sigma_{xz}=\sigma_{zx}$, the eccentering effectively lowers the $\sigma_{xz}$ and raises the $\sigma_{zx}$ responses with respect to the centered case. Therefore $\sigma_{xz}-\sigma_{zx}$ is a very strong function of decc. In addition, $\sigma_{xz}-\sigma_{zx}$ is also a strong function of $\sigma_h$ and a weak function of $\sigma_h/\sigma_v$ and dip angle.

Shown in FIG. 8-1 are examples of $\sigma_{xz}-\sigma_{zx}$ and $\sigma_{zz}$ responses in an 8-inch OMB borehole. FIG. 8-1 illustrates the sensitivity and functional form of $\sigma_{xz}-\sigma_{zx}$ and $\sigma_{zz}$ to $\sigma h$, $\sigma_h/\sigma_v$, and dip angle. In the log-log domain, the variation of $\sigma_{xz}-\sigma_{zx}$ and $\sigma_{zz}$ as a function of $\sigma_h$ is nearly linear. Both $\sigma_{xz}-\sigma_{zx}$ and $\sigma_{zz}$ are strong functions of $\sigma_h$ and weak functions of $\sigma_h/\sigma_v$ and dip angle. The $\sigma_{xz}-\sigma_{zx}$ response is nearly a linear function of the eccentering distance, decc, as shown in FIG. 8-2. A plot of the least square fit line through the data is also shown. The mean deviation between the data and the least square fit line is relatively small.

An example of a method for estimating decc from $\sigma_{xz}-\sigma_{zx}$ and $\sigma_{zz}$ measurements, based on the foregoing, may include the following steps:

a) Rotating the de-spinned conductivity tensor $\sigma_{ds}$ with an angle $\Psi$ (see Eq. (5)) to align the x-axis in the direction of eccentering.

b) Estimating the horizontal conductivity, $\sigma_{h\_i}$, from the zz component of the de-spinned conductivity tensor through interpolation, as indicated below:

$$\sigma_{h\_i} = \mathrm{interpolate}\,(\sigma_{zz\_c}, \sigma_{hg}, \sigma_{zz\_m}),$$ Eq. (8)

where $\sigma_{zz\_c}$, is a vector containing the average modeled $\sigma_{zz}$ over a wide range of $\sigma_v/\sigma_h$ and dip angles (see FIG. 8-1). The $\sigma_{hg}$ is a vector containing the grid point values for the $\sigma_h$. The $\sigma_{zz\_m}$ is the zz component of the tensor $\sigma_{ds}$ after rotation. The tool in the model is eccentered by a distance decc_m in the x-direction, which is aligned with the borehole x-direction.

The $y_i$=interpolate (x, y, $x_i$) is a interpolation function that would find the value of $y_i$ corresponding to a given value of $x_i$ through interpolation between two vectors x and y. As shown in FIG. 8-1, the interpolation may be done in the log-log domain.

c) Determining the averaged model $\sigma_{xz}-\sigma_{zx}$ response, xzmzx_m, at $\sigma_{h\_i}$ through interpolation, as shown below:

$$xzmzx\_m = \mathrm{interpolate}\,(\sigma_{hg}, xzmzx, \sigma_{h\_i}).$$ Eq. (9)

where xzmzx is a vector containing the average modeled $\sigma_{xz}-\sigma_{zx}$ response over a wide range of $\sigma_v/\sigma_h$ and dip angles (see FIG. 8-1). The tool in the model is eccentered by a distance decc_m in the x-direction, which is aligned with the borehole x-direction. The interpolation may be done in the log-log domain.

d) Determining the estimated eccentering distance, decc_i, as:

$$decc\_i = decc\_m^*(xzmzx\_i/xzmzx\_m)$$ Eq. (10)

where xzmzx_i is the $\sigma_{xz}-\sigma_{zx}$ response of the de-spinned conductivity tensor $\sigma_{ds}$ after rotation from step (a) above.

Figure 9:
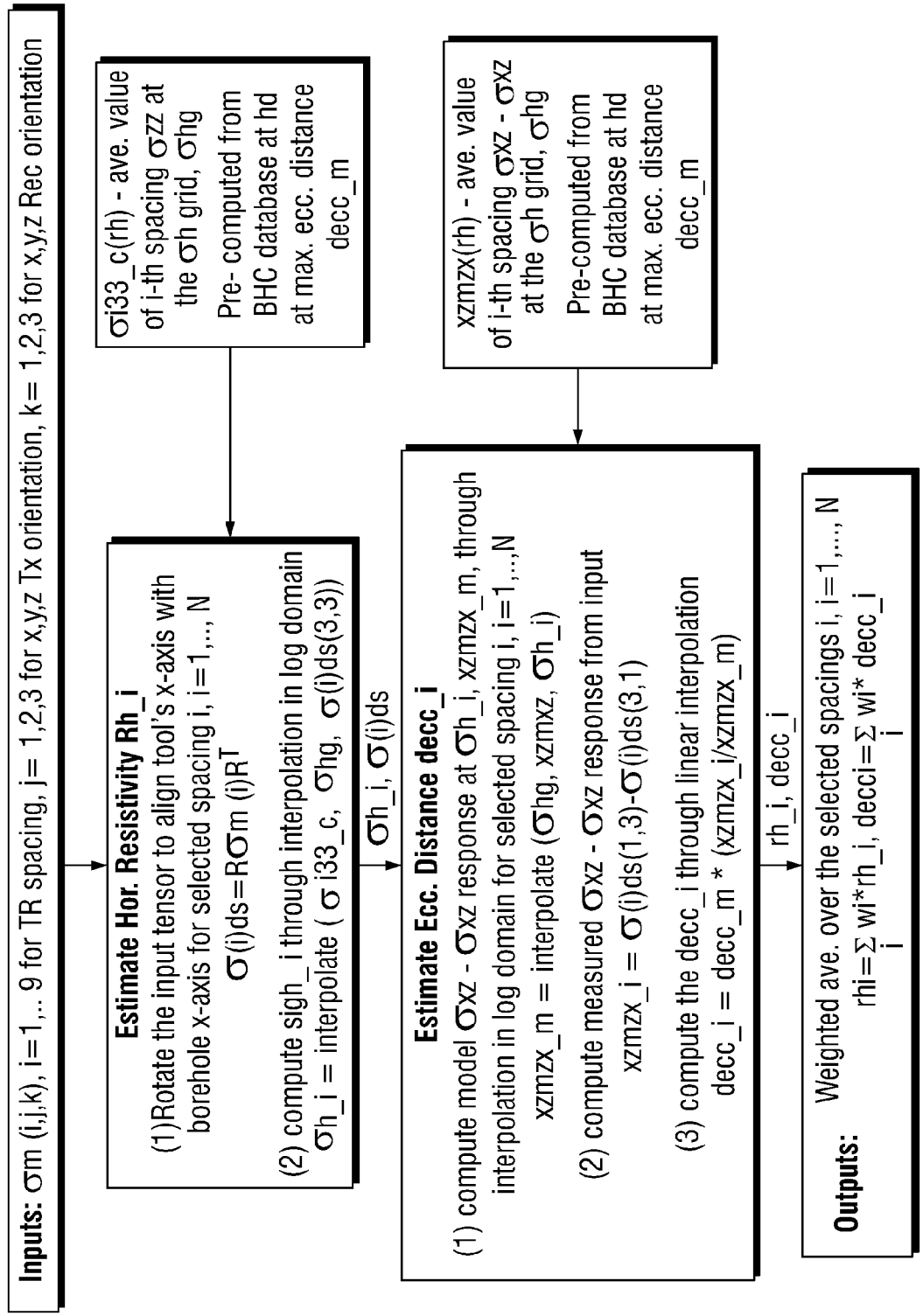
FIG. 9 is a flow chart of an example method of estimating horizontal resistivity and eccentering distance within the scope of the present invention.

FIG. 9 is a flow chart of an example of a method of estimating horizontal resistivity (Rh_i) and eccentering distance (decc_i).

1.2 Forward Engine Using Interpolation and Azimuthal Expansion

Figure 11:
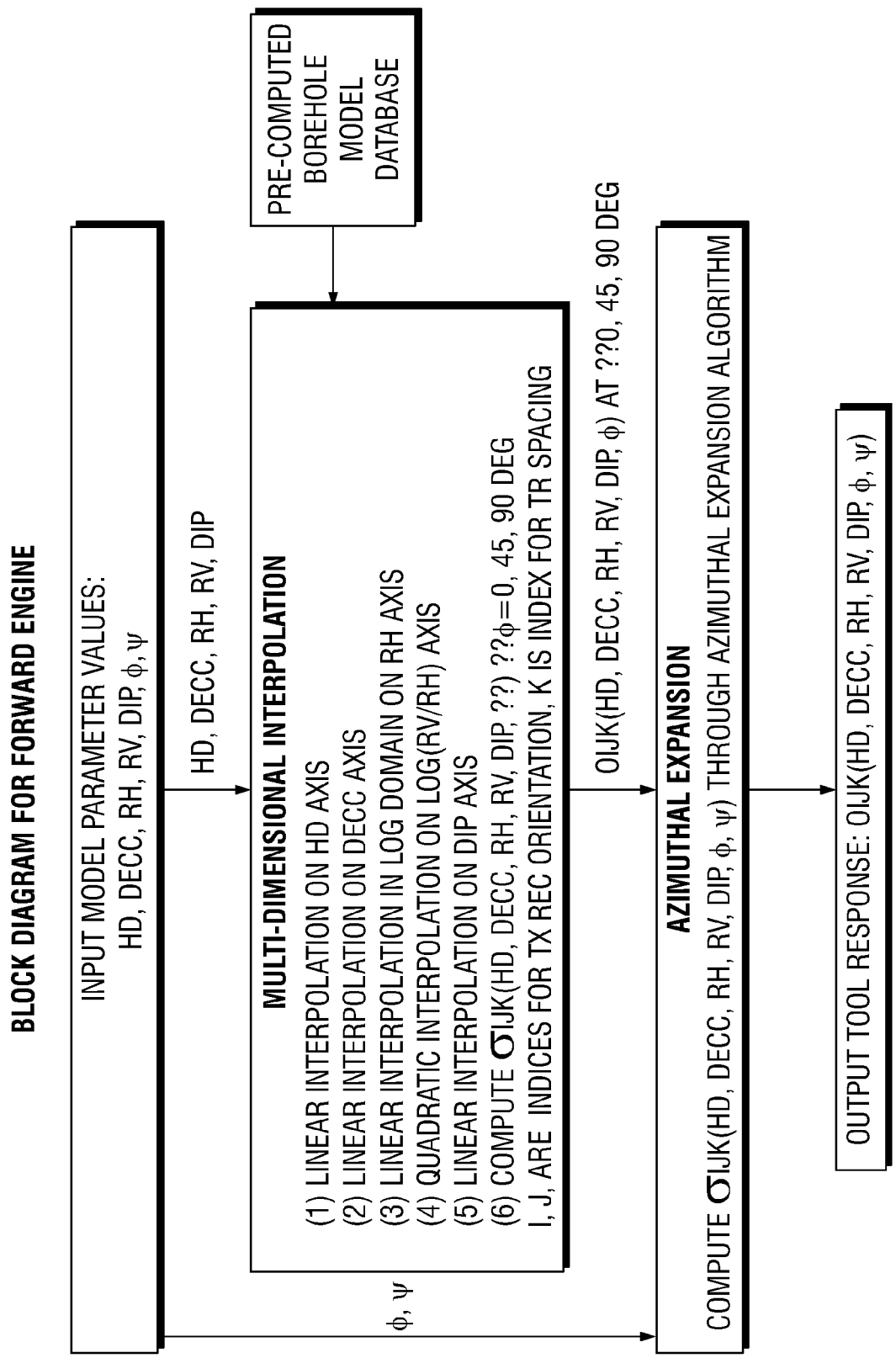
FIG. 11 is a block diagram of an example of a forward engine that may be used in a borehole correction method within the scope of the present invention.

FIG. 11 is a block diagram representing an example of a forward engine and its interaction with other components shown in FIG. 3. The responses for arbitrary values of the first 5 parameters (hd, decc, $\sigma$h, $\sigma$v, $\theta$) at the three $\Phi$ values are computed through multi-dimensional interpolation. Next, an azimuthal expansion technique is used to compute the final response of the tool for arbitrary values of the seven model parameters (hd, decc, $\sigma$h, $\sigma$v, $\theta$, $\Phi$, $\psi$). The details of the azimuthal expansion are described below.

The responses of the tool in the model described in FIG. 2 are pre-computed via a finite element code for various model parameter values to form a multi-dimensional table. There are seven dimensions in this table corresponding to the seven model parameters in OBM (hd, decc, $\sigma$h, $\sigma$v, $\theta$, $\Phi$, $\psi$). Using conventional discretized grids to represent these seven model parameters over their expected range, a typical number of cases to be modeled for the complete table will be about 39,345,560. However, the computer time needed to generate more than 39 millions cases and the table size are impractical with conventional technology.

To reduce the size of this table, the presently disclosed azimuthal expansion technique (shown as block 34 of FIG. 3) expresses the response of the tool for arbitrary formation dip azimuth ($\Phi$) and arbitrary tool eccentering azimuth ($\psi$) using only three data points for formation dip azimuth angle ($\Phi$=0, 45, and 90 degrees), evaluated at the tool eccentering azimuth of zero degrees ($\psi$=0). Using azimuthal expansion, borehole correction method 30 may construct a 6-dimensional table for the first six model parameters (σh, decc, σh, σv, θ, Φ), all with ψ=0. The last dimension for the formation azimuth Φ may contain only three data points for Φ=0, 45, and 90.

The azimuthal expansion allows for computation of the borehole response relatively quickly (e.g., on the fly with analytic formula). Referring to the grid numbers mentioned above, the disclosed method may reduce the table size to about 91,080, or by a factor of 432, for example. By reducing the size of the table, azimuthal expansion 34 reduces the complexity and time required for the table computation. The reduced table size may also allow a relative increase in the speed of the borehole correction process.

The azimuthal expansion expresses the conductivity tensor σij, ij=1, 2, 3 (1 for x, 2 for y, and 3 for z) in terms of series expansion:

$$\sigma ij = A_{ij0} + \sum_{k=1}^{n}[A_{ijk}\text{COS}(k\Phi) + B_{ijk}\text{SIN}(k\Phi)], \quad \text{Eq. (11)}$$

where coefficients $A_{ijk}$ and $B_{ijk}$ depend on $\Psi$ $$A_{ijk} = C_{ijk0} + \sum_{p=1}^{m}[C_{ijkp}\text{COS}(p\Psi) + D_{ijkp}\text{SIN}(p\Psi)] \quad \text{Eq. (12)}$$

$$B_{ijk} = E_{ijk0} + \sum_{q=1}^{l}[E_{ijkq}\text{COS}(q\Psi) + F_{ijkq}\text{SIN}(q\Psi)]$$

where the coefficients $C_{ijkp}$, $D_{ijkp}$, $E_{ijkq}$, and $F_{ijkq}$ are functions of other parameters ($\sigma_h$, $\sigma_v$, $\theta$, $\sigma_m$, hd, and decc).

The above series expansion may be simplified by limiting n, l, and m to less than or equal to 2. The following expressions use Φ=0, 45, and 90 degrees and ψ=0 to compute the nine components of the conductivity tensor. The three formation dip azimuth values and one eccentering azimuth value, however, are not necessarily limited to those values.

The $\sigma_{xx}$ term can be expressed as:

$$\sigma xx = Axx + Bxx^*\text{COS}(2\Phi) + Cxx^*\text{COS}(2\psi), \quad \text{Eq. (13)}$$

where Axx, Bxx, and Cxx are constants determined by the model parameters (σh, σv, θ, Φ, σm, hd, decc, ψ).
Axx=0.5*[σxx(σh, σv, θ, Φ=45, σm, hd, decc, ψ=0)+σyy(σh, σv, θ, Φ=45, σm, hd, decc, ψ=0)]
Bxx=σxx(σh, σv, θ, Φ=0, σm, hd, decc, ψ=0)−σxx(σh, σv, θ, Φ=45, σm, hd, decc, ψ=0)
Cxx=0.5*[σxx(σh, σv, θ, Φ=45, σm, hd, decc, ψ=0)−σyy(σh, σv, θ, Φ=45, σm, hd, decc, ψ=0)]

The $\sigma_{yy}$ term can be expressed as:

$$\sigma yy = Ayy + Byy^*\text{COS}(2\Phi) + Cyy^*\text{COS}(2\psi), \quad \text{Eq. (14)}$$

where Ayy, Byy and Cyy are constants determined by the model parameters (σh, σv, θ, Φ, σm, hd, decc, ψ).
Ayy=Axx, Cyy=−Cxx
Byy=σyy(σh, σv, θ, Φ=0, σm, hd, decc, σ=0)−σyy(σh, σv, θ, Φ=45, σm, hd, decc, ψ=0)

The $\sigma_{zz}$ term can be expressed as:

$$Azz0 + Azz2^*\text{COS}(2\Phi) + Bzz2^*\text{SIN}(2\psi), \quad \text{Eq. (15)}$$

where Azz and Bzz are constants determined by the model parameters (σh, σv, θ, Φ, σm, hd, decc, ψ);
Azz0=σzz(σh, σv, θ, Φ=45, σm, hd, decc, ψ=0)
Azz2=Czz22*COS(2 ψ)
Czz22=[σzz(σh, σv, θ, Φ=0, σm, hd, decc, ψ=0)−σzz(σh, σv, θ, Φ=45, σm, hd, decc, ψ=0)]
Bzz2=Dzz22*SIN(2 ψ)
Dzz22=Czz22

The $\sigma_{zz}$ term can be expressed as:

$$Axz0 + Axz1^*\text{COS}(\Phi) + Bxz1^*\text{SIN}(\Phi) + Axz2^*\text{COS}(2\Phi) + Bxz2^*\text{SIN}(2\Phi) \quad \text{Eq. (16)}$$

Axz0, Axz1, Axz2, Bxz2, and Bxz2 are coefficients determined by the model parameters (σh, σv, θ, Φ, σm, hd, decc, ψ);
Axz0=0.5*Cxz01*COS(ψ)
Axz1=0.5*[Cxz10+Cxz12*COS(2 ψ)]
Axz2=0.5*[Cxz21*COS(ψ)+Cxz23*COS(3 ψ)]
Bxz1=0.5*Fxz12*SIN(2 ψ)
Bxz2=0.5*[Fxz21*SIN(ψ)+Fxz23*SIN(3 ψ)]
Cxz01=σxz(σh, σv, θ, Φ=45, σm, hd, decc, ψ=0)−σzx(σh, σv, θ, Φ=45, σm, hd, decc, ψ=0)
Cxz10=0.5*[σyz(σh, σv, θ, Φ=90, σm, hd, decc, ψ=0)+σzy(σh, σv, θ, Φ=90, σm, hd, decc, ψ=0)
+σxz(σh, σv, θ, Φ=0, σm, hd, decc, ψ=0)+σzx(σh, σv, θ, Φ=0, σm, hd, decc, ψ=0)]
Cxz12=−0.5*[σyz(σh, σv, θ, Φ=90, σm, hd, decc, ψ=0)+σzy(σh, σv, θ, Φ=90, σm, hd, decc, ψ=0)]
−σxz(σh, σv, θ, Φ=0, σm, hd, decc, ψ=0)−σzx(σh, σv, θ, Φ=0, σm, hd, decc, ψ=0)]
Cxz21=0.5*[σxz(σh, σv, θ, Φ=0, σm, hd, decc, ψ=0)−σzx(σh, σv, θ, Φ=0, σm, hd, decc, ψ=0)
−σxz(σh, σv, θ, Φ=45, σm, hd, decc, ψ=0)+σzx(σh, σv, θ, Φ=45, σm, hd, decc, ψ=0)]
Cxz23=Cxz21
Fxz12=Cxz12
Fxz21=0.5*[σyz(σh, σv, θ, Φ=45, σm, hd, decc, ψ=0)−σzy(σh, σv, θ, Φ=45, σm, hd, decc, ψ=0)−Cxz21]
Fxz23=Cxz21

The $\sigma_{zx}$ term can be expressed as:

$$-Axz0 + Axz1^*\text{COS}(\Phi) + Bxz1^*\text{SIN}(\Phi) - Axz2^*\text{COS}(2\Phi) - Bxz2^*\text{SIN}(2\Phi) \quad \text{Eq. (17)}$$

where Axz0, Axz1, Axz2, Bxz2, and Bxz2 are coefficients defined in Eq. (16).

The $\sigma_{yz}$ term can be expressed as:

$$Ayz0 + Ayz1^*\text{COS}(\Phi) + Byz1^*\text{SIN}(\Phi) + Ayz2^*\text{COS}(2\Phi) + Byz2^*\text{SIN}(2\Phi), \quad \text{Eq. (18)}$$

where Ayz0, Ayz1, Ayz2, Byz2, and Byz2 are coefficients determined by the model parameters (σh, σv, θ, Φ, σm, hd, decc, ψ);
Ayz0=0.5*Cyz01*SIN(ψ)
Ayz1=0.5*Cyz12*SIN(2 ψ)
Ayz2=0.5*[Cyz21*SIN(ψ)+Cyz23*SIN(3 ψ)]
Byz1=0.5*[Eyz10+Eyz12*COS(2 ψ)]
Byz2=0.5*[Eyz21*COS(ψ)+Eyz23*COS(3 ψ)]
Cyz01=σxz(σh, σv, θ, Φ=45, σm, hd, decc, ψ=0)−σzx(σh, σv, θ, Φ=45, σm, hd, decc, ψ=0)
Cyz12=−0.5*[σyz(σh, σv, θ, Φ=90, σm, hd, decc, ψ=0)+σzy(σh, σv, θ, Φ=90, σσm, hd, decc, ψ=0)
−σxz(σh, σv, θ, Φ=0, σm, hd, decc, ψ=0)−σzx(σh, σv, θ, Φ=0, σm, hd, decc, ψ=0)]
Cyz21=0.5*[σxz(σh, σv, θ, Φ=45, σm, hd, decc, ψ=0)−σzx(σh, σv, θ, Φ=45, σm, hd, decc, ψ=0)
−σxz(σh, σv, θ, Φ=0, σm, hd, decc, ψ=0)+σzx(σh, σv, θ, Φ=0, σm, hd, decc, ψ=0)]
Cyz23=−Cyz21
Eyz10=0.5*[σyz(σh, σv, θ, Φ=90, σm, hd, decc, σ=0)+σzy(σh, σv, θ, Φ=90, σm, hd, decc, ψ=0)
+σxz(σh, σv, θ, Φ=0, σm, hd, decc, ψ=0)−σzx(σh, σv, θ, Φ=0, σm, hd, decc, ψ=0)]
Eyz12=0.5*[σyz(σh, σv, θ, Φ=90, σm, hd, decc, ψ=0)+σzy(σh, σv, θ, Φ=90, σm, hd, decc, ψ=0)
−σxz(σh, σv, θ, Φ=0, σm, hd, decc, ψ=0)+σzx(σh, σv, θ, Φ=0, σm, hd, decc, ψ=0)]

Fyz21=σyz(σh, σv, θ, Φ=45, σm, hd, decc, ψ=0)−σzy(σh, σv, θ, Φ=45, σm, hd, decc, ψ=0)−Cyz21

Fyz23=Cyz21

The $\sigma_{zy}$ term can be expressed as:

$$-Ayz0+Ayz1*COS(\Phi)+Byz1*SIN(\Phi)-Ayz2*COS(2\Phi)-Byz2*SIN(2\Phi), \quad \text{Eq. (19)}$$

where Ayz0, Ayz1, Ayz2, Byz2, and Byz2 are coefficients defined in Eq. (18).

The $\sigma_{xy}$ term can be expressed as:

$$Axy0+Bxy1*SIN(\Phi)+Bxy2*SIN(2\Phi), \quad \text{Eq. (20)}$$

where Axy0, Bxy1 and Bxy2 are constants determined by the model parameters (σh, σv, θ, Φ, σm, hd, decc, ψ);

Axy0=0.5*Dxy02*SIN(2 ψ)

Bxy1=0.5*[σxy(σh, σv, θ, Φ=90, σσm, hd, decc, ψ=0)−σyx(σh, σv, θ, Φ=90, σm, hd, decc, ψ=0)]

Bxy2=0.5*[σxy(σh, σv, θ, Φ=45, σm, hd, decc, ψ=0)+σyx(σh, σv, θ, Φ=45, σm, hd, decc, ψ=0)]

Dxy02=[σxx(σh, σv, θ, Φ=0, σm, hd, decc, ψ=0)+σyy(σh, σv, θ, Φ=0, σm, hd, decc, ψ=0)

−σxy(σh, σv, θ, Φ=45, σm, hd, decc, ψ=0)+σyx(σh, σv, θ, Φ=45, σm, hd, decc, ψ=0)]

The $\sigma_{yx}$ term can be expressed as:

$$Axy0-Bxy1*SIN(\Phi)+Bxy2*SIN(2\Phi), \quad \text{Eq. (21)}$$

where Axy0, Bxy1 and Bxy2 are constants determined in Eq. (20).

Equations (11) through (21) are used to compute the conductivity tensor at arbitrary formation azimuth Φ and tool eccentering azimuth ψ using only three pre-computed data points for which Φ=0, 45, and 90 degrees and ψ=0 for each of those three cases. The equations can be used to compute the conductivity tensor relatively quickly and at a low computational cost. With those choices for Φ and ψ, the disclosed azimuth expansion method allows us to reduce the borehole correction table size by a factor of 432, for example. Further reduction may be possible using fewer values but accuracy may suffer. The disclosed azimuthal expansion method makes the computation of the borehole correction table practical and may also improve the performance of the borehole correction inversion. Results of the above computations are shown in FIGS. 4-2 through 4-5, and show good agreement. The expressions above for the tensor components are one example of a way to compute them using simplifying assumptions, but other expressions based on Equations 11 and 12 may be used and are within the scope of the present disclosure.

1.3 Multi-dimensional Interpolation

A multi-dimensional interpolation is used to determine the conductivity tensor for arbitrary values of the first 5 model parameters (hd, decc, σh, σv, θ) at the three Φ values (0, 45, and 90 degrees). The final conductivity tensor at arbitrary values of all the model parameters (hd, decc, σh, σv, θ, Φ, ψ) is determined using the azimuthal expansion. For best result, each of the dimensions in the multi-dimensional interpolation adopts an interpolation strategy best fit for the characteristics of that variable. For example, we use linear interpolation for the hd, decc, and θ variables. For σh variable, we use linear interpolation in logarithmic domain and convert the interpolated logarithmic value to linear. For σv variable, we convert the σv to σh/σv ratio, and use quadratic interpolation for the ratio variable, and convert the ratio to σv.

1.4 Test Results and Accuracy of the Forward Engine

Figures 1A, 12:
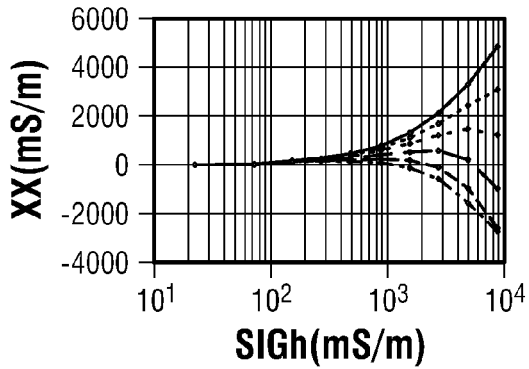
Figures 1B, 12:
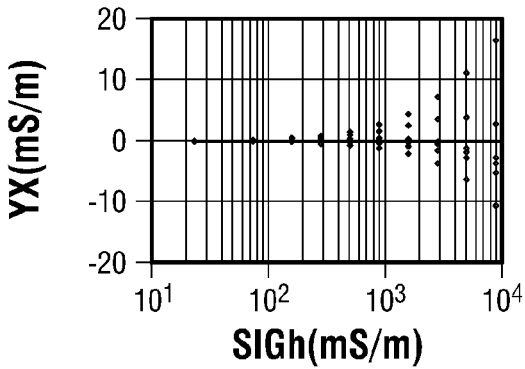
Figures 1C, 12:
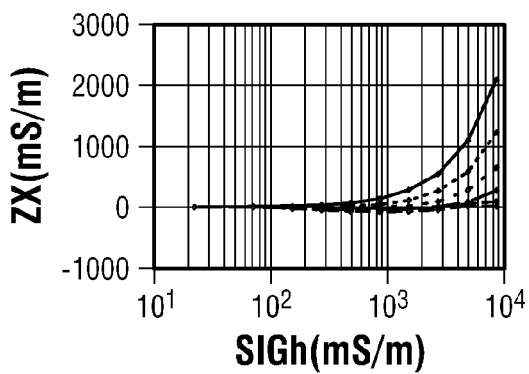
Figures 1D, 12:
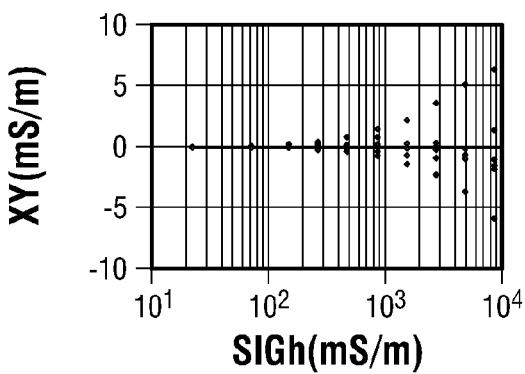
Figures 1E, 12:
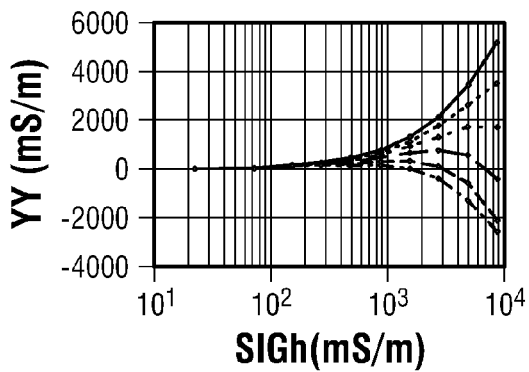
Figures 1F, 12:
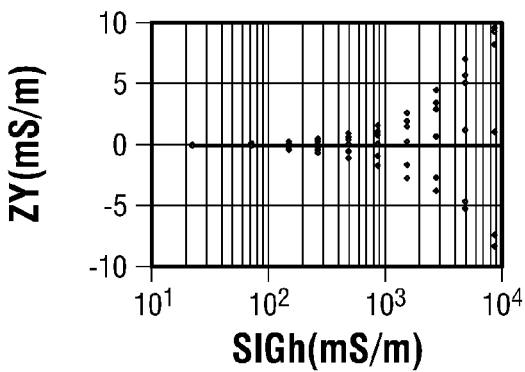
Figures 1G, 12:
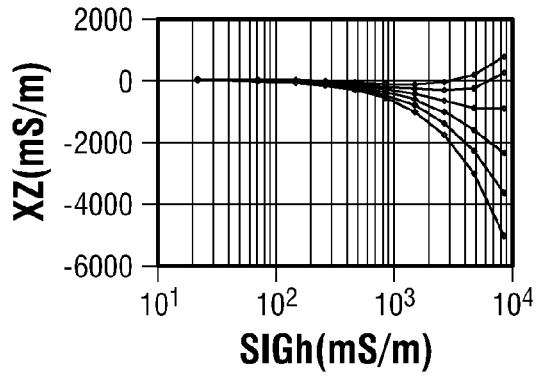
Figures 1H, 12:
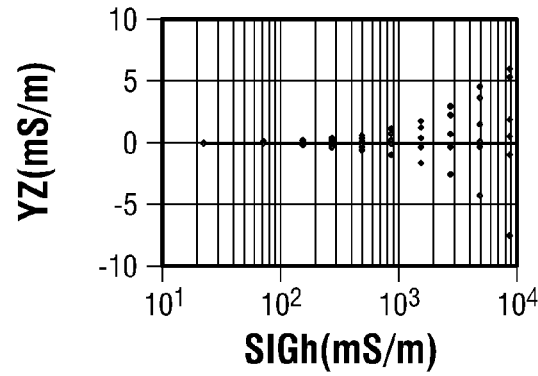
Figures 1I, 12:
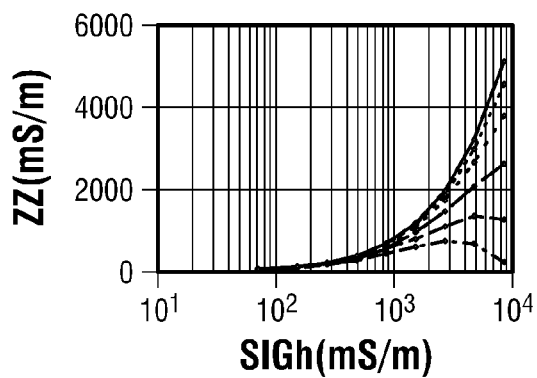
Figures 2A, 12:
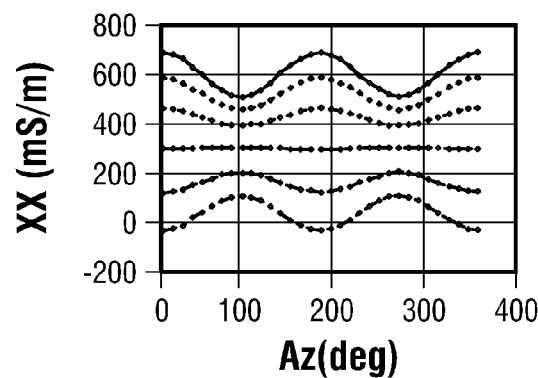
Figures 2B, 12:
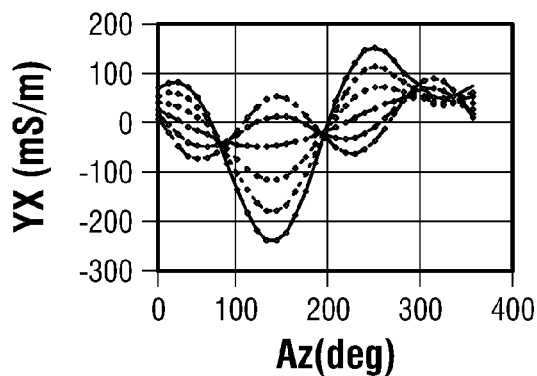
Figures 2C, 12:
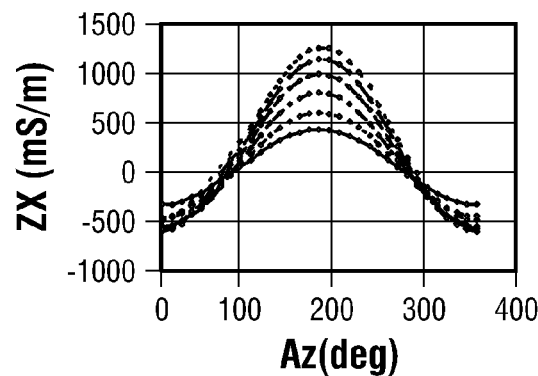
Figures 2D, 12:
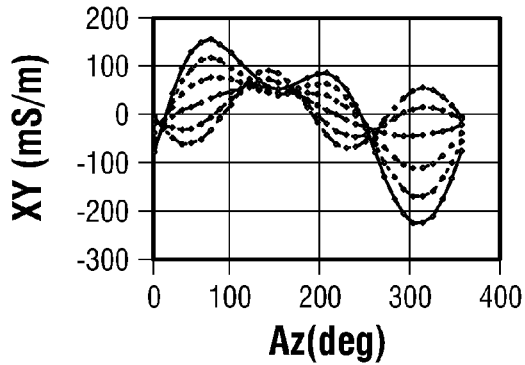
Figures 2E, 12:
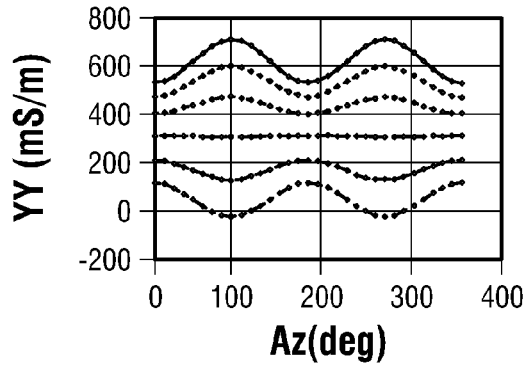
Figures 2F, 12:
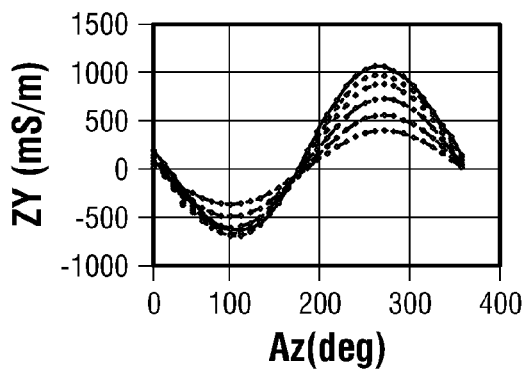
Figures 2G, 12:
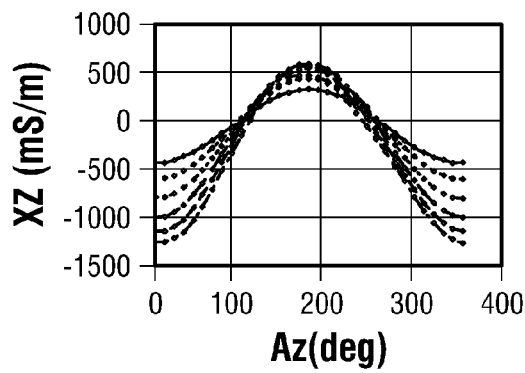
Figures 2H, 12:
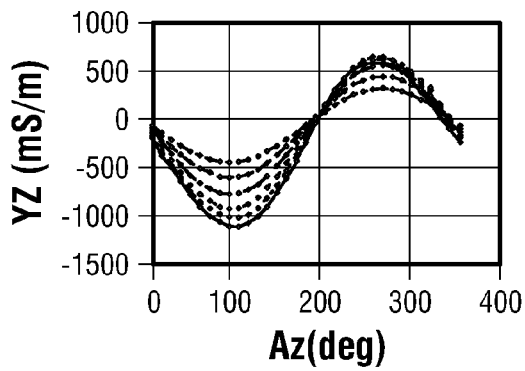
Figures 2I, 12:
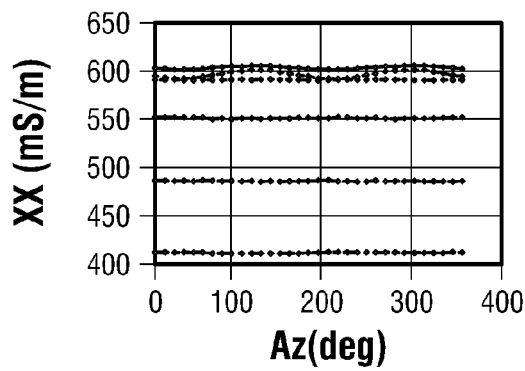

FIGS. 12-1A through 12-1I graphically illustrate an example comparison of the conductivity tensors from the forward engine versus the independently modeled conductivity tensors as a function of 1/Rh (σh). Similarly, FIGS. 12-2A through 12-2I graphically illustrate a comparison of conductivity tensors from the forward engine versus the independently modeled conductivity tensors as the formation dip azimuthal angle varies from 0 to 360 degree in steps of 11.25 degrees. The hole diameter is 10.625 inches and the tool is eccentered by 3-inch in the direction ψ=30 degree from the borehole x-axis direction which is also the tool's x-direction.

The conductivity tensors generated by the forward engine are compared with independently modeled conductivity tensors and representative statistics of the percentage differences and absolute difference are graphically illustrated in FIGS. 12-3A-D. The width of the histogram bar in FIGS. 12-3A-D is 5%. The accuracy of the forward engine in this case is mostly within +/−2.5%.

The example of interpolation disclosed above for the forward engine is selected to match the characteristics of the tool responses. Those of ordinary skill in the relevant arts will recognize that other interpolation methods may be used.

2. Iterative Inversion

To invert for the formation parameters (σh, σv, θ, Φ) and also account for the tool position and borehole effects which are controlled by the borehole/tool parameters (decc and ψ), an iterative minimization algorithm may be used. In this example, two azimuthal angles Φ and ψ are computed from the measured conductivity tensor σm(i, j, k) using the technique described in section 1.1. The inversion now only needs to invert for four parameters (decc, σh, σv, θ) which minimizes a cost function for the case where hole diameter (hd) is given. If hd is not available, the inversion could invert for one more free parameter.

Figure 13:
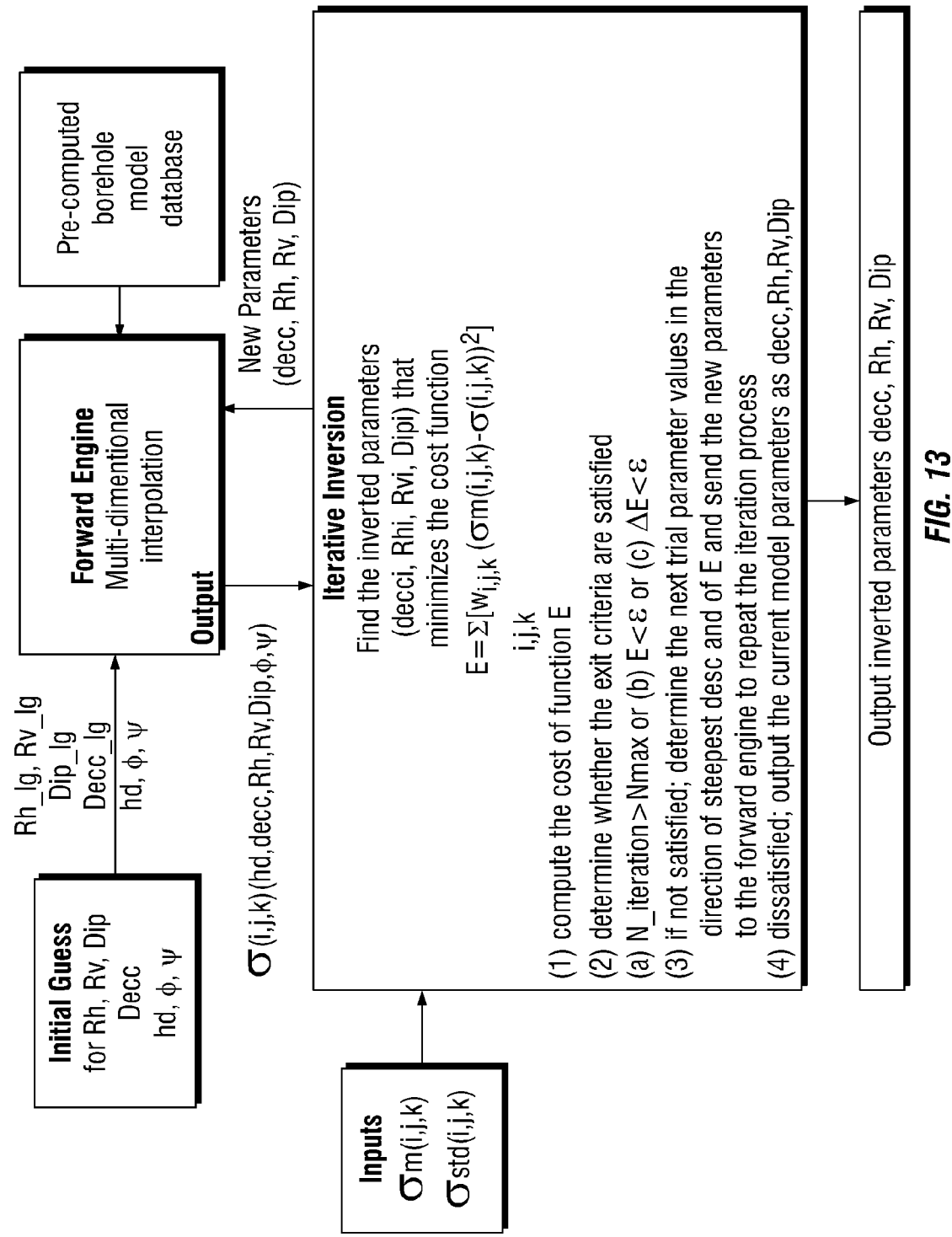
FIG. 13 is a block diagram of an example of an iterative minimization inversion process that may be used within the method of the present invention.

FIG. 13 shows a block diagram of an example of the inversion algorithm (and its interaction with other components shown in FIG. 3). An example of a cost function may be expressed as:

$$E = \sum_{i,j,k} w_{i,j,k} (\sigma m_{i,j,k} - \sigma_{i,j,k})^2, \quad \text{Eq. (22)}$$

where the $w_{i,j,k}$ is weighting coefficient, $\sigma m_{i,j,k}$ is the measured conductivity tensor and $\sigma_{i,j,k}$ is the modeled conductivity tensor. The index i, j, k, are for TR spacing, Tx orientation, and Rec orientation, respectively.

An example of the weighting function $w_{i,j,k}$ may be expressed in terms of standard deviation of the sonde error measurement, $\sigma std_{i,j,k}$, as:

$$w_{i,j,k} = \text{Max}\left(0, \left[1 - \frac{\sigma std_{i,j,k}}{\text{abs}(\sigma m_{i,j,k})}\right]\right) \quad \text{Eq. (23)}$$

This expression of weighting function will make $w_{i,j,k} \approx 1$ if the amplitude ratio between sonde error standard deviation and the measurement is near 0. The weighting function will decrease as the amplitude ratio increases and $w_{i,j,k} \approx 0$ if the sonde error approaches the same magnitude as or larger than the measurement.

Other forms of the weighting function, such as $w_{i,j,k}=1$, may also produce reasonable results. In this example, the larger amplitude measurements tend to have higher influence on the cost function.

Additional examples of cost function expressions are given below:

$$E = \sum_{i,j,k} w_{i,j,k} \text{abs}(\sigma m_{i,j,k} - \sigma_{i,j,k})^n \quad \text{Eq. (24)}$$

$$E = \sum_{i,j,k} w_{i,j,k} (\sigma m_{i,j,k} - \sigma_{i,j,k})^m, \, m = \text{even number} \quad \text{Eq. (25)}$$

The minimum number of measurements that enter into the cost function should equal the number of unknown model parameters to be inverted. Usually, more measurements are available and could be used to enhance the statistics of the inversion process.

Starting from a set of initial guess model parameter values, a minimization algorithm can be used to determine the values of the inverted model parameters that produce the lowest possible cost function. For example a non-linear least square algorithm, such as Levenberg-Marquardt algorithm, may be used to search for the model parameter values that minimize the cost function in Eq. (22) through an iteration process. The exit criteria for the iteration may include the following:

(a) Number of iteration>Nmax;
(b) Cost function $E_i$<$\epsilon$1 (usually a very small constant); and
(c) $\Delta E$<$\epsilon$2 (usually a very small constant).

3. Initial Guess

A coarse grid search strategy is used to obtain the initial guess model parameters (decc, σh, σv, and θ). The coarse grid for the decc and Rh (or 1/σh) are constructed using σzz and σxz-σzx components of the measured conductivity tensors.

4. Estimation of Inversion Errors

The sensitivities of the measurements to the inverted parameters generally vary as functions of the inverted parameters. For example, the measurements are very sensitive to the change of Rv/Rh in low Rv/Rh ratio region and the sensitivity tapers off significantly when Rv/Rh>10. The sensitivity to Rh, Rv, and dip generally drops off quickly as Rh becomes large (e.g., Rh>50 ohm-m). The higher the sensitivity of a given parameter in the solution region is, the higher the likelihood that accurate inversion results will be obtained.

The sonde error statistics (σstd), which represent the uncertainty of the measurements, and the sensitivity function may be used to estimate the errors of the inverted parameters. In this example, these error estimates will be used for quality control purposes to help interpret the inverted answers.

The sensitivity function Spn(i, j, k) for a given measurement σ(i, j, k) to a given parameter $p_n$ may be defined as follows:

$$Spn(i, j, k) = \frac{\partial \sigma(i, j, k)}{\partial p_n} \quad \text{Eq. (26)}$$

where index i represents TR spacing, index j represents transmitter orientation and index k for receiver orientation, pn represents any inverted parameter. For this case, n=1, 2, 3, 4, etc. corresponds to parameters decc, σh, σv, and θ, respectively.

In this example, for practical implementation, the difference in σ(i, j, k) due to a 2% variation of the $p_n$ parameter is computed, instead of the partial derivative in Eq. (26).

The error of the inverted pn parameter, Δpn, may be expressed as a weighted average over all the selected measurements for the inversion.

$$\Delta pn = \sum_{i,j,k} wa(i, j, k) * \sigma std(i, j, k) / Spn(i, j, k) \quad \text{Eq. (27)}$$

Here, wa(i, j, k) is the weighting coefficient for the contribution due to σ(i, j, k) measurement.

Various strategies can be used to set the wa coefficient, e.g., an amplitude weighting strategy. The wa coefficient may be expressed as:

$$wa(i, j, k) = \frac{\sigma(i, j, k)}{\sum_{i,j,k} \sigma(i, j, k)} \quad \text{Eq. (28)}$$

5. Borehole Effects and Borehole Correction

In this example, the processing after the inversion stage produces a set of model parameters (decc, σh, σv, θ, Φ, ψ) using a selected subset of measured conductivity tensor σm(i, j, k) through an inversion algorithm for every input data frame. These inverted model parameters can be stored as function of depth similar to conventional logs.

Each of the measured conductivity tensor σm(i, j, k) has a measurement depth that is usually the mid-point between the transmitter and the receiver. Different transmitter-receiver ("TR") spacing conductivity tensor measurements have different measurement depth.

In this example, at any given depth, the inverted parameters together with the hole diameter (hd) log will be used to compute the responses of the tool with and without the borehole. The response with the borehole, σbh(i, j, k), will be computed using the forward engine disclosed above. The response without the borehole, σnbh(i, j, k), may be computed through an analytic formula known in the art. The borehole effect for the measurement at that measured depth, Δσ(i, j, k), may be expressed as:

$$\Delta\sigma(i, j, k) = \sigma bh(i, j, k) - \sigma nbh(i, j, k) \quad \text{Eq. (29)}$$

The borehole corrected measurements at that measured depth, σbhc(i, j, k), may be expressed as:

$$\sigma bhc(i, j, k) = \sigma m(i, j, k) - \Delta\sigma(i, j, k) \quad \text{Eq. (30)}$$

The borehole corrected conductivity tensor may be used in subsequent processing to estimate, for example, borehole corrected formation properties such as borehole corrected porosity and borehole corrected fluid saturation.

6. Example of Borehole Correction Processing Using Model Data

Figures 1A, 14:
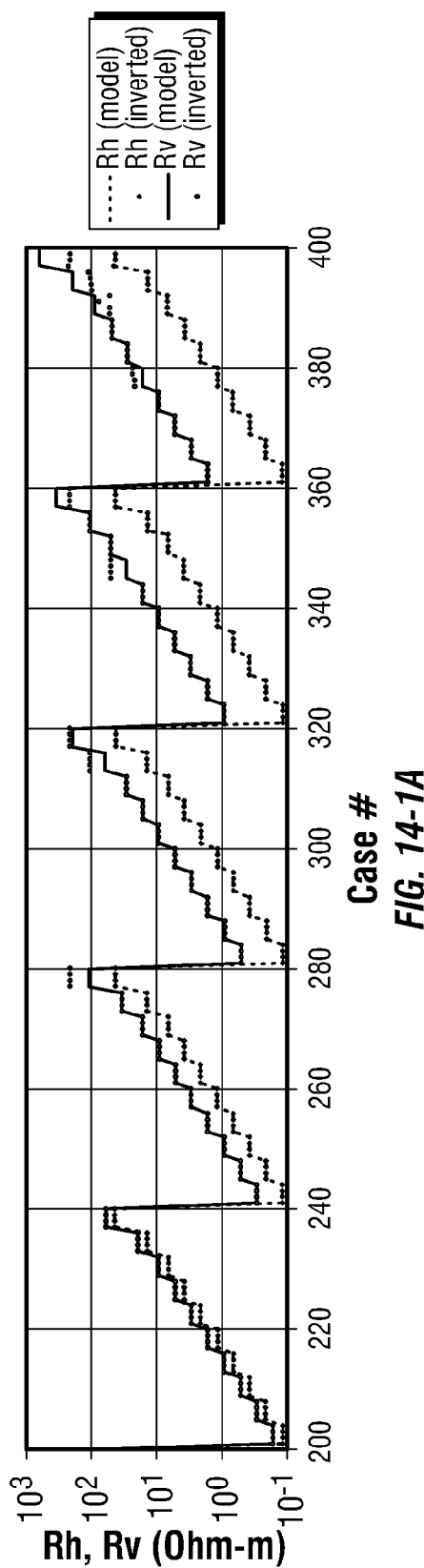
Figures 1B, 14:
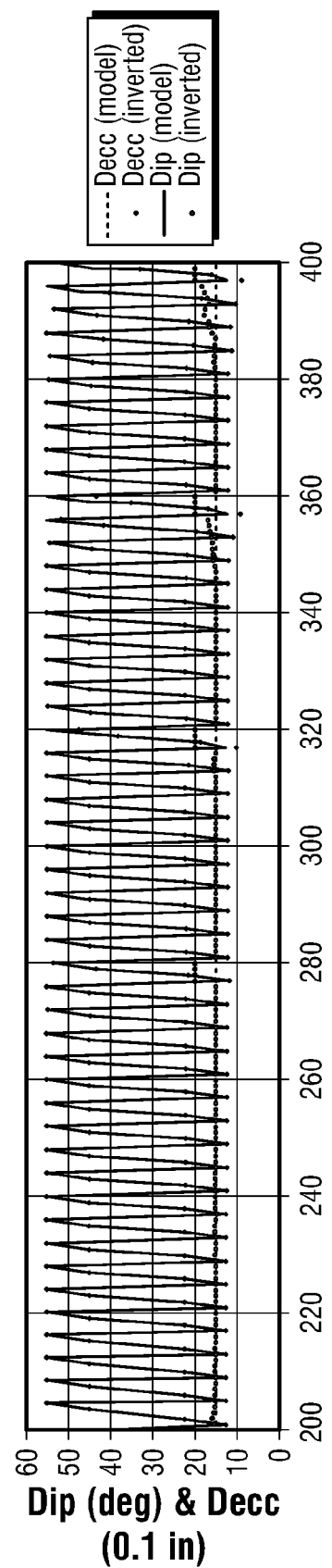
Figures 1C, 14:
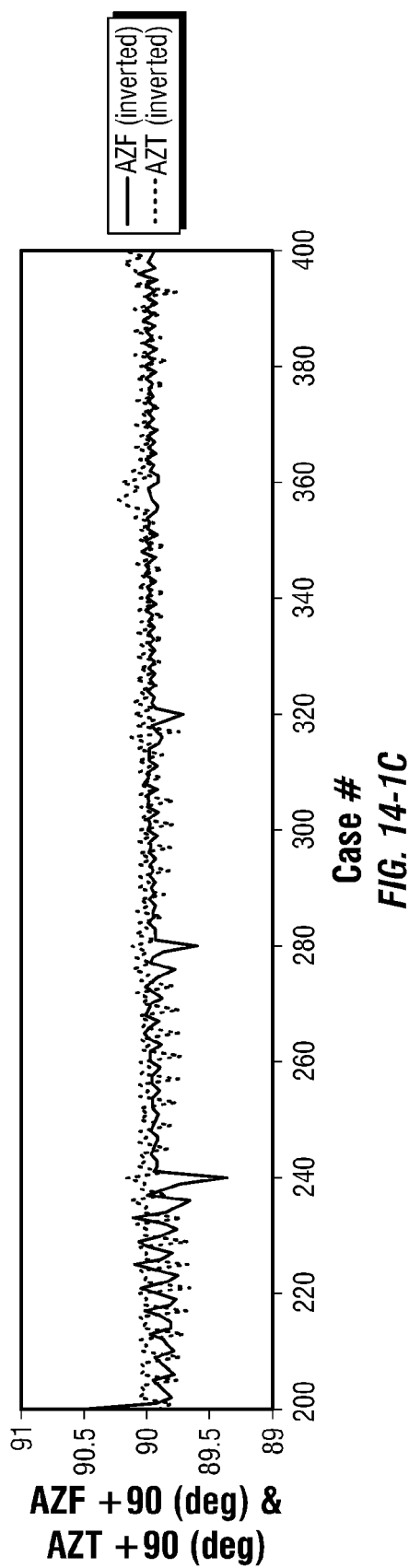
Figures 2A, 14:
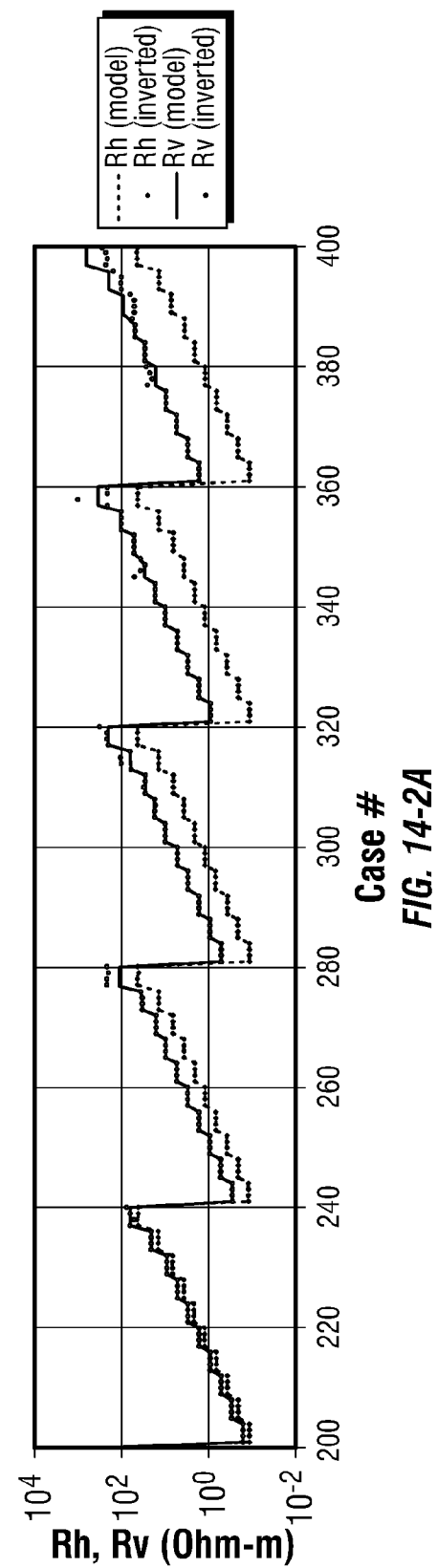
Figures 2B, 14:
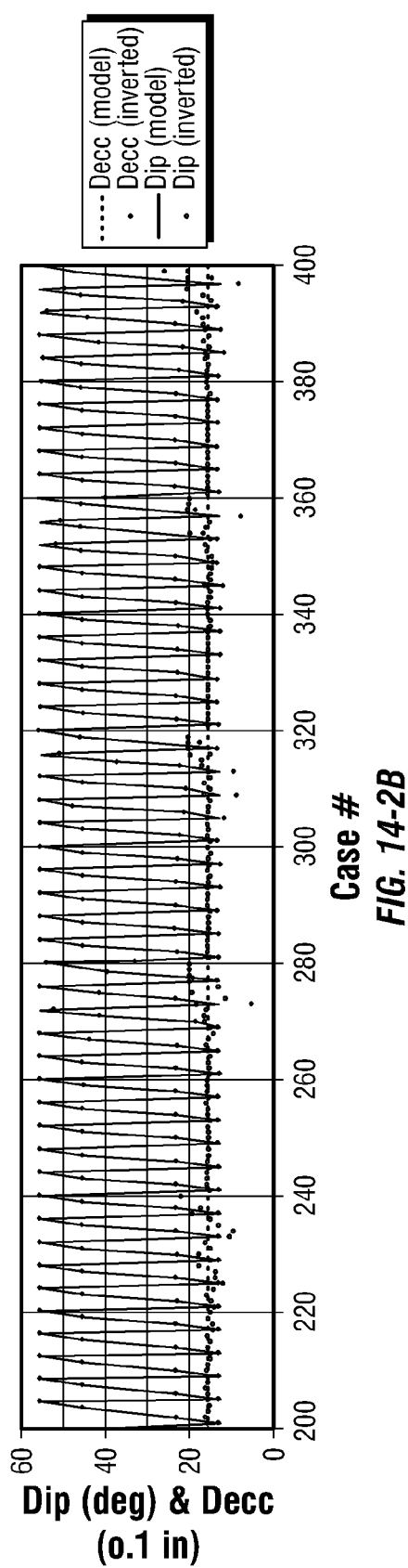
Figures 2C, 14:
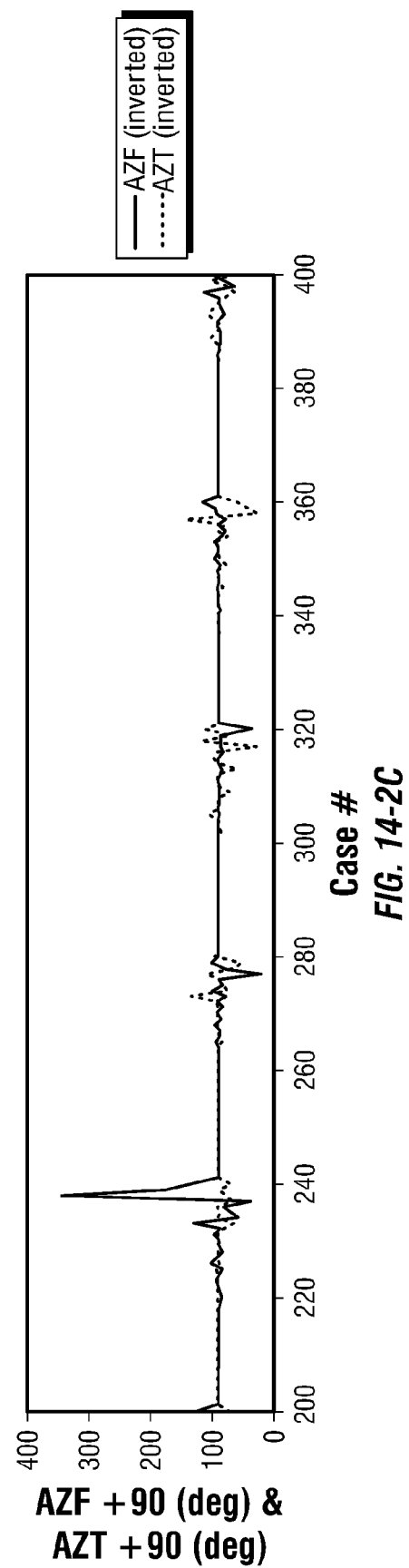

FIGS. 14-1 and 14-2 are example comparisons of theoretical model data for which the correct answers are known to demonstrate the accuracy and robustness of the borehole correction processing. In this example, a set of 1000 test cases that covers a wide range of borehole diameter, eccentering distance, Rh, Rv, and dip angles are modeled. The borehole and formation parameters for these test cases are selected such that they are at the off-grid position referenced to the grid points used in the borehole model database.

FIG. 14-1 is an example of borehole correction processing results using noiseless off-grid theoretical model data. The borehole correction algorithm outputs are compared with the known model parameter answers. FIG. 14-1A is for Rh and Rv; FIG. 14-1B is for dip angle and decc; and FIG. 14-1C is for formation azimuth (AZF) and tool eccentering azimuth (AZT). The Rh shows a substantial match to the predicted answer. The Rv is also very robust. A small error of Rv is seen in the high resistivity region. This is consistent with the disclosed prediction that in high resistivity, the measurement is not sensitive to Rv/Rh ratio. Any small amount of error in interpolation and inversion process may cause some error in Rv in high resistivity region. The inverted dip angle matches very well with the predicted answer. Again, a small error can be seen in the high resistivity region for the same lack-of-sensitivity reason. The inverted decc also matches the predicted answer very well. The model parameters for the formation azimuth angle and tool eccentering azimuth angle are both zero degrees. To avoid angle wrapping near zero degree, both azimuthal angle answers are shifted by 90 degrees and a modulus of 360 of the shifted results is performed. The results of the disclosed formula for computing these two azimuthal angles match the predicted answer to within a fraction of a degree.

The effect of random noise on the borehole correction algorithm is also evaluated using these off-grid model data. The standard deviation sonde error measurement, σstd(i, j, k), is added or subtracted in a random fashion to the input data, σm(i, j, k), to simulate random noise. The processing results from this noisy model data are shown in FIG. 14-2 in the same format as that for the noiseless case in FIG. 14-1. The borehole correction algorithm is very robust in handling the random noise. The noise did not cause any appreciable effect on the inverted Rh. For Rv, Dip, and decc, the inverted results substantially match the noiseless case, except with a slightly larger error in the high resistivity region where the sensitivity to the parameters is low. The formation azimuth angle and tool eccentering azimuth angle both show slightly elevated error at high resistivity region where the signal-to-noise ratio is low.

In addition to accuracy and robustness, the nominal processing speed for the disclosed system and method is fast enough to serve as a real-time answer product at the wellsite. The disclosed system and method are applicable for downhole tools, wireline and LWD conditions, for example, and may be implemented as real-time well site answer product as well as computer center product.

Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the scope of the invention as defined by the appended claims which follow.

The invention claimed is:

1. A method for correcting formation properties due to effects of a borehole comprising:
    obtaining voltage measurements using a logging tool disposed in a borehole penetrating a subsurface formation;
    using a processor to:
    determine a tensor for the formation using the voltage measurements;
    for a given set of parameters, determine, based upon the voltage measurements, a parameter value for each parameter in a subset of the set of parameters;
    compute a borehole-inclusive modeled tensor that includes the effects of the borehole using the parameter values;
    optimize the parameter values using the determined tensor and the borehole-inclusive tensor;
    compute an optimized tensor using the optimized parameter values;
    compute a borehole corrected tensor using the optimized tensor; and
    determine at least one borehole corrected formation property using at least one of the borehole corrected tensor or the optimized parameter values.

2. The method of claim 1, wherein the formation properties include at least one of horizontal resistivity, vertical resistivity, relative dip angle, dip azimuth angle, saturation, porosity, or formation conductivity tensor.

3. The method of claim 1, wherein the parameters include at least one of tool eccentering azimuth angle, tool eccentering distance, mud conductivity, or borehole diameter.

4. The method of claim 1, wherein determining the parameter values of the parameters in the subset comprises computing at least of a dip azimuth angle or a tool eccentering azimuth angle using one or more components of the determined tensor.

5. The method of claim 1, wherein the logging tool comprises at least one transmitter antenna and at least one receiver antenna, and wherein the voltage measurements are obtained using the at least one transmitter and receiver antenna.

6. The method of claim 1, wherein the determined tensor is at least one of an apparent conductivity tensor or a transmitter-to-receiver coupling voltage tensor.

7. The method of claim 1, wherein the determining the parameter value for each parameter in the subset includes equating the value of a tool eccentering azimuth angle to the value of an angle of rotation that rotates the determined tensor to a frame in which a relation between certain components of the determined tensor is optimized.

8. The method of claim 1, wherein the computing of the borehole-inclusive tensor comprises:
    using a forward model to compute a grid-point specific borehole-inclusive tensor at each grid point of a multidimensional space; and
    performing a multidimensional interpolation between grid points to compute the borehole-inclusive tensor.

9. The method of claim 1, wherein the logging tool comprises an electromagnetic resistivity logging tool.

10. The method of claim 7, wherein the electromagnetic resistivity logging tool comprises a tri-axial resistivity logging tool.

11. A method to determine a conductivity tensor for an earth formation, comprising:
    providing one or more input parameters and a pre-computed forward model database to a multidimensional interpolator;
    using a processor to perform a multidimensional interpolation; and
    using the processor to determine the conductivity tensor using an azimuthal expansion, wherein the azimuthal expansion is constrained by using only one tool eccentering azimuth angle value and three dip azimuth angle values.

12. The method of claim 11, wherein the input parameters comprise one or more of horizontal resistivity, vertical resistivity, dip angle, dip azimuth angle, eccentering azimuth angle, mud resistivity, hole diameter, and eccentering distance.

13. The method of claim 11, wherein the interpolation comprises linear or quadratic interpolation.

14. The method of claim 11, wherein the tool eccentering angle is zero degrees and the three dip azimuth angles are zero, forty-five, and ninety degrees, respectively.

15. The method of claim 11, wherein the azimuthal expansion is a series expansion in terms of a tool eccentering azimuth angle and a dip azimuth angle.

16. A method for determining formation properties comprising:

determining a measured tensor using voltage measurements obtained using an electromagnetic logging tool disposed in a borehole penetrating a subsurface formation;

providing an initial guess for each formation parameter of a set of formation parameters of interest;

providing as inputs to a forward engine the initial guesses for the formation parameters of interest and a pre-computed borehole model database;

using the forward engine to obtain a modeled tensor;

providing as inputs to an iterative inversion the modeled tensor, the measured tensor, and error statistics associated with the voltage measurements; and using the iterative inversion to determine a value for at least a subset of the set of formation parameters of interest based on a cost function.

17. The method of claim 16, wherein the cost function applies a weighting function to an expression that is based on the difference between the measured tensor and the modeled tensor.

18. The method of claim 17, wherein the expression based on the difference between the measured tensor and the modeled tensor comprises at least one of:
  (a) the square of the difference between the measured tensor and the modeled tensor;
  (b) the magnitude of the difference between the measured tensor and the modeled tensor raised to a power of n, wherein n >0; or
  (c) the magnitude of the difference between the measured tensor and the modeled tensor raised to a power of m, wherein m is an even integer.

19. The method of claim 16, wherein the set of formation parameters of interest comprises horizontal resistivity, vertical resistivity, dip angle, eccentering distance, borehole diameter, dip azimuth angle, or azimuth; and
  wherein the subset of the set of formation parameters comprises eccentering distance, horizontal resistivity, vertical resistivity, and dip angle.

20. The method of claim 11, wherein the three dip azimuth angle values comprise 0°, 45°, and 90°.

* * * * *